(12) United States Patent
Sears et al.

(10) Patent No.: US 10,867,451 B2
(45) Date of Patent: Dec. 15, 2020

(54) APPARATUS, SYSTEMS, AND METHODS FOR DISPLAY DEVICES INCLUDING LOCAL DIMMING

(71) Applicant: Facebook Technologies, LLC, Menlo Park, CA (US)

(72) Inventors: Jasmine Soria Sears, Kirkland, WA (US); Alireza Moheghi, Bothell, WA (US); Oleg Yaroshchuk, Redmond, WA (US); Douglas Robert Lanman, Bellevue, WA (US); Andrew Maimone, Duvall, WA (US); Kavitha Ratnam, Woodinville, WA (US); Nathan Matsuda, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/503,439

(22) Filed: Jul. 3, 2019

(65) Prior Publication Data
US 2020/0111258 A1    Apr. 9, 2020

Related U.S. Application Data

(60) Provisional application No. 62/741,707, filed on Oct. 5, 2018.

(51) Int. Cl.
*G06T 19/00* (2011.01)
*G06F 3/01* (2006.01)
*G02B 27/01* (2006.01)

(52) U.S. Cl.
CPC ........ *G06T 19/006* (2013.01); *G02B 27/0172* (2013.01); *G06F 3/013* (2013.01); *G02B 2027/0138* (2013.01)

(58) Field of Classification Search
None
See application file for complete search history.

(56) References Cited

U.S. PATENT DOCUMENTS

| | | | |
|---|---|---|---|
| 6,100,944 | A | 8/2000 | Sharp et al. |
| 6,184,969 | B1 | 2/2001 | Fergason |
| 2003/0112395 | A1 | 6/2003 | Kwon et al. |
| 2012/0013831 | A1 | 1/2012 | Parri et al. |
| 2014/0085282 | A1 | 3/2014 | Luebke et al. |
| 2015/0231839 | A1 | 8/2015 | Su et al. |
| 2015/0362728 | A1 | 12/2015 | Tei |
| 2016/0266389 | A1 | 9/2016 | Ouderkirk |

(Continued)

OTHER PUBLICATIONS

Blanc-Goldhammer et al., "The effects of natural scene statistics on text readability in additive displays", Proceedings of the Human Factors and Ergonomics Society Annual Meeting, vol. 62, No. 1, 2018, pp. 1281-1285.

(Continued)

*Primary Examiner* — Yi Wang
(74) *Attorney, Agent, or Firm* — FisherBroyles, LLP

(57) ABSTRACT

An example device may include an electronic display configured to generate an augmented reality image element and an optical combiner configured to receive the augmented reality image element along with ambient light from outside the device. The optical combiner may be configured to provide an augmented reality image having the augmented reality image element located within a portion of an ambient image formed from the ambient light. The device may also include a dimmer element configured to selectively dim the portion of the ambient image in which the augmented reality image element is located.

18 Claims, 26 Drawing Sheets

(56) References Cited

U.S. PATENT DOCUMENTS

| | | |
|---|---|---|
| 2017/0161951 A1 | 6/2017 | Fix et al. |
| 2017/0315384 A1 | 11/2017 | Saylor et al. |
| 2018/0074331 A1 | 3/2018 | Ouderkirk et al. |
| 2018/0217394 A1 | 8/2018 | Watson et al. |
| 2018/0217429 A1 † | 8/2018 | Busch |
| 2019/0096340 A1 * | 3/2019 | Todd ............ G06F 3/1431 |
| 2019/0295503 A1 | 9/2019 | Ouderkirk et al. |
| 2019/0317450 A1 | 10/2019 | Yaroshchuk et al. |
| 2019/0318678 A1 | 10/2019 | Sears et al. |
| 2019/0318706 A1 | 10/2019 | Peng et al. |
| 2019/0392746 A1 * | 12/2019 | Bohn ............ G02B 6/005 |
| 2020/0018962 A1 | 1/2020 | Lu et al. |
| 2020/0074724 A1 * | 3/2020 | Mathur ............ G02B 27/0172 |

OTHER PUBLICATIONS

Yamaguchi et al., "Normal and Reverse Mode Light Scattering Properties in Nematic Liquid Crystal Cell Using Polymer Stabilized Effect", Journal of Photopolymer Science and Technology, vol. 28, No. 3, Oct. 2015, pp. 319-323.

Gluschhenko et al., "Memory effect in filled nematic liquid crystals", Liquid Crystals, vol. 23, No. 2, 1997, pp. 241-246.

Yaroshchuk et al., "Electro-optics and structural peculiarities of liquid crystal-nanoparticle-polymer composites", Physical Review E, vol. 72, No. 5, Article May 17, 2015, 2005, pp. 1-11.

Doane, J. William, "Polymer-Dispersed Liquid Crystals: Boojums at Work", MRS Bulletin, vol. 16, No. 1, Jan. 1991, pp. 22-28.

Soto, Pedro Coutino, "Modeling and Characterization of Dye-Doped Guest-Host Liquid Crystal Eyewear", PhD Dissertation, Kent State University, Nov. 2015, 149 pages.

Moheghi, "LC/Polymer Composites, Scattering Properties and Application in Displays", PhD Dissertation, Liquid Crystal Institute, Kent State University, May 2017, 130 pages.

"AlphaMicron—The World's Fastest Tint-Changing Technology", URL: https://alphamicron.com/, retrieved on May 25, 2020, pp. 1-4.

\* cited by examiner
† cited by third party

Spiropyran         Merocyanines

APPARATUS, SYSTEMS, AND METHODS FOR DISPLAY DEVICES INCLUDING LOCAL DIMMING

CROSS REFERENCE TO RELATED APPLICATION

This application claims the benefit of U.S. Provisional Application No. 62/741,707, filed 5 Oct. 2018, the disclosure of which is incorporated, in its entirety, by this reference.

BACKGROUND

In augmented reality systems, electronically-generated images may be used to provide augmented reality images. Approaches to improving such augmented reality images would be useful.

SUMMARY

As will be described in greater detail below, the instant disclosure describes the use of local dimming to improve the visibility of augmented reality image elements, for example, an augmented reality image element displayed within an ambient image, which may be a real-world image of the local environment.

In some embodiments, a device includes an electronic display configured to generate an augmented reality image element and an optical combiner configured to receive the augmented reality image element along with ambient light from outside the device. The optical combiner may be configured to provide an augmented reality image having the augmented reality image element located within a portion of an ambient image formed from the ambient light. The device may also include a dimmer element configured to selectively dim the portion of the ambient image in which the augmented reality image element is located, for example, using a liquid crystal (LC) shutter.

In some embodiments, a device includes an electronic display configured to generate an augmented reality (AR) image element and an optical combiner configured to receive the augmented reality image element and also to receive ambient light from outside the device and to provide an augmented reality image having the augmented reality image element located within a portion of an ambient image. The ambient image may be formed from the ambient light, which may be termed an outside image or a real-world image. The device may include an optical system including the optical combiner and lenses configured to focus the augmented reality image and ambient image together into the field of view of a user. The device may include a dimmer element configured to reduce the intensity of at least part of the ambient image to improve visibility of the augmented reality image element.

In some embodiments, the device may be configured so that the ambient light passes through the dimmer element before reaching the optical combiner. The dimmer element may include a liquid crystal shutter, such as one or more of: a cell with an aligned and electrically controllable layer of liquid crystal confined between two polarizers; a guest-host liquid crystal cell; or an electrically controlled light scattering cell including a liquid crystal composite. The dimmer element further includes a pixelation visibility reduction layer, wherein the pixelation visibility reduction layer includes a pattern of light-absorbing elements at least partially in register with a pixel gap pattern of the liquid crystal shutter. In some embodiments, the liquid crystal shutter includes irregularly-shaped pixels. In some embodiments, the liquid crystal shutter includes a guest-host liquid crystal shutter including a dye-doped liquid crystal.

In some embodiments, the device may be configured to be worn by a user, and the device may be configured so that the augmented reality image element is projected towards an eye of the user after passing through the optical combiner. In some embodiments, the augmented reality image element includes a plurality of color channels, and the electronic display includes a separate projector array for each color channel, and each projector array may be coupled into the optical combiner. Each projector array may include a microLED array, for example, a microLEDs array having microLEDs spaced apart by less than approximately 5 microns, and in some examples less than approximately 2 microns.

In some embodiments, a device may include an image sensor configured to determine an intensity of the ambient light as a function of direction, wherein the dimmer element may be selectively controlled based on one or more directions from which the intensity of the ambient light exceeds a threshold intensity. In some embodiments, a device may further include an eye tracking camera configured to determine a user gaze. The dimmer element may be selectively controlled based on the determined user gaze. In some embodiments, the dimmer element may be selectively controlled based on one or more directions from which the intensity of the ambient light exceeds a threshold intensity, and not on the determined user gaze.

In some embodiments, a device includes a control unit configured to generate or receive augmented reality information for display as the augmented reality image element, activate the electronic display to provide the augmented reality image element; and control the dimmer element to dim a selected portion of the ambient image, to enhance a visibility of the augmented reality image element. In some embodiments, the device may be an augmented reality headset, such as an augmented reality glasses, goggles, or similar device.

In some embodiments, a method includes combining an ambient image and an augmented reality image element to form an augmented reality image, and selectively dimming a portion of the ambient image to visually enhance the augmented reality image element. Generating the augmented reality image element may include projecting the augmented reality image element towards an optical combiner, for example, through a waveguide. Generating the ambient image may include receiving ambient light from a local environment (which may also be termed the real world) and directing the ambient light towards the optical combiner. The optical combiner may receive the augmented reality image element and the ambient light and form an augmented reality image by combining the augmented reality image element and the ambient light. Dimming a portion of the ambient image to visually enhance the augmented reality image element may include selectively dimming the portion of the ambient image on which the augmented reality image element is located, while not dimming some or all of the remainder of the image. In some embodiments, only portions of the image corresponding to the locations of augmented reality image elements are dimmed. These may include a portion of the ambient image located around the periphery of the augmented reality image element. Dimming a portion of the ambient image to visually enhance the augmented reality image element may include reducing the optical transmission of a portion of an optical shutter, for example, switching a portion of an optical shutter (e.g., a liquid crystal shutter and/or a photochromic shutter) to reduce an intensity of the portion of the ambient image in which the augmented reality image element is located.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
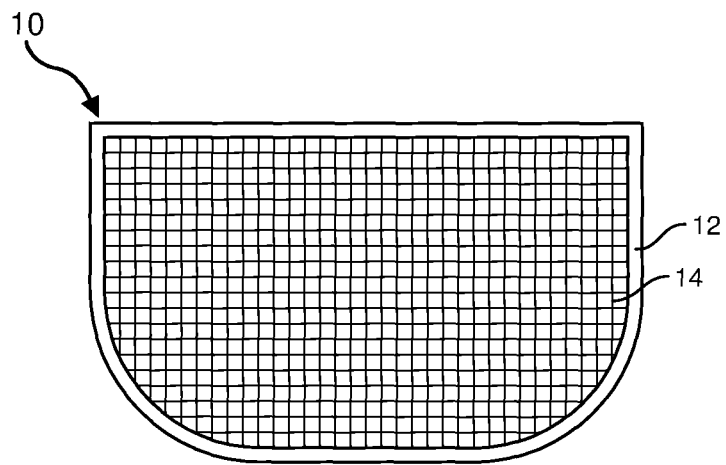
FIG. 1 depicts an exemplary dimmer element in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to approaches to local dimming of a visual display, such as an augmented reality display. As will be explained in greater detail below, embodiments of the instant disclosure may include an apparatus (such as a head-mounted apparatus such as glasses or a helmet), systems including a head-mounted apparatus, and associated methods.

Figure 12A:
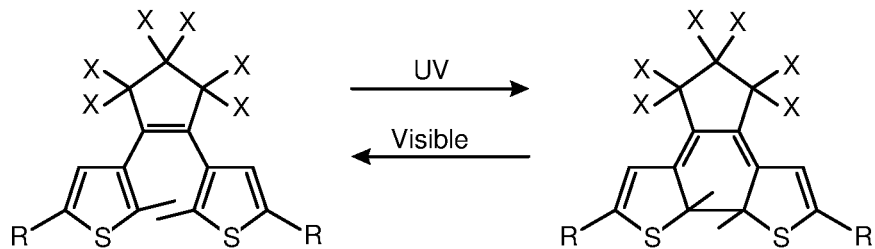
FIGS. 12A-12C show representative photochromic materials that may be used in dimmer elements in accordance with some embodiments.
Figure 12B:
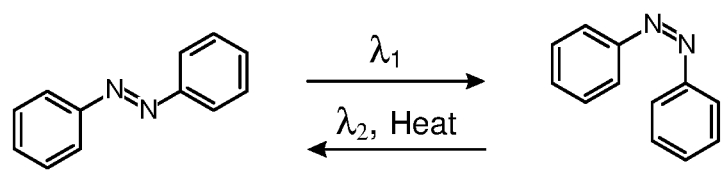
Figure 12C:
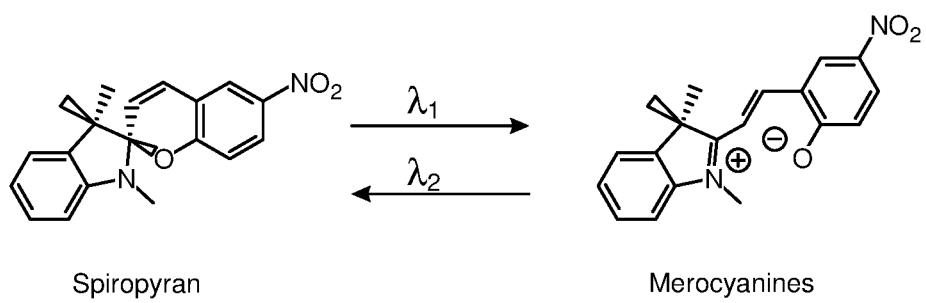
Figure 13:
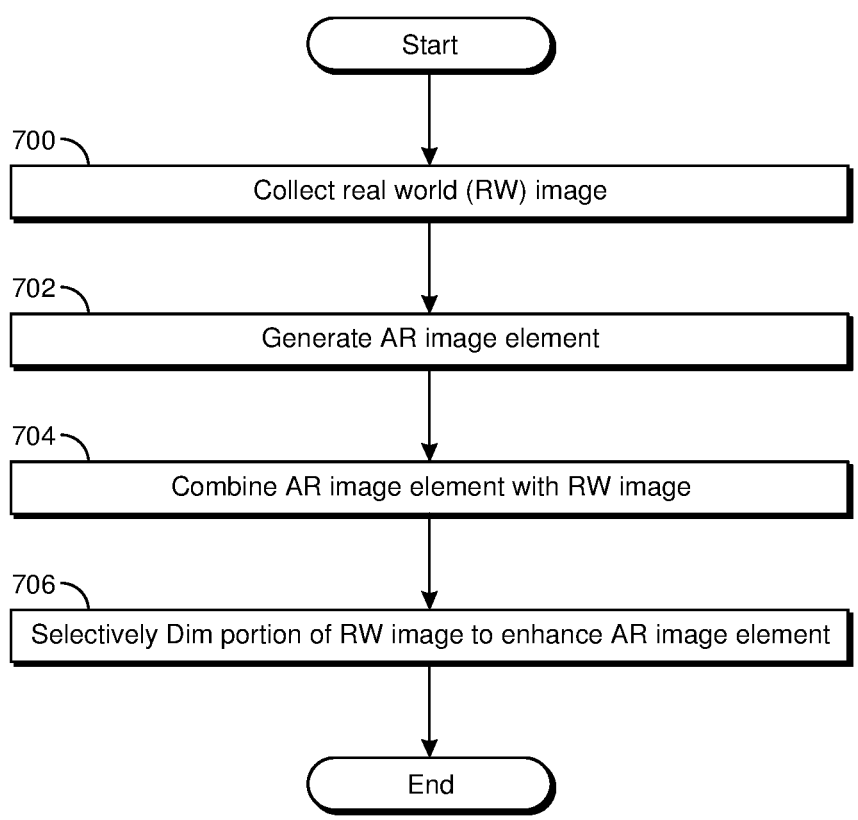
FIG. 13 shows a method of local dimming in accordance with some embodiments.
Figure 14:
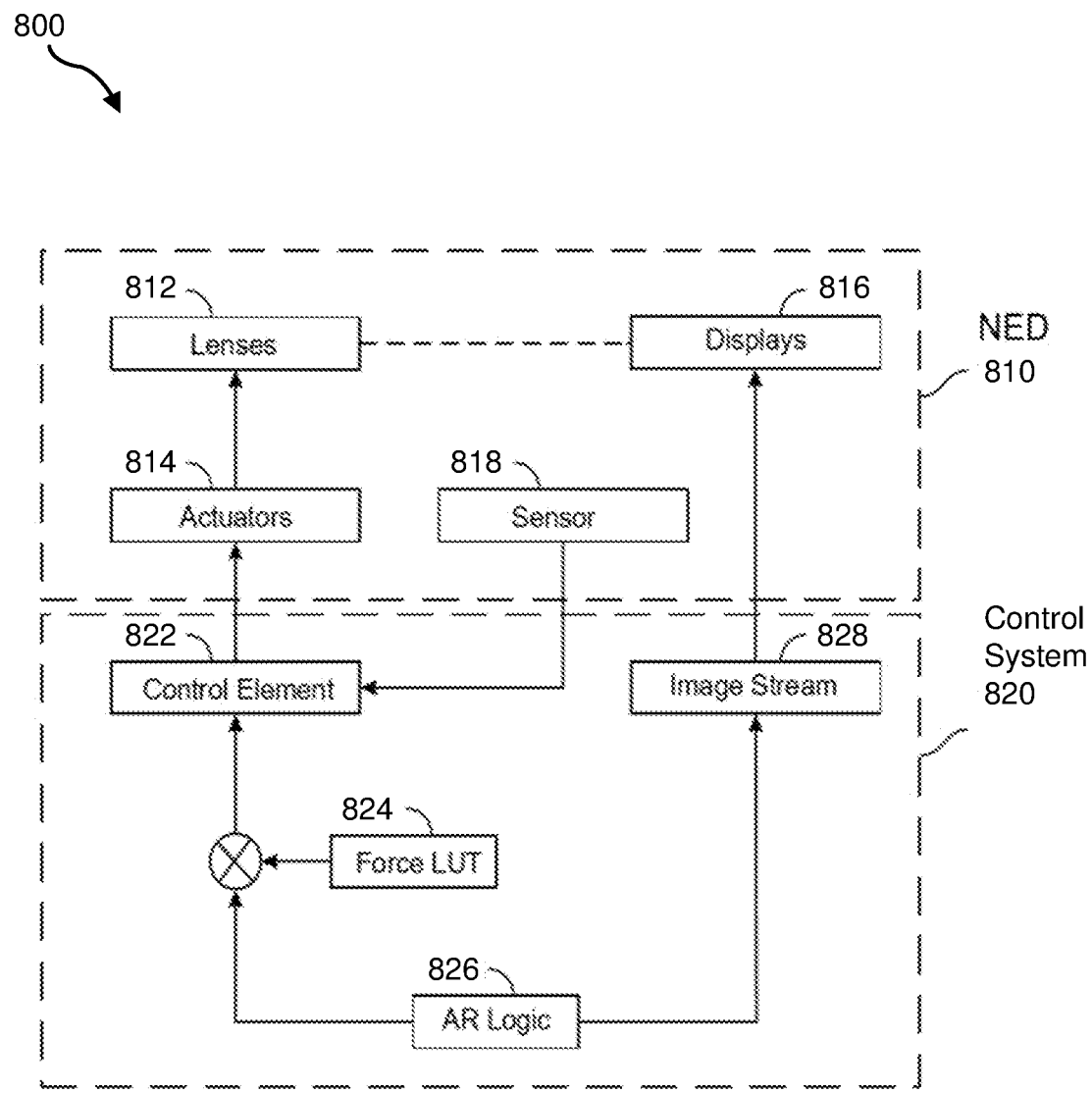
FIG. 14 shows an augmented reality system in accordance with some embodiments.

The following will provide, with reference to FIGS. 1-25, detailed descriptions of approaches to local dimming of a visual display. Examples may be generally directed to apparatuses, systems, and methods including devices configured for local dimming of a display. FIGS. 1-2B illustrate example applications of a dimmer element, FIGS. 3A-7B illustrate example device configurations, FIG. 8 illustrates an example glasses-based device, FIGS. 9A-11G illustrate representative layer arrangements in example dimmer elements, FIGS. 12A-12C illustrate example photochromic material components, FIG. 13 illustrates an example method, FIG. 14 illustrates an example system diagram, FIGS. 15-20 illustrate example augmented reality/virtual reality applications, and FIGS. 21-25 illustrate further example device configurations that may be adapted for use with a dimmer element.

Viewing of an augmented reality image element (which may include augmented reality text and/or augmented reality graphics) over a bright or busy background may be challenging. Globally reducing the amount of light passing through the lenses may help the visibility of augmented reality graphics, but this may reduce the visibility of the ambient image (the real-world image of the local environment), instead of just the parts of the ambient image that interfere with the augmented reality image elements. Some embodiments described herein may include spatially-selectively darkening regions of augmented reality glasses lenses to make certain augmented reality graphics more visible, in some embodiments without significantly interfering with the visibility of the remainder of the ambient image (e.g., the real-world image of the local environment). In some embodiments, due to eye proximity, dark regions may not appear to have sharp edges to the wearer. In some embodiments, the visibility of an augmented reality image element may be increased by increasing the brightness and/or color contrast between the AR image element, and the portion of the ambient image in which the AR image element is located. For example, a dimmer element may be configured to selectively dim a portion of the ambient image in which the AR element is located. In this context, the portion may include one or more AR image elements, and may include a peripheral region that is also dimmed to improve the visibility of the AR element. In this context, selective dimming may refer to spatially selective dimming, in which a portion of the ambient image is dimmed to enhance the visibility of the AR image element.

In some embodiments, an imaging device, such as augmented reality glasses, may have locally dimmable optical elements, such as windows and/or lenses. An example dimmer element, which may include additional optical components such as a lens, may include a liquid crystal layer that is divided into regular or irregular regions that can be independently turned dark or clear. Such lenses may allow for precisely-targeted dimming to block bright or distracting features of the ambient image without impairing visibility of the rest of a wearer's view. The degree of dimming may be adjusted depending on the intensity of ambient light (which may also be termed outside light), for example, to achieve a desired contrast ratio for the augmented reality image element. Various techniques may be used to minimize the visibility of pixelated dimming of the lenses both to the wearer and to outside observers. In some embodiments, electrodes driving the liquid crystal layer may be designed to produce electric field spreading to increase the area of light-blocking liquid crystal molecules so as to hide gaps between pixels. In various examples, pixels may have irregular shapes to reduce the noticeability of the pixel boundaries. Additionally or alternatively, relatively small pixels may be used to effect high-resolution local dimming. In some examples, a highly electrically conductive trace, such as a gold trace, may be used, for example, in the pixel region or within a pixel gap region.

A selectively dimmed region, which may also be termed a locally dimmed region, may have a reduced optical transmission compared to an undimmed state, for example, an optical transmission in the range 2%-90% of the undimmed transmission, for example, in the range 2%-75%. In some embodiments, local dimming may reduce the optical transmission of less than half of the entire viewable region, such as less than one quarter, and in some embodiments less than 20% of the entire viewable region. In some embodiments, global dimming may be applied to the entire field of view, or to the remaining field of view (the entire field of view outside of the locally dimmed portion).

In some embodiments, a method of improving the display of an augmented reality component on a view of the local environment may include selectively dimming a portion of the view of the local environment over which the augmented reality component is displayed. The augmented reality component may include text, graphics, alerts, and/or any other visually-discernable component. In some embodiments, a degree of dimming may be applied to achieve a desired contrast ratio for an augmented reality component (e.g., augmented reality text and/or graphics), such as, for example, in the range (1.5-6):1 (e.g., 3:1, 4:1, or 5:1). The contrast ratio provided for text may be higher than that provided for graphics (e.g., an arrow). For example, text contrast ratio may be at least 3:1, and graphics contrast ratio may be at least 1.6:1. In some embodiments, color contrast may be provided instead of, or additional to, brightness contrast ratio.

In some embodiments, an optical shutter, such as a liquid crystal shutter, may be spatially addressable and allow application or reading of different signals at different spatial locations on the liquid crystal shutter. In some embodiments, multiplexing schemes can be used to apply electrical signals. In some embodiments, electrode pairs may be provided by the intersection of electrode stripes on each side of a liquid crystal shutter, for example, between orthogonal electrode stripes.

In some embodiments, a liquid crystal shutter may include electrode stripes (which may also be referred to as electrode traces) that have a generally elongated and straight shape. In some embodiments, electrode traces may have a non-linear form, for example, an irregular form such as a curved, wiggly, squiggly, or wavy shape. The shape of an electrode trace may include lateral displacements of the electrode trace (from a linear path) in the plane of the electrode and/or the substrate. Wavy shapes may be generally periodic (e.g., sinusoidal), include multiple spatial periodicities, or may be irregular. Wiggly shapes may include many oscillatory components, and may appear to have random or near-random deviations from a linear path. In some embodiments, wavy or wiggly electrode traces (or pixel edges) may be used to reduce visual perception of an electrode (or a pixel edge).

In some embodiments, pixel edges may be non-linear, and may be wiggly as described in the previous paragraph, or may be otherwise irregular. For example, an irregular pixel pattern may have no pixel edge shape that is repeated within a radius of at least 3 pixels. In some embodiments, an electrode trace (or pixel edge) may include deviations from a linear shape, for example, to reduce visibility to a device user. In some embodiments, an electrode trace path is such that an area 3 times thicker than the trace and 10 times longer than the trace thickness cannot be overlaid over the electrode trace such that the trace is entirely covered. In some embodiments, lateral deviations of the electrode trace exceed three times the trace width, and in some embodiments may exceed five times the trace width. For example, if an electrode trace has a thickness of 10 microns, lateral deviations from a linear path may be at least 30 microns, and in some embodiments at least 50 microns. In some embodiments, such lateral deviations occur at least once in a repeat distance less than or approximately equal to tend times the track width. In some embodiments, an electrode trace path may include a pattern such as a sinusoid or partial fractal, or could form a non-repeating pattern.

Selection of an area for dimming may be determined using the location of augmented reality image elements, such as the location of text or graphics relative to a view of the local environment. The degree of opacity (e.g., percent transmission) may be chosen to achieve a desired readability, such as, for example, a desired contrast ratio. Local dimming may be used to selectively emphasize an augmented reality component (e.g., relatively important components). Dimmed areas may appear gray or black, tinted, or some other shade. In some embodiments, local dimming may be used to block a bright light source, such as an artificial or natural light source such as the Sun, a lamp (such as a headlamp), a laser beam, a window, or a bright reflection or projection. In some embodiments, a dimmer pixel may be optically activated (e.g., by light above a predetermined intensity) to apply a degree of dimming. An optically activated dimmer pixel may include a photochromic element, a photoconductor (e.g., photoconductive electrode), and the like. In some embodiments, an augmented reality headset may have a failure mode in which the dimmer element returns to a clear state with no power applied. A liquid crystal shutter may have no polarizers, or in some embodiments, one or more polarizers may be used.

In some embodiments, the term augmented reality may include mixed reality. In some embodiments, local dimming may be used to improve the visual appearance of virtual objects anchored within an ambient image (which may also be termed a real-world image). The anchored virtual object may be considered to be an augmented reality image element. Local dimming may be used to improve the appearance of an any virtual object, such as an anchored virtual object in mixed reality, for example, by making the anchored virtual object appear more solid by blocking bright lights from the outside world from appearing within the virtual object.

In some embodiments, a dimmer element may include a liquid crystal layer, for example, as a liquid crystal shutter. In some embodiments, the liquid crystal layer may not require one or more additional polarizers to provide selective dimming. Some embodiments may include guest-host liquid crystal shutters that include, for example, a liquid crystal layer (such as a nematic liquid crystal) incorporating a dye (e.g., including dye molecules oriented within a nematic liquid crystal). In some embodiments, a nematic liquid crystal molecule may include a dye moiety. In some embodiments, a liquid crystal layer may include a polymer dispersed liquid crystal (PDLC, where the liquid crystal may include a nematic liquid crystal) or a polymer-stabilized liquid crystal, such as a polymer stabilized cholesteric texture. In some embodiments, a liquid crystal (LC) shutter may include one or more of: a cell with an aligned and electrically controllable layer of liquid crystal confined between two polarizers; a guest-host liquid crystal cell; or an electrically controlled light scattering cell including a liquid crystal composite. In some embodiments, a liquid crystal (LC) shutter may include (e.g., be based on) one or more of the following; an electrically controlled phase retardation layer (such as an LC layer with polarizers), a guest-host effect, an electrically controlled light scattering effect (such as a polymer dispersed liquid crystal, PDLC), a polymer network LC (PNLC), a filled LC (e.g., a LC with nanoparticles), another liquid crystal shutter configuration, or some combination of the above. For example, a liquid crystal shutter may include a combination such as a guest-host PDLC (e.g., a PDLC with a dichroic dye), and/or stacking of several dimmer films based on different configurations (e.g., a PDLC film combined with a guest-host film, or some other combination).

FIG. 1 depicts an exemplary dimmer element 10 in accordance with some embodiments. The figure shows an example dimmer element having a peripheral shape 12 that matches to a lens of an augmented reality device. For example, the peripheral shape 12 may be defined by a frame or portion thereof, for example, having the configuration of an eyeglass frame. The dimmer element is pixelated, and includes a plurality of dimmer pixels 14. In some embodiments, the dimmer element includes a liquid crystal shutter having a plurality of pixels.

In some embodiments, a dimmer element may include a pixelation visibility reduction layer. A pixelation visibility reduction layer may include a pattern of light-absorbing material at least partially in register with a pixel gap pattern of the liquid crystal shutter. For example, if a liquid crystal shutter used for local dimming has a pattern (e.g., a square or rectangular pattern) of pixel gaps, the pixelation visibility reduction layer has a similar pattern of light-absorbing elements which may be configured in register with pixel gaps. For example, a pixelation visibility reduction layer may include a dark grid. The pixelation visibility reduction layer may reduce light leakage through a dimmer element, for example, when a liquid crystal shutter (or other shutter) is in a dark state.

The dimmer pixels may have a dimension appreciably larger than a corresponding dimension of an augmented reality display element pixel. In some embodiments, the pixel pitch of the dimmer pixels may be at least approximately 1 mm.

In some embodiments, the dimmer element includes an optical shutter that may include electrically-controllable pixels, which may be switched from a relatively light (or clear) state to a relatively dark state. In some embodiments, the dimmer element includes a liquid crystal layer.

The dimmer element may be disposed within an augmented reality headset, such as a component of augmented reality glasses. The dimmer element may be a component of an augmented reality lens assembly. In a binocular device, there may be two dimmer elements, one for the optical system corresponding to each eye. The dimmer element may be divided into regions, which may be include one or more as pixels, and the region and/or the pixels may be regular (e.g., square, rectangular, generally oval, or circular), or irregular (such as a non-geometric shape, or a shape having a wavy or otherwise irregular edge). In some example, a dimmed region may have an apparently sharp edge, and in other examples the edge may have a spatial gradient of transmission or otherwise be diffuse. In some example, each region can be turned dark or clear independently of the rest. This may allow targeted dimming to block bright or distracting real-world features within an ambient image without impairing visibility of rest of the local environment (sometimes termed the real world). As perceived by a user, darkened regions may not have sharp edges due to eye proximity. Regions of the dimmer element may be electrically addressed using an addressing method, such as individually-addressed regions or matrix-addressed regions.

Figure 2A:
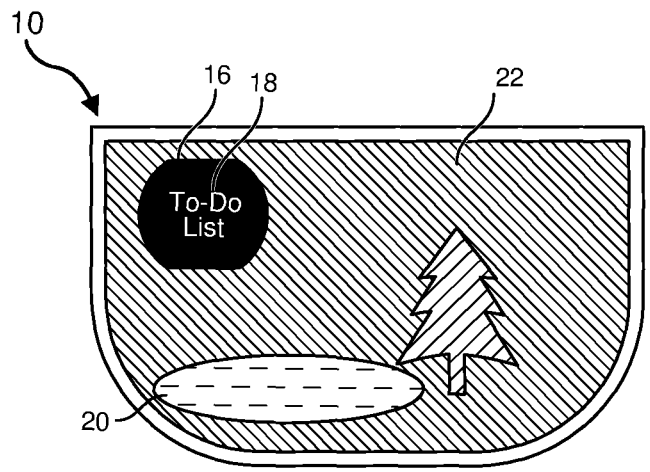
FIGS. 2A-2B depict context-dependent adjustable opacity of an exemplary dimmer element in accordance with some embodiments.
Figure 2B:
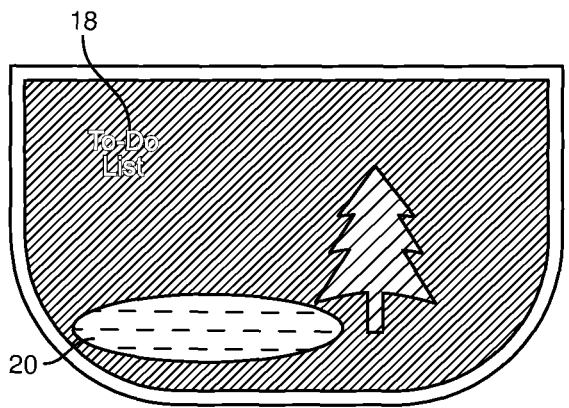

FIG. 2A depicts a context-dependent adjustable opacity in accordance with some embodiments. FIG. 2A shows an example dimmer element 10 having local dimming 16 of a portion of an ambient image (in this example, an outside image of the local environment represented by lake 20, which may also be termed a real-world image). The local dimming provides enhanced readability of an augmented reality message 18. In some embodiments, there may be global dimming over the remaining outside image, in this case over the scene 22. Global dimming may, for example, include electrical control of pixelated dimer elements (such as those not used for local dimming), a photochromic material, a fixed degree of absorption provided by a dye material, or some other approach or combination of approaches. The degree of global dimming used for eyeglass wear may be insufficient to provide an adequate (or desired) level of readability of the augmented reality message. In some embodiments, a dimmer element includes an optical shutter configured to provide local dimming to provide enhanced readability of an augmented reality image, and global dimming of the remainder of the outside image. The local dimming may be appreciably greater than the global dimming. In some embodiments, the light absorption provided by the local dimming may be at least 25% greater than the light absorption provided by the global dimming. In some embodiments, the global dimming may reduce light intensity over the visible spectrum, whereas the local dimming may reduce an intensity of light of a color used for the augmented reality image. For example, there may be enhanced local dimming of red light if the augmented reality message is displayed using red text. In some embodiments, the global dimming may provide greater absorption of short wavelengths (such as blue), for example, to provide improved visual perception of an outside environment.

FIG. 2B shows an example without local dimming, in which the augmented reality message 18 may difficult to read against an outdoor background image, and the local environment may be uncomfortably bright.

A dimmer element may include an optical shutter, such as a liquid crystal shutter, and may be pixelated. An optical shutter may have pixels that have dark or light states. In a dark state, the pixel may be generally opaque and block light from a portion of the local environment from reaching the user's view. In a light state, the pixel may be relatively transparent, allowing light from the local environment to pass through the dimmer element pixel and reach the user's view. In some embodiments, a dimmer element may include pixels with multiple available state options (e.g., clear/dim/opaque, or clear/variable dimness). For example, an optical shutter, such as a liquid crystal shutter, may have pixels that have at least one gray state in addition to the dark and light states.

In some embodiments, an augmented reality device may include a dimmer element that has pixels that (or regions) in different states depending on the augmented reality element to be projected within the local environment. In some embodiments, an augmented reality message provided on a bright day may result in local dimming, with a region of the dimmer element (corresponding to the augmented reality message) being opaque or dark and the remainder of the dimmer element being generally transparent or less dark. The degree of local dimming may depend on one or more of various parameters, such as the intensity of ambient light (the intensity of light originating from the real world, e.g., the local environment), the importance of the message, the presence of color contrast between the augmented reality message and the background image, and parameters of the background image against which the augmented reality image element is displayed (such as color, uniformity, and brightness). The degree of local dimming may, for example, depend on the brightness of the ambient image against which the augmented reality image element is displayed. In some embodiments, display of an augmented reality element to a user located indoors, or within a less bright environment such as a cloudy day, may have a region of the dimmer element (corresponding to the augmented reality element) set as semi-opaque, with the remainder of the dimmer element being generally transparent. In some embodiments, the amount of dimming may be based on the brightness of the environment, and there may be less dimming during a cloudy day than during a sunny day. In some embodiments, a device may provide a combination of global dimming and local dimming. Global dimming may depend, for example, on an average scene brightness. Global dimming may be limited due to, for example, safety considerations. Local dimming may depend on the nature of the augmented reality image (such as color, importance, complexity, and the like), and may also depend on the local brightness of the outdoor scene at the displayed location of the augmented reality image. Local dimming may be appreciably greater than global dimming, and in some embodiments local dimming may approach a perceived dark or black background for an augmented reality image. In some embodiments, local dimming may be used to reduce the intensity of glare or other distracting aspects of an outside image (e.g., to reduce the perceived intensity of bright lights, reflections, sunlight, and the like).

In some embodiments, a degree of dimming may be correlated with a determined importance of an augmented reality image element, such as an augmented reality message. In some embodiments, an external light sensor may be used to determine illumination levels within the local environment, and the degree of dimming set accordingly. For example, a headset may include one or more sensors responsive to ambient light levels. In some embodiments, an imaging sensor may provide image data, including color and uniformity information related to the background for an augmented reality image element. The degree of dimming may be greater, for example, when there is a lesser degree of background uniformity or a lesser degree of color contrast between the augmented reality image element and the appropriate portion of the ambient image.

Figure 3A:
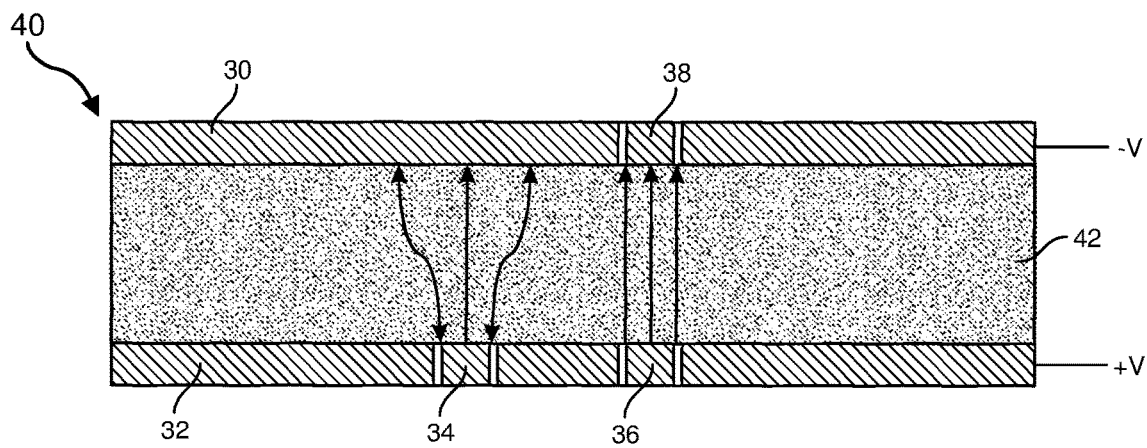
FIGS. 3A-3B depict an exemplary liquid crystal layer located between a pair of spaced-apart electrodes in accordance with some embodiments.

FIG. 3A shows a dimmer element 40 including first electrode layer 30, second electrode layer 32, and a liquid crystal layer 42 located between the electrode layers. The electrodes may be a pair of spaced-apart transparent conductive electrodes (e.g., transparent conductive oxide electrodes such as ITO (indium tin oxide), or tin oxide electrodes). The approximate directions of electrical field lines are shown as arrows, for an arbitrary electrical potential applied between upper and lower electrodes. The switched region may be defined by a patterned first electrode 38 and a patterned second electrode 36, and in this case the edges of switched regions are relatively sharply defined on the depicted length scales. FIG. 3A shows generally parallel electric field lines within the switched region between patterned electrodes (36 and 38). If there is only a patterned electrode within one electrode layer, such as shown at 34, and the opposite electrode layer 30 is un-patterned, the electrical field lines tend to spread out from the single patterned electrode 34, as shown by the arrows above 34 in FIG. 3A.

Figure 3B:
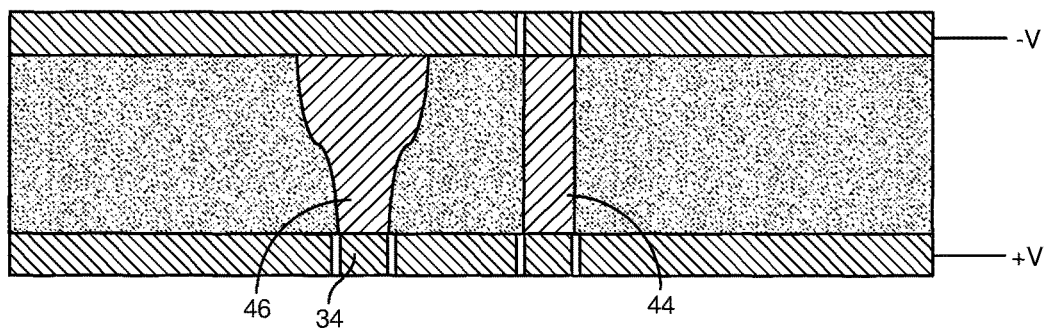

FIG. 3B shows a similar configuration, where the hashed regions 46 and 48 show (approximately and figuratively) the regions of the liquid crystal layer that are significantly reoriented by the electric field applied between the electrodes. The edges of switched regions may be appreciably less sharp (or blurred, or diffused), due to the lateral spread of the electric field lines from the first pattered electrode to a second un-patterned electrode. This may allow the provision of switched regions with less sharply defined edges, which may have a visual appearance favored by a user. The shape and/or sharpness of a dimmed (darkened) region may be determined by the direction of electric field lines between the electrodes. Patterning both top and bottom electrodes may result in tighter region control and sharper edges than leaving one electrode un-patterned.

In some embodiments, pixel designs may be used to reduce gaps between pixels. Electric field spreading may be used to hide gaps between local dimmer pixels, for example, to provide a more uniform dimming of a portion of the view of the local environment. A fully patterned transparent conductor (electrode) may be provided on one side of the dimmer element, for example, on an eye side of liquid crystal layer. The outer side electrode, closer to the outside environment, may be un-patterned and may extend over some or all of the liquid crystal layer. The eye side of the liquid crystal layer is the side closer to the eye when a head-mounted device (such as augmented reality goggles) is worn by a user. Region spreading due to electric field shape may result in a perceived overlap between dark regions. Having no gaps in the outer transparent conductor layer may make the layer less noticeable.

Figure 4A:
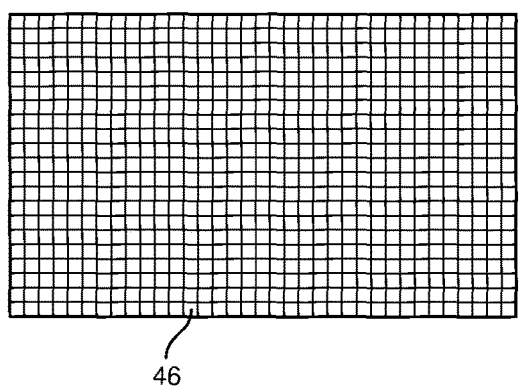
FIGS. 4A-4B depict an exemplary pattern of dark pixels and an advantageous effect of electric field spreading between the electrodes in accordance with some embodiments.
Figure 4B:
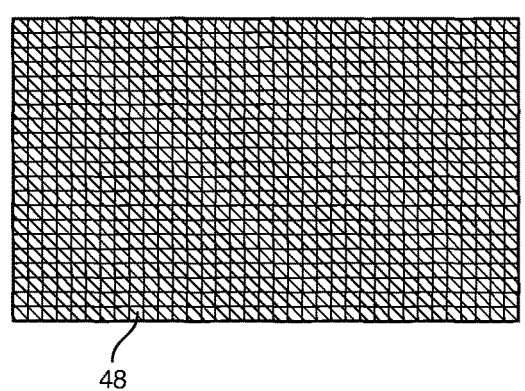

FIG. 4A shows a pattern of dark pixels, where the pixels are defined by, for example, a pattern of electrode stripes on opposed sides of the liquid crystal layer, resulting in less electric field spreading between the electrodes and more sharply defined pixels such as pixel 46. FIG. 4B shows an advantageous effect of electric field spreading between pixels, for example, using an un-patterned electrode on one side of the liquid crystal layer, leading to less sharply defined pixels such as pixel 48.

Figure 5:
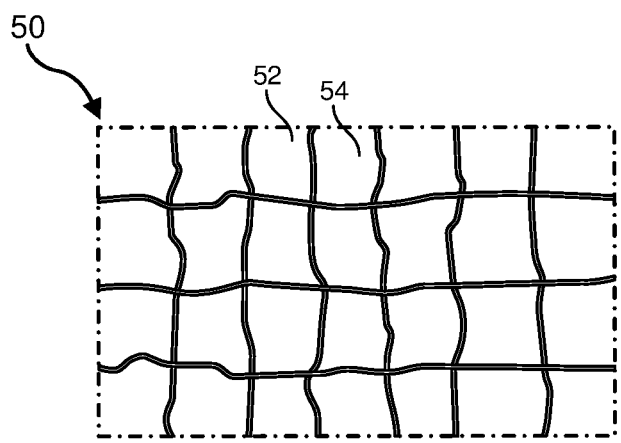
FIG. 5 depicts an exemplary pattern of irregularly shaped pixels in accordance with some embodiments.

FIG. 5 shows an embodiment using irregularly shaped pixels, which may be used to reduce perception of pixel edges. FIG. 5 shows a portion 50 of a dimmer element having irregularly shaped pixels such as 52 and 54. The boundaries between pixels (e.g., between pixels 52 and 54) may be non-linear, such as the irregularly shaped boundary illustrated.

Irregular pixel shapes may be used to make features less noticeable. A grid-like pixel layout may be used for dimming region control. However, in some embodiments, irregularities in pixel edge shape may reduce perception of pixel edges and may become invisible or substantially unnoticeable to a wearer of a head-mounted device. Perception may be reduced by a combination of one or more of pixel edge irregularities, trace irregularities, to near-eye blurring, or electric field spreading. Irregular pixels may have one or more of the following characteristics: variations in pixel area, non-straight pixel edges (e.g., including compound curved periphery), non-parallel pixel edges, irregular pixel gaps (e.g., varying in thickness over 20%), and the like. A trace may include an electrically conducting track, and may include, for example, copper, silver, gold, alloys thereof, or other metal. A trace may be used in addition to a conducting metal oxide track to reduce the electrical conductivity of an electrical connection to an electrode or portion thereof.

Irregular pixels may be used to reduce the "screen door effect", the enhanced visibility of regular visual elements such as graphic shapes, grids, and the like, for the user. Another advantage of irregular pixels may be the reduction of the "screen door effect" for external viewers, improving the appearance and perceived value of the augmented reality system. Hence, patterned electrodes may be placed closer to the viewer to enhance proximity blurring and reduce the screen door effect for external viewers (e.g., proximate people looking at an augmented reality system worn by someone else). Irregular pixels may be used where the number of dimmer pixels is less than that used by the augmented reality display. For example, a dimmer element may have as few as 4 pixels (e.g., quadrants), or a range of pixels between 4-100.

Figure 6A:
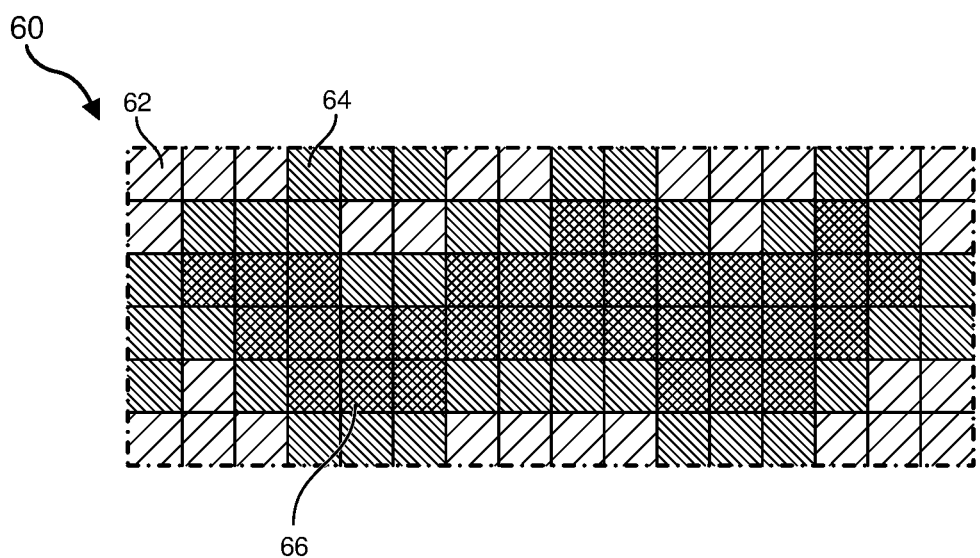
FIGS. 6A-6B depict exemplary local dimming using irregular shapes formed from a high-resolution grid pixel layout in accordance with some embodiments.

FIG. 6A depicts a portion 60 of a dimmer element having pixels such as 62, 64 and 66 that provide different levels of dimming. For example, pixel 62 may be in a non-dimming (transmissive) state (or in some embodiments a low dimming level, such as a relatively light gray). Pixel 64 has a mid-gray level. In some embodiments, pixel 66 has a dark (non-transmissive or appreciably reduced transmission) state, and in some embodiments pixel 66 may have a relatively dark gray state with a low level of transmission. Pixels may provide one or more selectable gray levels. In some embodiments, a dimmer element may use relatively small pixels, for example, pixels having a pixel pitch of less than approximately 200 μm (such as pixels having a pixel pitch similar to that of a conventional display). In some embodiments, the individual pixels are not visible to the wearer.

Figure 6B:
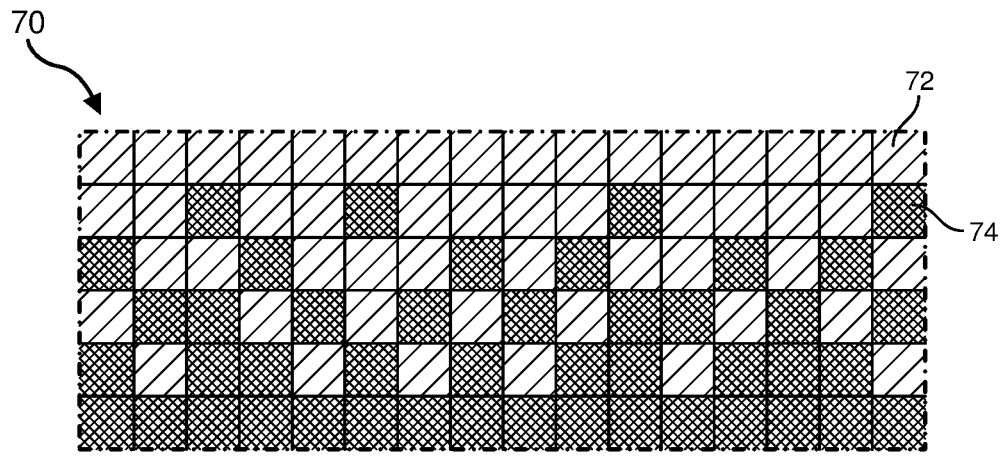

FIG. 6B shows a portion of a dimmer element 70 having light (72) and dark (74) pixels. In some embodiments, high resolution local dimming may replicate the effects of irregular pixel shapes while using a simple grid pixel layout. High-resolution local dimming may also create the impression of a smooth greyscale by using per-pixel variable dark levels and/or dithering. FIG. 6B may provide spatial dithering (a mixture of light and dark pixels) that is perceived as a gray level by a user. The darkness of a gray state may be based on the ratio of dark and light pixels within a region of the dimmer element.

In some embodiments, a device may include a display having a plurality of light-emitting regions, a dimmer element, an input aperture through which ambient light enters the device, and an output aperture through which light from the display passes. The device may be configured so that ambient light enters the device, passes through the dimmer element, and then passes through the output aperture. In some embodiments, the dimmer element may include a liquid crystal layer. The input aperture and/or the output aperture may be defined by a frame or portion thereof.

Example augmented reality systems may include a waveguide configured to receive light from an augmented reality display, and a half-mirror configured to reflect the augmented reality display light towards the eye of a user. Light may also enter the device from outside (from the local environment) and pass through a dimmer element and the half mirror and then pass towards the eye of the user. Local dimming within the dimmer element may be used to improve visibility (e.g., contrast ratio) of augmented reality image elements (e.g., text and/or graphics) from the augmented reality display to the user.

Figure 7A:
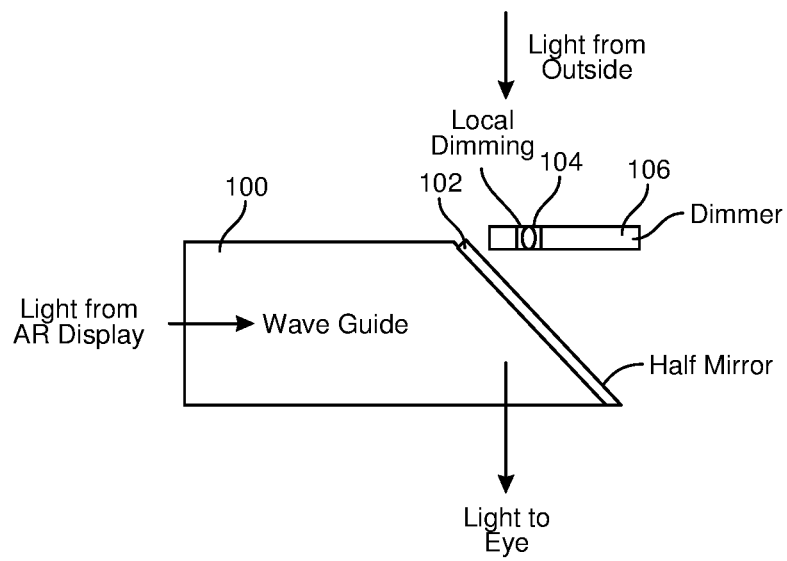
FIGS. 7A-7B show example locations of a dimmer element within an augmented reality system in accordance with some embodiments.
Figure 8:
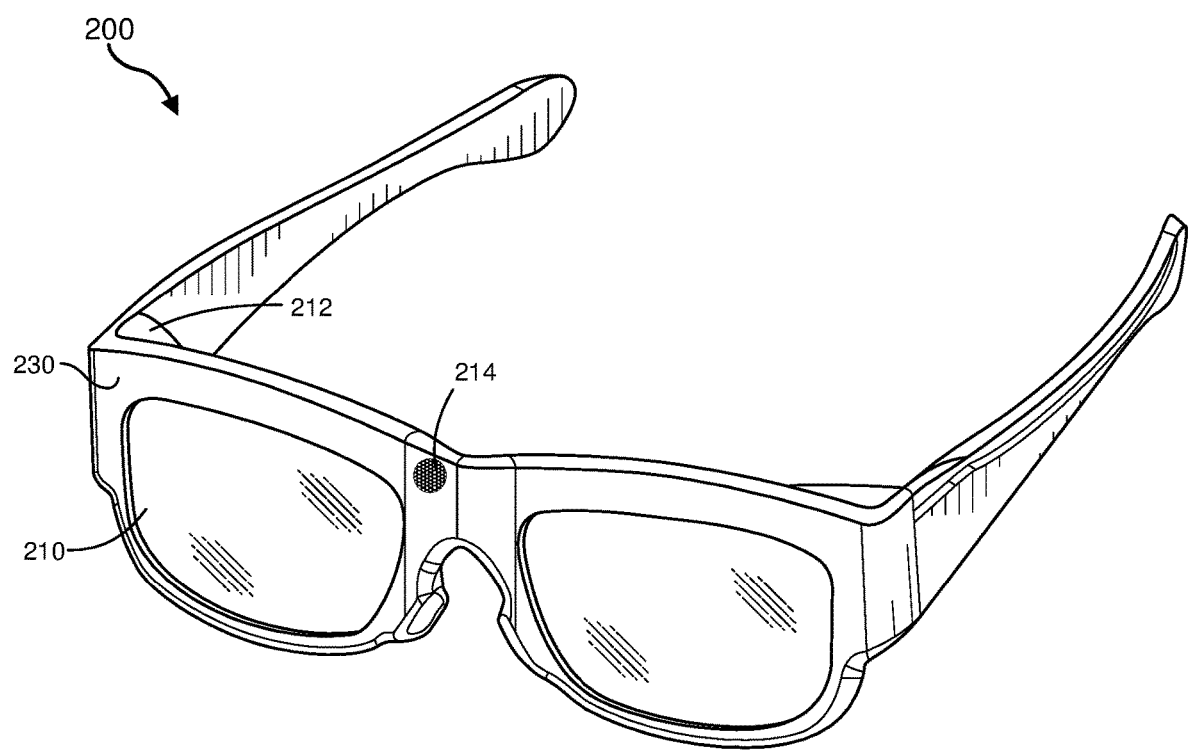
FIG. 8 shows example augmented reality goggles in accordance with some embodiments.

FIG. 7A shows a portion of an augmented reality system, including waveguide 100 configured to receive light from an augmented reality display (such as an augmented reality projection display), and a half-mirror 102, receiving light from the augmented reality display through the waveguide and light from outside through a dimmer element 106. A portion of the dimmer element denoted 104 may be relatively dark (non-transmissive or reduced transmission) to block out a portion of light from outside, which may be termed ambient light. The combination of the ambient light, and augmented reality image elements provided through the waveguide, may be passed to the eye of a user to provide an augmented reality image. The augmented reality image is a combination of the ambient image and any augmented reality image element(s). There may be additional optical components, such as focusing lenses, that are not shown for clarity.

Figure 7B:
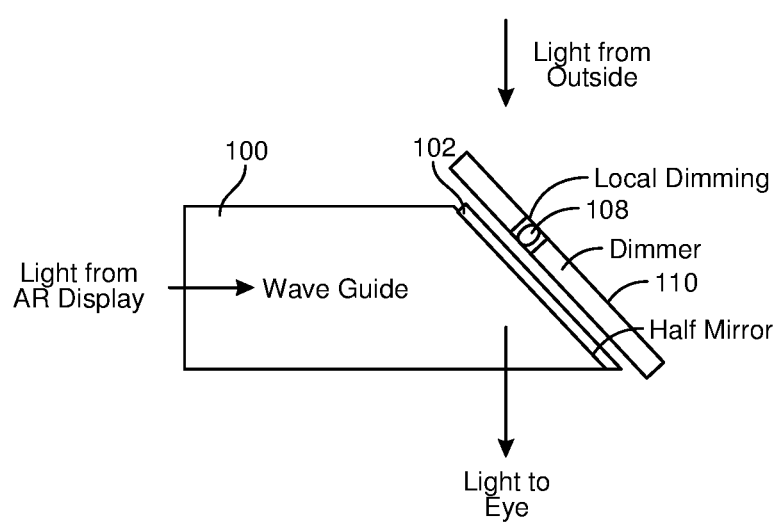

FIG. 7B shows a portion of an augmented reality system with similar components to FIG. 7A. In this configuration, the dimmer element 110 has an oblique arrangement proximate the half-mirror. Locating the dimmer element close to the half mirror (or similar light redirection element used to direct augmented reality display light to the eye) may reduce parallax effects and reduce or eliminate the need for eye tracking. Simple geometry may be used to adjust the location of the locally dimmed portion 108 to dim a desired portion of the ambient image.

In some embodiments, a control system may be used to determine the correct portion of the dimmer element to activate (e.g., switch into a gray or dark state) to provide local dimming.

FIG. 8 shows an example device, in this example augmented reality glasses 200, which may also be referred to as augmented reality goggles or spectacles. The device may include first and second dimmer elements in the respective lenses (or respective windows), such as lens 210. In some embodiments, the device may include a first dimmer element associated with the left eye of a user, and a second dimmer element associated with the right eye of a user. The dimmer element may have an outside peripheral shape conforming to the interior of a lens-holding portion of the frame 230. The frame may support an image sensor 214 and/or an eye tracker 212. In some embodiments, the term lens may include planar-planar windows used to allow light to ingress or egress from a device.

In some embodiments, the frame of an example device may support an image sensor and/or an eye-tracker. An image sensor may be used to determine relatively bright portions of the outside view (the ambient image), which may be preferentially dimmed by a dimmer element to prevent the ambient image from exceeding a predetermined brightness threshold. In some embodiments, a device may include an image sensor configured to determine an intensity of the ambient light as a function of direction, wherein the dimmer element is selectively controlled based on one or more directions from which the intensity of the ambient light exceeds a threshold intensity. In some embodiments, the device may include an eye tracking system, for example, configured to determine gaze direction for one or both eyes. For example, an eye tracker may include an image sensor system configured to determine a location of an eye pupil based on image data relating to the eye of the user, and may be configured to determine gaze direction, for example, based on a location of the pupil relative to a reference location. The dimmer element may be controlled based on the determined gaze direction, or in some embodiments based on the data obtained from the image sensor. In some examples, image sensor data may be used to determine the location and/or color of an augmented reality image element within an ambient image. For example, if the ambient image includes a blue sky, the augmented reality image element may be formed using colors that contrast with blue, such as red, orange, or other contrasting color.

In some embodiments, hybrid photochromic/liquid crystal dimming may be used to enhance the performance of a headset, such as an augmented reality headset. Seeing augmented reality image elements (such as augmented reality graphics) over a bright or busy background may be challenging. In some embodiments, an improved headset may switch between a purely virtual image and an augmented reality image. An augmented reality image may include an image of the local environment, here referred to as an ambient image. The ambient image may be an image of the local environment, which may also be described as the outside world or as the real world. In some embodiments, global dimming may be used to block the image of the local environment, for example, to provide a purely virtual reality image. In some embodiments, local dimming may be used to block a portion of the outside world. In some embodiments, an image of the local environment for outdoor use may be orders of magnitude brighter than for indoor use. The augmented reality image element may be brightened in such cases, but there may be limits to the maximum brightness of an augmented reality image element. In some embodiments, a portion of the image of the local environment is dimmed (reduced in intensity) to facilitate viewing of the augmented reality image element. Advantages may include enhanced readability (e.g., of text), reduced eye strain, a lower chance of important information being not noticed, and a lower chance of a graphic icon being misunderstood, for example, mistaken for another. Also, solar radiation provides a source of UV light that can be used to passively augment other features of a dimmer element.

Some liquid crystal devices change UV transmission when they change state or orientation, for example, due to inherent UV absorption of the LC material and/or the inclusion of one or more UV-absorbing, visible-transparent dyes. A pixelated LC shutter may be used as a pixelated UV shutter. In addition, LC shutters may be switched actively, for example, to define a region of a display for local dimming, or to select a region for selective UV transmission.

In some embodiments, a photochromic film may be used to achieve or enhance either local or global dimming. A photochromic film allows passive switching for outdoor environments, where for example, the degree of absorption may depend on the local brightness. A photochromic compound may switch from one absorption spectrum to another in response to incident light. For example, a photochromic material may absorb UV light (and/or, in some embodiments, blue and/or violet light) and change from a clear state to a dark state. A photochromic material in the dark state may revert back to a clear state in the absence of UV light, a process that may be sped up using additional heat or another wavelength of electromagnetic radiation. A photochromic material may take longer to return to clear state in a cold environment, and may not achieve a fully dark state in a hot environment, as the UV-induced transition to the dark state is counteracted by a continuous thermally-induced rapid reversion to the clear state. Some photochromic compounds may use light of different wavelengths to drive transitions to both the dark and clear states, so that ambient temperature has little or no effect on transition speed and steady-state properties. A photochromic compound can be included in a device or component thereof, for example, a dimmer element, as a thin film or coating, or incorporated into a liquid crystal layer (e.g., by introducing photochromic molecules into a liquid crystal mixture, including photochromic moieties in a liquid crystal molecular species, or by dispersing the photochromic material throughout a matrix material containing the liquid crystal, e.g., through the polymer matrix of a polymer-dispersed liquid crystal). In some embodiments, a photochromic material may be dissolved in a liquid crystal material, and in some embodiments a photochromic material has anisotropic properties which may be aligned with the liquid crystal.

In some embodiments, a photochromic layer is placed on one or more of the more outer surfaces of a multilayer structure. In some embodiments, the photochromic layer darkens in response to a light of a particular wavelength or wavelength range (such as UV light). The photochromic layer may revert back to a clear state in response to, for example, visible and/or infrared light, or thermal relaxation. A photochromic layer may be entirely passive, or may be actively driven, or transitions to dark and/or clear states may be assisted by light sources located proximate the photochromic layer. For example, IR and/or visible and/or UV light-emitting diodes may be arranged around the photochromic layer, and energized as needed. In some embodiments, a photochromic layer may operate in a selectable mode, and the mode may be switched between active and passive modes as desired. An active control for a photochromic layer may include a pixelated liquid crystal layer, such as a UV shutter, which may determine which regions of the photochromic layer are exposed to light In some embodiments, a liquid crystal shutter is located between a display layer and a photochromic layer. The liquid crystal shutter may be pixelated, or the entirety of the shutter, or portions thereof, may be switched using one or more electrodes. A UV-blocking layer may be placed between an LC shutter layer and a photochromic layer, and/or elsewhere in a multilayer structure.

There may be other advantages of the multilayer structures described herein. UV light can degrade the performance of certain LC types, so a UV-switching photochromic layer may help protect the LC layer from degradation. A photochromic layer may turn darker in the presence of bright light, such as sunlight, and revert to a clear state when the bright light is removed. This can provide a fast response to a brightness increase when most needed.

In some embodiments, a photochromic layer may add an analog dimming, based on the outside brightness, to any local dimming using a liquid crystal dimmer element. This may improve visibility of a scene, even in the absence of local dimming.

In some embodiments, photochromic molecules may be linked to liquid crystal molecules. In some embodiments, a liquid crystal may include mesogenic molecules including one or more photochromic groups. In some embodiments, a photochromic layer is in a clear state (with maximum transmission) in the absence of appreciable UV radiation, and achieves a gray or dark state when exposed to UV light or bright visible light. In some embodiments, a photochromic layer may have a gray state (a state with an absorption intermediate between dark and clear states), where the absorption of the gray state is based on, for example, proportional to, the intensity of incident UV and/or visible light.

In some embodiments, a liquid crystal layer reorients in response to an applied electric field, for example, from a first state to a second state. The first state or the second state may be a twisted nematic state, and the other state may be a non-guiding state. In some embodiments, the first state or the second state may be a light (optically transmissive) state, and the other state may be a dark (optically absorbing) state. In some embodiments, the first state or the second state may be a scattering state (e.g., using a polymer-dispersed liquid crystal). In some embodiments, the first and second states may have different optical absorptions due to reorientation of a dye within the liquid crystal (e.g., using a guest-host liquid crystal). In some embodiments, switching from a first state to a second state changes the optical cross-section of a photochromic material in relation to environmental light, allowing the molecules to absorb a greater fraction of light. For example, photochromic molecules may be reoriented by the electric-field induced switching of a host nematic LC. Liquid crystal reorientation may provide effects such as a change in absorption (e.g., optical absorption), transmission, scattering, diffraction, or reflection, in addition to (or as an alternative to) any changes in the photochromic response. In some embodiments, a liquid crystal shutter may include one or more polarizer layers.

A liquid crystal layer including a dye, for example, a guest-host liquid crystal shutter, may have a relatively small absorption in the clear state (which may also be referred to as the transmissive state) due to the presence of the dye, and an appreciably greater absorption on the "dark" state (which may also be referred to as the absorbing state, or reduced transmission state). In some embodiments, the dark state, having appreciably greater absorption than the clear state, may have a distinct color, for example, related to the absorption properties of any dye(s) present. The color of a displayed augmented reality image elements may be selected to be in contrast to the absorption. For example, the displayed color of the augmented reality image elements may have wavelengths within an absorption band of a dye. In some embodiments, any visually perceptible effect of clear state absorption may be reduced or eliminated using, for example, a photochromic material.

In some embodiments, the liquid crystal layer may include photochromic materials, such as photochromic molecules within the liquid crystal material. The photochromic molecules need not be attached to liquid crystal molecules. However, in some embodiments, a liquid crystal material may include mesogenic molecules (such as nematogens) that have a photochromic group attached thereto. In some embodiments, a molecular photochromic material may be modified to have a liquid crystal phase, for example, through addition of chain groups (e.g., alkyl, alkyloxy, and the like) and/or polar groups (such as cyano-, fluoro-, and the like). In some embodiments, a photochromic response may occur independently from the switching of a liquid crystal shutter. In some embodiments, a compact structure may be obtained by combining a switchable liquid crystal material and photochromic material into a single layer.

In some embodiments, a local photochromic dimming may be obtained using an active liquid crystal layer that absorbs, reflects, or transmits UV depending on state. In some embodiments, a UV absorbing or reflecting layer, which may be switchable, may be used to prevent a photochromic layer from unwanted passive switching.

Examples also include approaches to reducing the visibility of gaps between pixels in liquid crystal dimmer elements used for local dimming. Gaps in dimmed regions are more visible than thin dark regions, so the appearance of a dimmer element may be improved by providing thin dark regions (which need not be switchable) that hide the relatively bright gaps between dark pixels. Examples include placing dark (e.g., unswitchable) regions over the gaps between pixels, for example, electrically conducting traces, dark lines, and the like. In some embodiments, gaps between pixels may be aligned with other opaque elements (such as eye tracking VCSELs and metal traces). In some embodiments, two dimmer elements are provided that are overlapped to eliminate gaps, but with not so much overlap that obvious artifacts are seen. This approach may include varying the absorption profile across a pixel to reduce the contrast between overlapping and non-overlapping regions. In some embodiments, a plurality of layers, such as two, three, four, or greater than four offset pixelated layers, may be overlapped to improve the dark state.

Figure 9A:
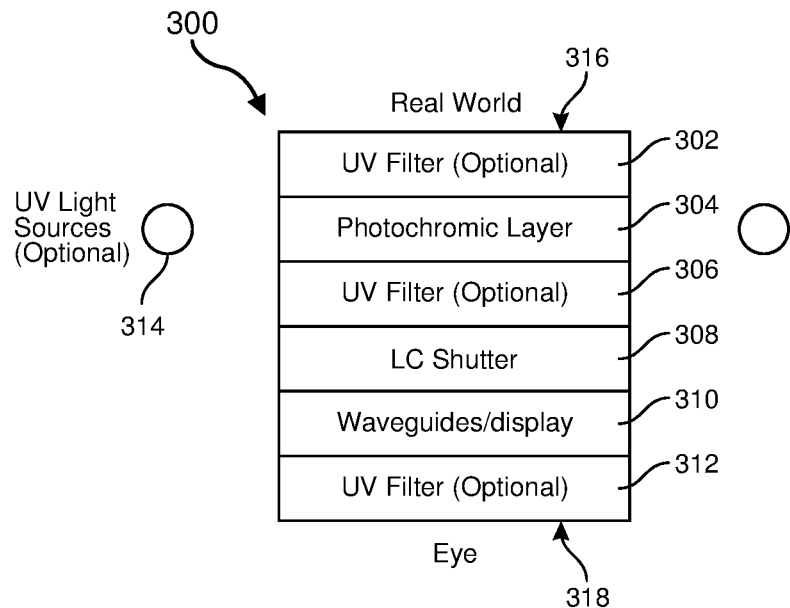
FIGS. 9A-9B show multilayer structures in accordance with some embodiments.
Figure 9B:
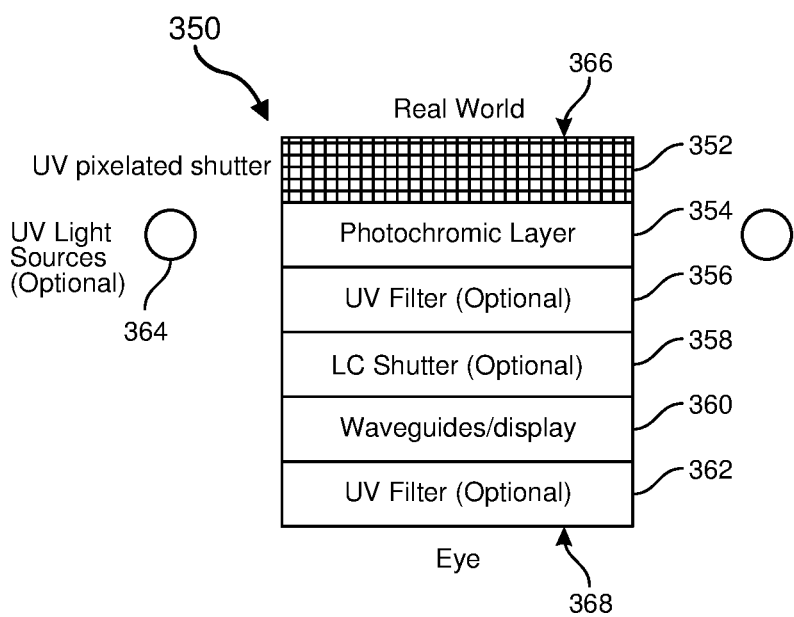

FIGS. 9A-9B show multilayer structures in accordance with some embodiments. FIG. 9A shows a multilayer structure that may be used, for example, as a component of an augmented reality system. The multilayer structure 300 includes an optional UV filter layer 302, a photochromic layer 304, another optional UV filter layer 306, an LC shutter 308, an augmented reality display/waveguide 310, and another optional UV filter layer 312. The multilayer has an exterior surface 316 configured to face towards the local environment and an exterior surface 318 configured to be proximate the eye of a user, when the multilayer structure is used in an augmented reality system. Optional UV light sources 314 are disposed around the photochromic layer 304.

FIG. 9B shows another multilayer structure that may be used, for example, as a component of an augmented reality system. The multilayer structure 350 includes a UV absorbing or reflecting pixelated shutter 352, a photochromic layer 354, an optional UV filter layer 356, an optional LC shutter 358, an augmented reality display/waveguide 360, and another optional UV filter layer 362. The multilayer has an exterior surface 366 configured to face towards the local environment and an exterior surface 368 configured to be proximate the eye of a user, when the multilayer structure is used in an augmented reality system. Optional UV light sources 364 are disposed around the photochromic layer 354.

FIGS. 10A-10D show arrangements of multilayers within a dimmer element in accordance with some embodiments.

Figure 10A:
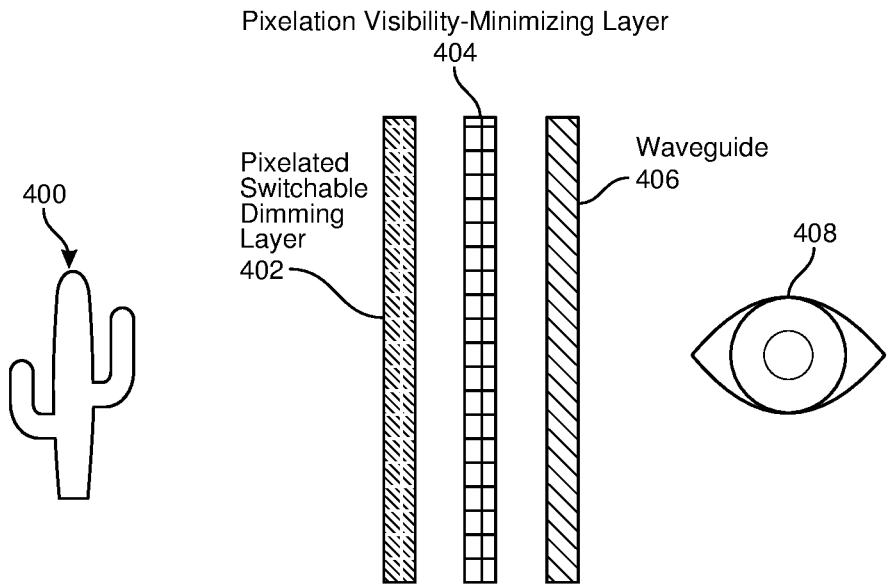
FIGS. 10A-10D show arrangements of multilayers within a dimmer element in accordance with some embodiments.

FIG. 10A illustrates an arrangement configured to reduce visibility of the pixelation of pixelated optical shutters. The figure may illustrate an arrangement of stacked layers. FIG. 10A shows a pixelated optical shutter layer 402 (e.g., a liquid crystal shutter), a pixelation visibility reduction layer 404, For example, in a liquid crystal shutter, there may be a light grid-like pattern within the pixelated optical shutter layer 402, for example, due to gaps between electrodes or other factors. This may be perceived by a user when the pixels are in a dark state. A pixelation visibility reduction layer 404 includes a dark grid that is in register with the light grid of the optical shutter layer 402. In some embodiments, a dark grid against a light grid may be visually more acceptable than a view of a light grid against a dark background. Hence, the pixelation visibility reduction layer 404 may improve user experience with the optical shutter. The waveguide element 406 is used to introduce augmented reality image elements onto the view of the local environment (symbolized by cactus 400) and the combination of the view of the local environment and the augmented reality image element(s) (if any) are provided to the field of view of the user, designated by eye 408.

In some embodiments, this arrangement of pixelated layers, in a dimmer element, may be used in an augmented reality system. The augmented reality system may include one or more of a waveguide, a holographic combiner, or other optical element configured to direct light from the display to the eye of the user. The local dimmer components may be located between, for example, the optical combiner and the outside world, and not in the light path for augmented reality image elements. (However, in some examples the dimmer may be located between the optical combiner and the eye of a user, in normal use). The pixelation visibility reduction layer may be placed close to the eye to improve hiding of the gaps between dark pixels. In some embodiments, the dimmer element is placed outside of the path of the augmented reality image element (e.g., between the combiner and the outside), but the pixelation visibility reduction layer is placed closer to the eye in the path of the augmented reality image element (e.g., between the combiner and the eye). In some embodiments, a pixelation visibility reduction layer may be placed between the outside world and the dimmer element in addition to or instead of a pixelation visibility reduction layer located elsewhere in the system. Also, positioning and/or additional layers may be used to reduce how visible the lines in the pixelation visibility reduction layer are to the outside world.

Figure 10B:
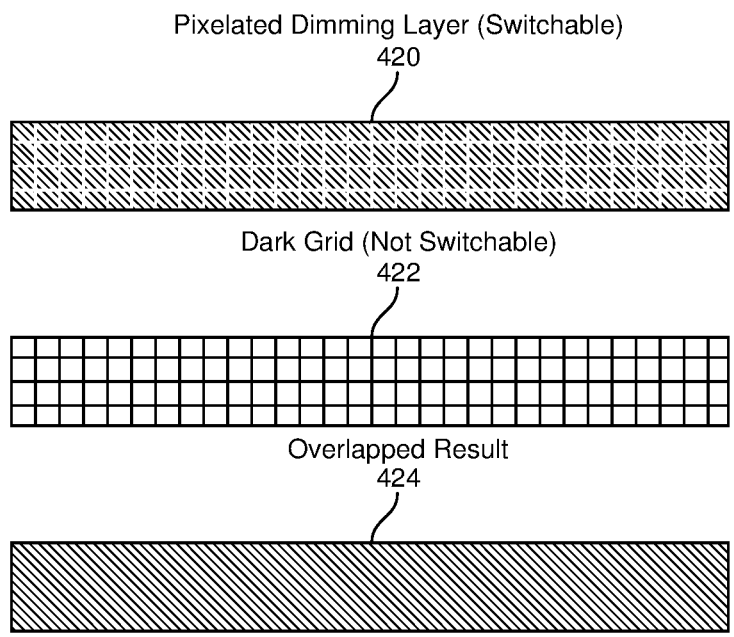

FIG. 10B illustrates that the visual combination of a dark optical shutter with a white (transmissive) grid (e.g., provided by a pixelated dimming layer) 420, and a dark (opaque) grid (e.g., provided by a pixelation visibility minimization layer) 422 provides a uniform dark field 424. As noted above, when the optical shutter is in a clear state, the dark (opaque) grid stands out against a bright background. However, as this is close to the eye, for example, in an augmented reality application, the dark grid may not be easily perceptible. However, a light grid on a dark background may be readily visually perceptible (even if somewhat blurred). Hence, this approach improves the user experience of the augmented reality device.

The light gaps between dark pixels may be more apparent to a viewer than narrow dark lines against a light background. The light gaps may be hidden by permanent dark lines, which may be located on a different layer of a multilayer structure. The illustrated example shows a grid of dark lines, but the pixelation visibility reduction layer may include dark lines to match the gaps between any pixel size and shape. In some embodiments, the dark lines are matched to the color and absorption of the dimmer pixels in the dark state, for example, having an optical transmission in the range 6%-30%.

Figure 10C:
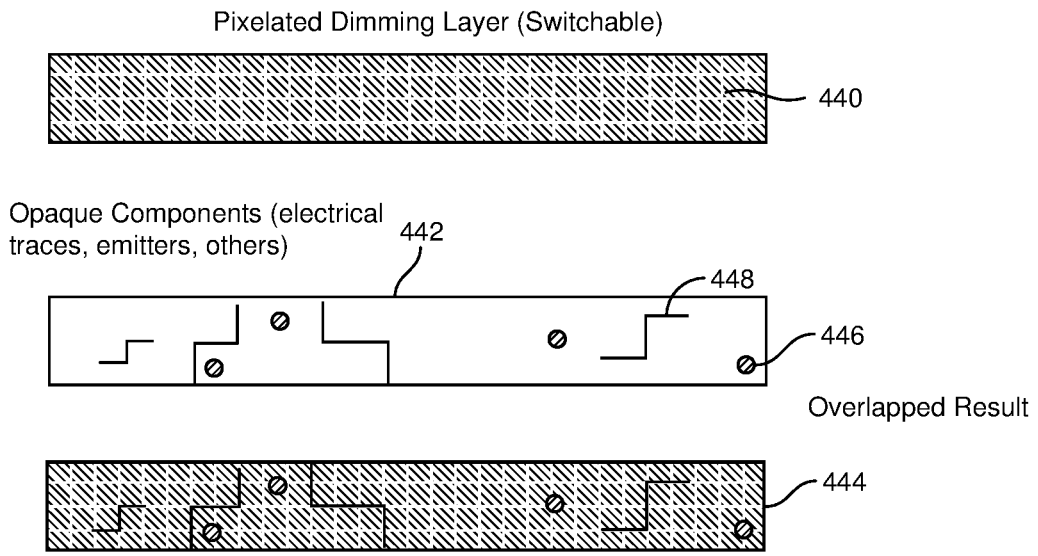

FIG. 10C illustrates how a component layer 442 including opaque components (such as electrically conductive traces, or electrical components such as transistors, laser modules, capacitors, and the like) may be used to at least partially block the light pattern of a pixelated dimmer element shown at 440 when the dimmer element is in the dark state. The component layer 442 may include opaque or otherwise light-absorbing elements. In this example, the component layer 442 includes an electrically conductive trace 448 and an electrical component 446 (such as a transistor, laser module, diode, light-emitting diode, capacitor, resistor, or the like). The arrangement of components may be configured to block at least part of the grid of light leakage around the dark pixels. For example, an electrically conductive trace may be spatially located to block light leakage, for example, by including one or more sections aligned with (e.g., in register with) gaps between pixels in a liquid crystal shutter.

The gaps between dimmer pixels in the dark state can also be hidden by electronic components from other layers, such as an optional eye tracking layer, which may be closer to the eye than the dimmer element and have metal traces and laser modules (e.g., VCSELs). Additional dark lines may be added where gaps are not already covered by opaque components. Pixel edges and opaque components may be arranged so that components (such as lasers) and electrically conducting traces are located to cover gaps between pixels in the dimmer element.

Figure 10D:
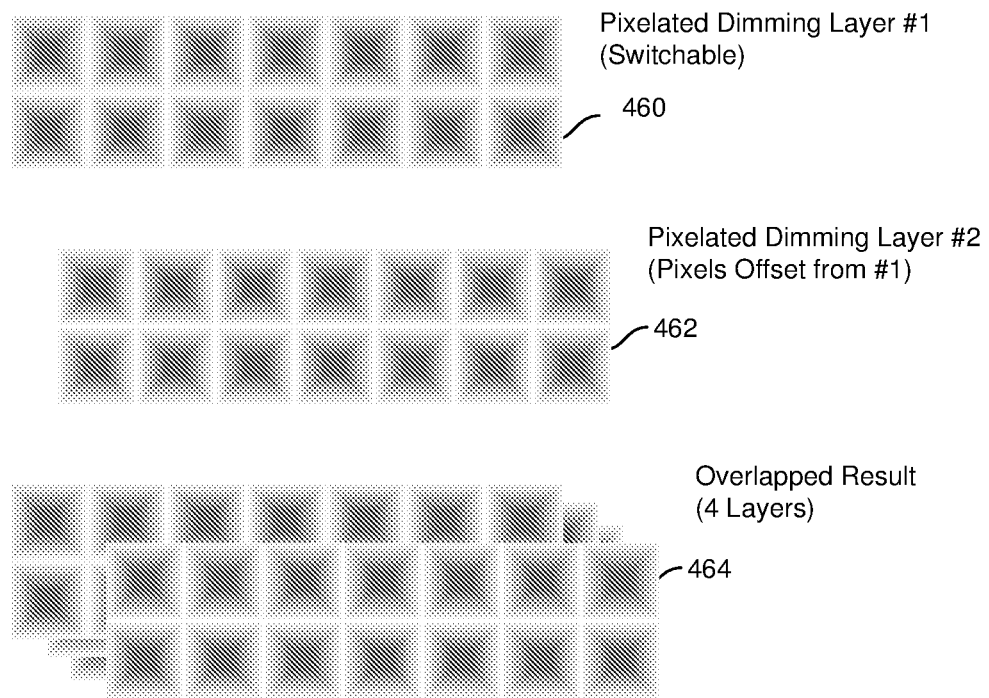

FIG. 10D illustrates how a lateral offset between two optical shutters can reduce the light leakage in the dark state of a dimmer element. The pixelated dimmer layer 460 is in a dark state, though has light leakage around the square dark pixels. The second pixelated dimmer layer 462 has similar properties. However, by introducing a lateral offset between the two dimmer layers, an improved dark state 464 may be obtained with reduced light leakage. The lateral offset may be a fraction of a pixel pitch, for example, between 0.05 and 0.5 of a pixel pitch, and may be approximately equal to the gap between the pixels, or one half the pixel pitch, or another offset distance used. The lateral offset may be along one or both orthogonal directions parallel to the plane of the electrodes, for example, there may be a horizontal and/or vertical lateral offset of the second dimmer layer 462 relative to the first dimmer layer 460. The figure shows the improved dark state using four offset pixelated layers.

In the illustrated example, the overlapped combination results in a somewhat nonuniform dark state. In some embodiments, a spatial variation of pixel darkness may be used to enhance dark state uniformity. The gradient could be linear or nonlinear (quadratic, Gaussian, and the like) and may change depending on the pixel, and the pixel shapes may also vary in shape and/or size. Pixels on different layers could be smaller or larger depending on how close to the eye the pixels are, as pixels closer to the eye can be smaller while blocking the same area of vision as a more distant larger pixel.

FIGS. 11A-11G show the use of photochromic materials in accordance with some embodiments. These approaches include various versions of what may be termed a hybrid dimming approach that uses both photochromic materials and liquid crystal layers. In some embodiments, a photochromic element may be added to a pixelated LC based dimmer element, for example, a dimmer element as described elsewhere herein. In some embodiments, a layer may be used to absorb and/or reflect UV, but let through visible light.

Figure 11A:
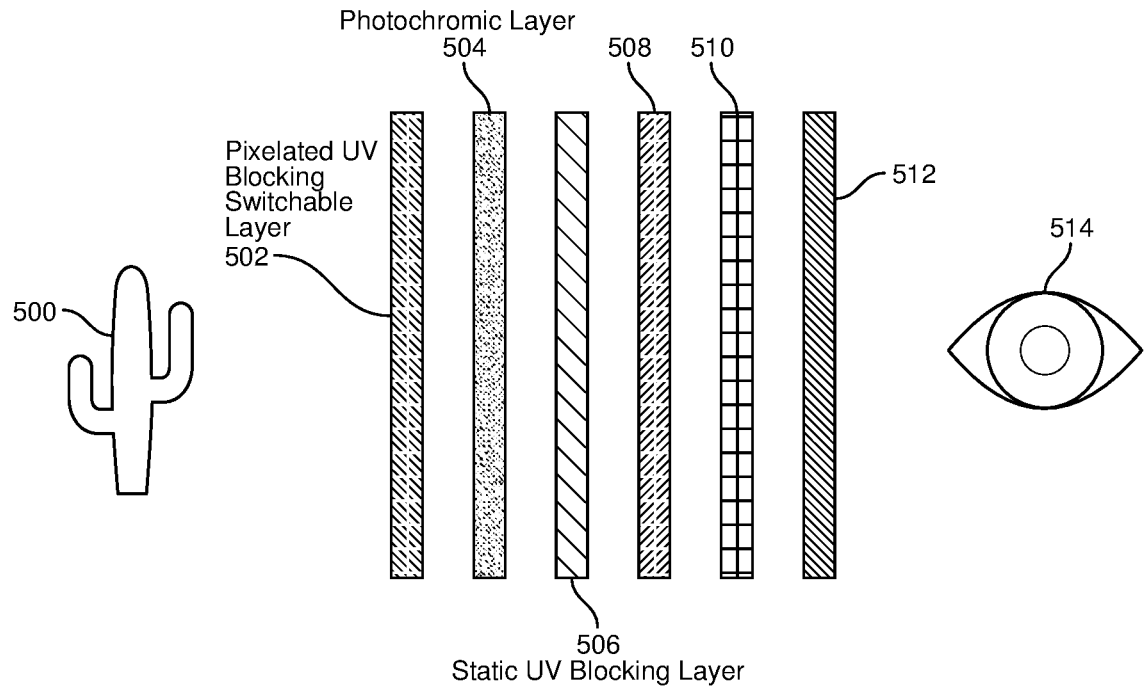
FIGS. 11A-11G show the use of photochromic materials in accordance with some embodiments.

FIG. 11A shows a multilayer arrangement including pixelated UV blocking layer 502, photochromic layer 504, static UV blocking layer 506, pixelated dimmer layer 508, pixelation visibility reduction layer 510, and optional UV blocking layer 512. The local environment (outside world) is represented by the cactus 500, and the user side is represented by the eye 514.

Figure 11B:
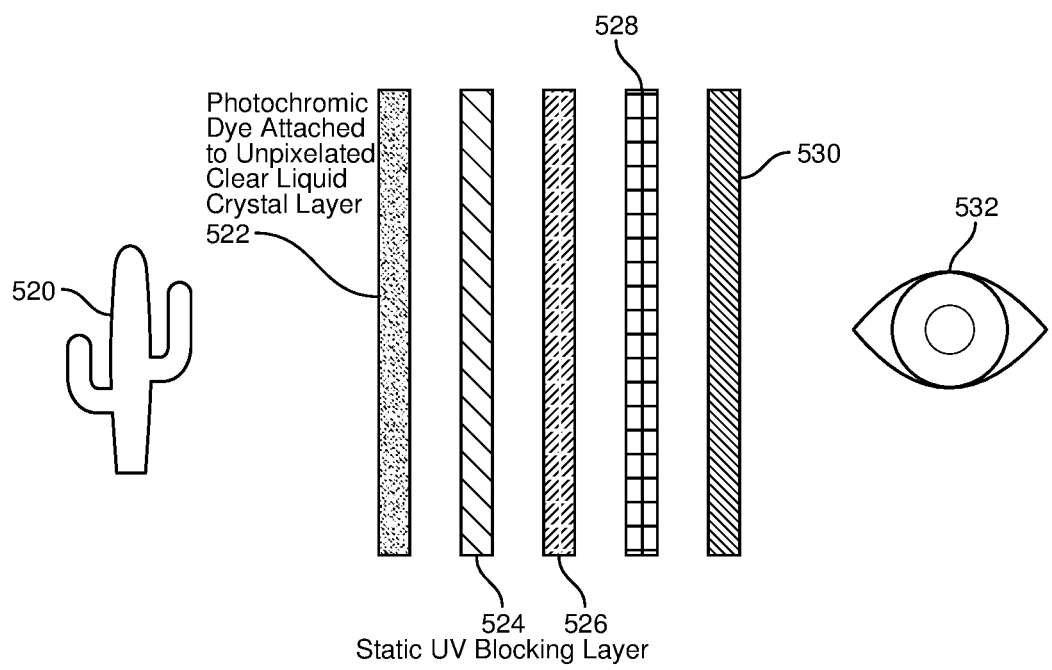

FIG. 11B shows a multilayer arrangement including a photochromic liquid crystal layer 522, a UV blocking layer 524, a pixelated dimmer layer 526, a pixelation visibility reduction layer 528, and an optional UV blocking layer 530. In example augmented reality applications, the layer 530 is closest to the eye 532 and the combined layer 522 is closest to the local environment 520 (and may be termed the outermost layer in such applications).

In some embodiments, photochromic liquid crystal layer 522 is unpixellated. A photochromic liquid crystal layer may include a photochromic dye within a liquid crystal layer, or may include liquid crystal molecules including a photochromic moiety. In some embodiments, a photochromic liquid crystal layer may include a separate photochromic and liquid crystal layers.

Figure 11C:
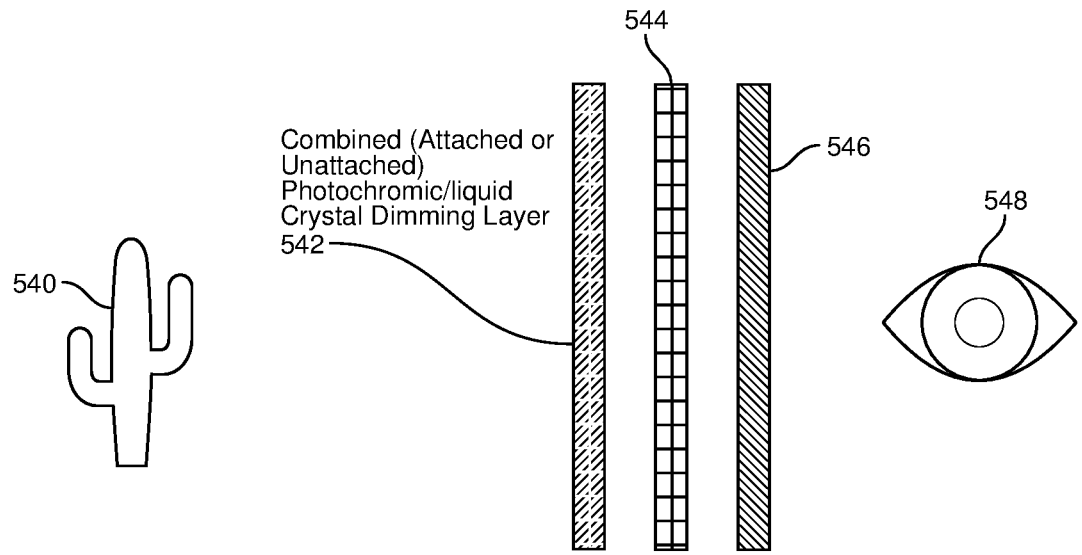

FIG. 11C shows an arrangement including pixelated photochromic liquid crystal layer 542, a pixelation visibility reduction layer 544, and a UV blocking layer 546. In example augmented reality applications, the UV blocking layer 546 is closer to the eye 548 and the pixelated photochromic layer is closer to the outside 540.

Figure 11D:
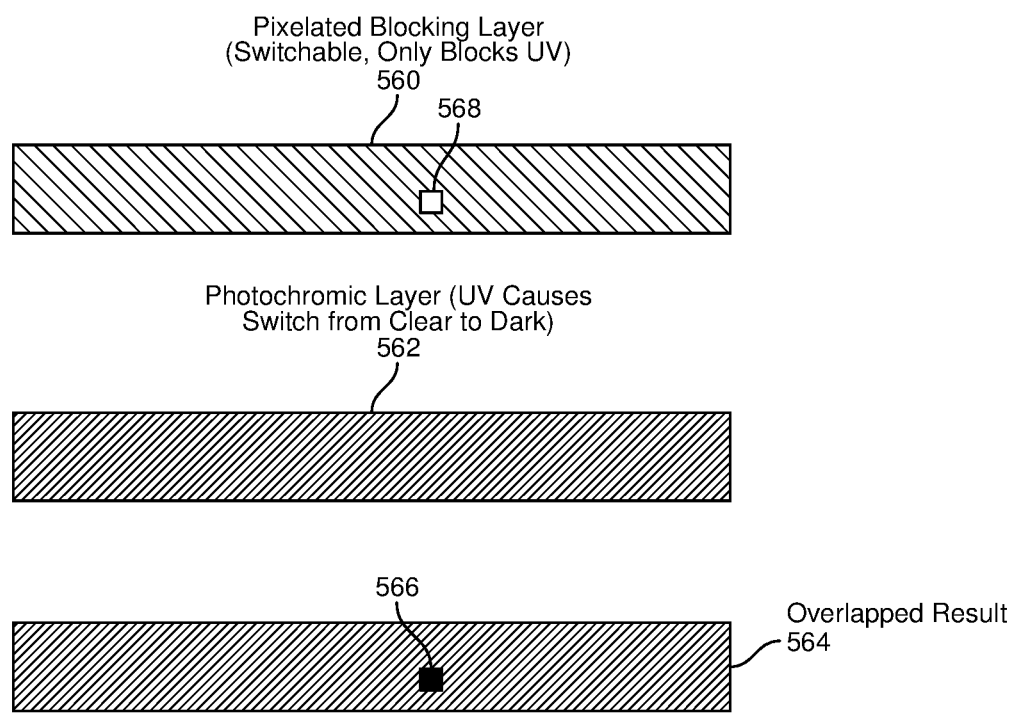

FIG. 11D shows an arrangement including a switchable pixelated UV blocking layer 560, and a photochromic layer 562. When overlapped as show at 564, the UV that passes through UV-transmissive region (e.g., pixel) 568 of the UV blocking layer induces a dark region in the photochromic layer which provides local dimming. The UV blocking layer is generally transmissive to visible light, and so the combination provides a dark region 566 within a clear or light gray background. Some absorption may result from the UV blocking layer and/or the photochromic layer, so there may be a relatively minor degree of dimming in the light gray region around the dimmed region 566.

Figure 11E:
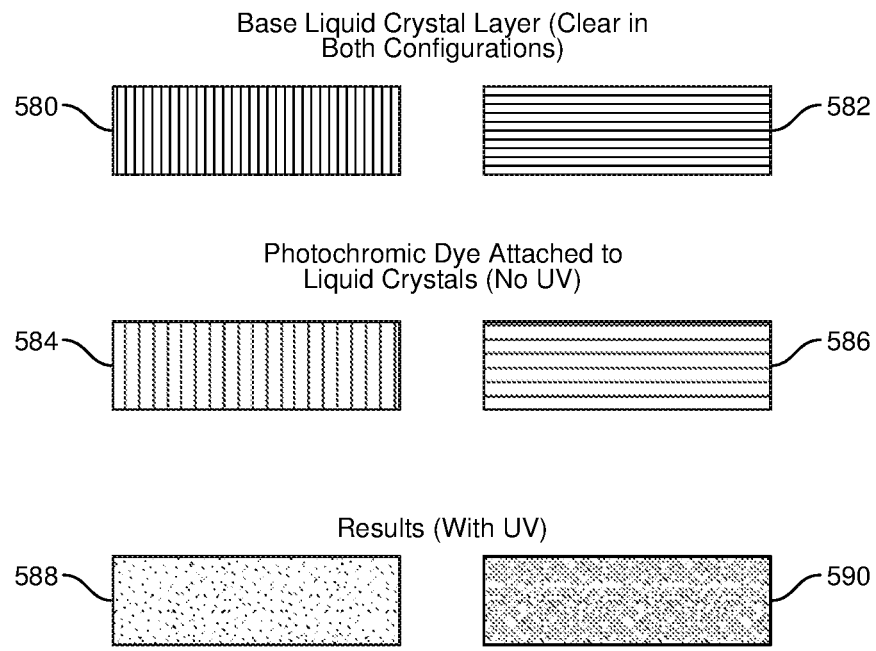

FIG. 11E shows a representation of the response of at least a portion of a multilayer structure. A multilayer structure may include a liquid crystal layer 580 having a second alignment state 582. A photochromic dye may be attached to the liquid crystals, resulting in a photochromic liquid crystal layer 584 having a second alignment state 586. If light, after passing through the liquid crystal layer (580 or second state 582), has a wavelength suitable for inducing absorption in the photochromic liquid crystal layer, then a dark state may be obtained as shown at 590. Otherwise the photochromic layer may be relatively clear, as shown at 588. In some embodiments, the liquid crystal layer may have a twisted configuration that rotates the plane of polarized light through 90 degrees, and a switched state 582 that may not rotate the plane of polarized light. If incident light is of the appropriate polarization to be rotated through 90 degrees by the twisted configuration of the liquid crystal layer, then other components surrounding this layer may cause light not absorbed by the photochromic liquid crystal layer to be either blocked or transmitted.

This approach may also use a pixelized LC layer. The LC layer may be used to reduce the impact of a dark state photochromic layer when the dark state is not desired (such as after returning indoors). In some embodiments, the photochromic layer is not entirely clear in the presence of UV when the liquid crystals are oriented to minimize the absorption cross-section of the dye, but transmission may be higher than in some other liquid crystal configurations.

Figure 11F:
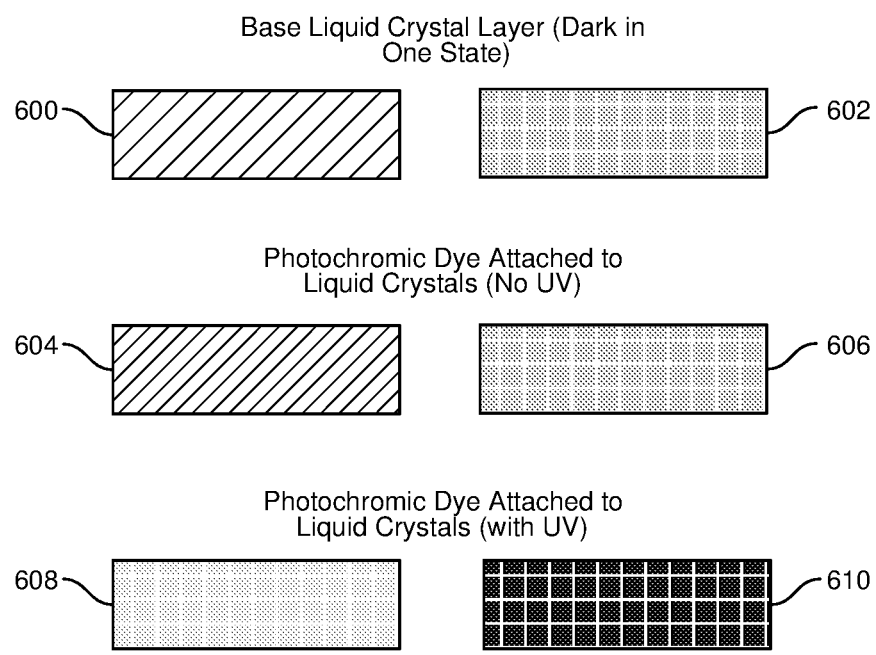

FIG. 11F shows a liquid crystal layer 600 (having a dark switched state as represented at 602). A photochromic dye may be attached to the liquid crystals, resulting in a photochromic liquid crystal layer 604 (still having a dark state in the absence of UV as represented at 606). The combination also allows a lighter state 608 or a darker state 610 in the presence of UV.

Figure 11G:
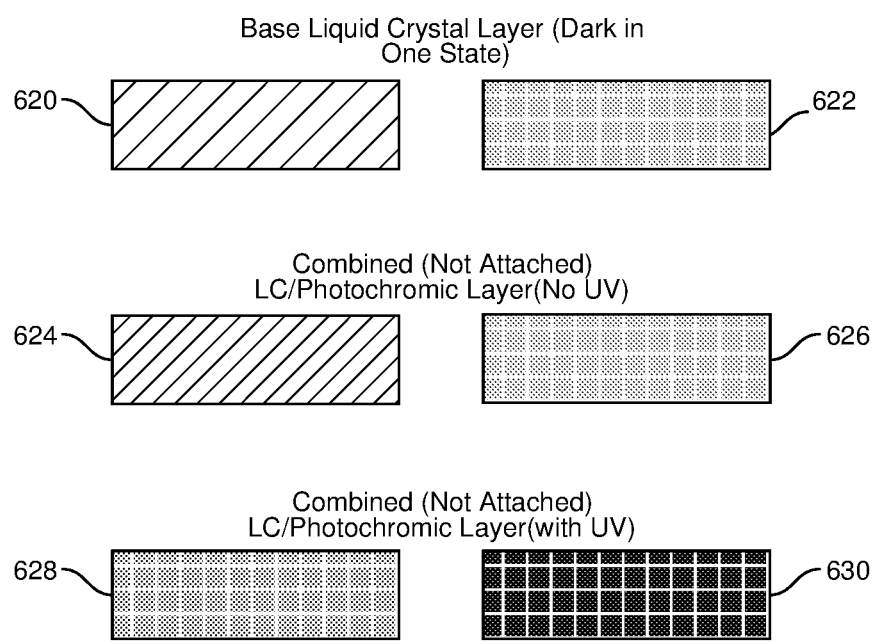

FIG. 11G shows a liquid crystal layer 620 (dark in a switched state as represented at 622). A photochromic dye may be added to this liquid crystal layer without being attached to the liquid crystals, resulting in a combined photochromic/liquid crystal layer 624 (having a dark state in the absence of UV as represented at 626). The combination of the two materials allows a partially dimmed state in the presence of UV 628 and a dark state in the presence of UV 630.

FIGS. 11F and 11G both illustrate approaches to achieving different shades of dimming depending on the environment and need. For example, the photochromic layer might reach a sufficiently dark state from the UV present on a cloudy day, in which case, the additional liquid crystal dimming is not needed. In other conditions, the environment or glasses might be sufficiently warm that a thermally-sensitive photochromic material might not darken sufficiently, in which case additional liquid crystal dimming may be provided. In some embodiments, an electrically-conductive element, such as a transparent electrode, may be used as a local heater to heat up a photochromic layer and reduce the time needed for the photochromic material to revert to a clear state (e.g., in the absence of UV). In some embodiments, waste heat from other device components may be directed to a photochromic layer to facilitate reversion to a clear state.

FIGS. 12A-12C show representative photochromic materials that may be used in dimmer elements in accordance with some embodiments. FIG. 12A shows diarylethene photochromic materials that may be switched to a second state using UV and may revert back to the first state under visible illumination. FIG. 12B shows azobenzene photochromic materials that may be switched to a second state using UV and revert back to the first state under a combination of light and/or heat. FIG. 12C shows example spiropyran materials (e.g., thiospiropyrans or nitrospiropyrans). Other example photochromic materials may include oxazine (e.g., which switches to a dark second state using light and reverts back to a clear first state under heat), napthopyrans (e.g., which switches to a dark second state using light and reverts back to a clear first state under heat), derivatives and other combinations of materials mentioned herein, and the like.

In some embodiments, blue or violet light may be used to induce the second photochromic state (e.g., the dark state), instead of, or additional to, the use of UV.

In some embodiments, a photochromic material may be present as a layer. In some embodiments, a liquid crystal layer may include a photochromic material. If the photochromic material is anisotropic, it may be aligned by the liquid crystal. In some embodiments, a liquid crystal material may include molecules (such as nematogens) having a photochromic moiety.

FIG. 13 shows an example method of local dimming, including collecting a real world (RW) image at 700 (this may also be termed collecting an ambient image), generating an augmented reality image element at 702, combining the augmented reality image with the ambient image (e.g., the outside image, which may also be termed a real-world image) at 704, and selectively dimming a portion of the ambient image to enhance the visibility (e.g., which may include one or more of the following; contrast (e.g., the color contrast and/or brightness contrast), increased user perception and/or comprehension, readability, reduced user awareness time, reduced user comprehension time, or reduced user eyestrain) relating to the augmented reality image element at 706.

In some embodiments, a device, such an augmented reality headset, may include a liquid crystal shutter. In some embodiments, the liquid crystal shutter may be globally dimmed, and the entire LC shutter may turn gray or dark. Global dimming may be used to improve the visibility of augmented reality image elements that span the entire field of view. A global shutter may also be used to reversibly convert an augmented reality headset (such as augmented reality goggles) into a virtual reality (VR) headset, by blocking the path of ambient light so that an ambient image is not formed. An LC shutter can provide any of several states, such as clear (sometimes called a light state), one or more gray states, a dark state (sometimes called an absorbing state), or may be absorbing (e.g., of one or more colors, e.g., due to the presence of a dye), scattering, reflective, or deflective (e.g., due to the presence of a wedge-shaped optical element or beam steering device), photochromic (e.g., due to the presence of a photochromic material such as a dye oriented by the liquid crystal), or a combination of one or more states such as absorbing and scattering. The LC state can be controlled via capacitor-like structures including, for example, spaced-apart transparent electrodes, which may be provided by patterned electrically conducting materials. For example, a liquid crystal shutter may have transparent substrates having patterned electrodes disposed on the inner surfaces thereof. By pixelating a transparent conductor on one or both sides of the LC layer, specific regions can change state independent of other regions. In some embodiments, duty cycle modulation may be used to determine a degree of dimming. For example, the proportion of time a pixel is in a dark state may determine the perceived darkness of an effective gray level achieved by switching a pixel between light and dark states. LC shutters that may be used include twisted nematic (TN) shutters. Electrical addressing may use active matrix addressing, passive matrix addressing, or direct electrical connections to dimmer pixels. LC shutters may also include vertically aligned nematic devices, bistable nematic devices, and/or other LC phases such as choloesterics, smectics, and the like.

In some embodiments, an eye tracker may be used to determine the perceived position of dimmed pixels, based on the direction of gaze in relation to the augmented reality component and view of the local environment. In some embodiments, a dimmer pixel may be sufficiently proximate the augmented reality display that eye tracking is not needed. In some embodiments, an augmented reality display may be used to project augmented reality image elements into the eye of a user. The augmented reality light may be redirected towards the eye by a semi-reflective mirror. A combination of eye tracking and local dimming may be used in various applications, such as building windows, automobile windshields, mirrors, dashboards, sunglasses, any headset (such as augmented reality, mixed reality, VR) and the like. Any appropriate approach may be used for dimming, including e-inks, reflective devices such as MEMS mirrors, photochromic materials, electrochromic elements, and the like. For example, spatially selective electric field application to an electrochromic layer may be used to achieve local dimming.

In some embodiments, LC layers may interact with light by having components that are randomly-oriented in the absence of an electric field. These randomly-oriented components cause light to scatter, removing spatial information (but not necessarily substantially reducing intensity). When an electric field is applied, the components may align with the electric field, and light may pass through with minimal scattering. In some embodiments, LC layers may contain optically absorbing dyes or a combination of dyes. The dyes may be dispersed throughout the LC layer in a variety of locations and orientations (resulting in substantial attenuation of transmitted light, but preserving spatial information of the scene) or may be generally orientated in a configuration that minimizes the dye-light interaction resulting in minimal attenuation. The dye orientation and absorption can be controlled by applying an electric field to the LC layer, adjusting the degree of absorption. In some embodiments, a LC layer can contain dye and be arranged in a scattering state, resulting in an opaque region because light is absorbed by the dye, reducing intensity, and is also scattered, removing spatial information. An LC layer may provide, for example, under electric field control using electrodes, a transparent state, a dimming (absorbing) state, and an opaque (absorbing and scattering) state, with each state achieved by application of an appropriate electric field (which may include zero electric field). Some LC configurations may hold a selected state once switched, either permanently or semi-permanently (e.g., for several minutes or longer). These LC types may require less power to maintain a desired state. Some LC types may only be transparent when an electric field is applied ("on" state); others can be transparent in the absence of an electric field ("off" state). A liquid crystal shutter may include one or more polarizers, such as a pair of polarizers located on each side of the shutter. A pair of polarizers may be a pair of parallel plane polarizers, a pair of crossed (or otherwise non-parallel) linear polarizers, circular polarizers, and the like. For some LC types, the state caused by an applied field may be determined by the relative dipole strengths present within the LC. The stronger dipole may align with the applied field. For example, a nematic liquid crystal may generally align with the nematic director parallel to the electric field for a nematic with positive dielectric anisotropy.

In some examples, dimming may include one or more of the following: optical absorption, reflection, refraction (e.g., deflection by an optical interface), diffraction, scattering, or other optical effect. In some examples, a dimmer element may include a refractive element, which may be configured to refract light out of an optical path to a user's eye. A refractive element may be spatially modulated, for example, by applying an electric field to a portion of an electrooptical medium, such as an electrooptical crystal, a liquid crystal, or the like. In some examples, a dimmer element may include a diffractive element, which may be configured to diffract light out of an optical path to a user's eye. A diffractive element may be spatially modulated by applying a periodic electric field to a portion of an electrooptical medium, such as an electrooptical crystal, a liquid crystal, or the like. In some examples, a dimmer element may include a reflective element, which may be configured to reflect light out of an optical path to a user's eye. A reflective element may include a chiral nematic liquid crystal, a grating structure, an electrically tunable mirror, an electrically tunable cavity, or the like. A reflective element may be spatially modulated by applying a periodic electric field to a portion of an electrooptical medium, such as an electrooptical crystal, a liquid crystal, or the like. In some examples, a dimmer element may include an optical element providing another optical effect, such as a wavelength-modifying element, that may, for example, absorb light energy at a first wavelength and emit the light energy at a second wavelength. A wavelength-modifying element may include a phosphorescent, fluorescent, optically nonlinear (e.g., two-photon absorber), or other optical material. For example, if an augmented reality element includes a first wavelength, the first wavelength may be absorbed from ambient light, or the first wavelength may be absorbed from the augmented reality image element and re-transmitted at a more visually distinct wavelength. A dimmer element may include the functions of one or more of an optically absorbing element, a refractive element, a diffractive element, a reflective element, a wavelength-modifying element, or other optical element, in any desired combination. In some examples, the absorption, refraction, diffraction, reflection, scattering, or other optical effect (e.g., wavelength modifying properties) may be electrically tunable, in degree of effect, spatial location, or wavelength (spectral) properties. In some examples, a spatially modulated electric field may be used to induce one or more mechanical deformations (e.g., of a substrate and/or electrooptical material), that may provide dimming through one or more optical effects. In some examples, a dimmer element may include an optically absorbing material having one or more peak absorption wavelengths that may be adjusted, for example, electrically adjusted, or modified by photoisomerism.

In some embodiments, a device includes a control system. A control system may include a controller, such as an augmented reality logic unit, used to provide an image stream to one or more augmented reality displays. The controller may receive signals from one or more sensors, such as an eye-tracker, a light sensor, a motion sensor, one or more orientation sensors, combinations thereof, and the like. The control system, or a control element in communication therewith, may control local dimming within a dimmer element. Selection of the spatial extent (e.g., selection of dimmed pixels) and optical degree (e.g., relative percent transmission of dimmed pixels) of local dimming may be based on the location of augmented reality elements within the user visual field, relative importance of augmented reality elements, desired contrast ratio, existing or provided color contrast, and the like.

An exemplary computer-implemented method for enhancing the readability of an image element (such as an augmented reality image element) may include generating the image element, combining the image element with an ambient image (e.g., a real-world image such as an image of a local environment, such as an outside image of a location exterior to the device), and dimming a portion of the image to enhance the visibility of the augmented reality image element. Methods may be performed by any suitable computer-executable code and/or computing system, including the system(s) illustrated in FIG. 14, or for example, a controller of a system such as that illustrated in FIG. 17. In some embodiments, one or more method steps may represent or be performed by an algorithm whose structure includes one or more sub-steps.

FIG. 14 shows an example near-eye display system such as an augmented reality system. The system 800 may include a near-eye display (NED) 810 and a control system 820, which may be communicatively coupled to each other. The near-eye display 810 may include lenses 812, electroactive devices 814, displays 816, and a sensor 818. Control system 820 may include a control element 822, a force lookup table 824, and augmented reality logic 826.

Augmented reality logic 826 may determine what virtual objects are to be displayed and real-world positions onto which the virtual objects are to be projected. Accordingly, augmented reality logic 826 may generate an image stream 828 that is displayed by displays 816 in such a way that alignment of right- and left-side images displayed in displays 816 results in ocular vergence toward a desired real-world position.

The control system 822 may be configured to control a dimmer element, for example, a dimmer element located within a near-eye display. The selected portion of the dimmer element that is dimmed (e.g., having an optical transmission that is appreciably reduced) may be based on the location of augmented reality image elements generated for display to a user.

Control element 822 may use the same positioning information determined by augmented reality logic 826, in combination with force lookup table (LUT) 824, to determine an amount of force to be applied by electroactive devices 814 (e.g., actuators), as described herein, to lenses 812. Electroactive devices 814 may, responsive to control element 822, apply appropriate forces to lenses 812 to adjust the apparent accommodation distance of virtual images displayed in displays 816 to match the apparent vergence distance of the virtual images, thereby reducing or eliminating vergence-accommodation conflict. Control element 822 may be in communication with sensor 818, which may measure a state of the adjustable lens. Based on data received from sensor 818, the control element 822 may adjust electroactive devices 814 (e.g., as a closed-loop control system).

In some embodiments, display system 800 may display multiple virtual objects at once and may determine which virtual object a user is viewing (or is likely to be viewing) to identify a virtual object for which to correct the apparent accommodation distance. For example, the system may include an eye tracking system (not shown) that provides information to control element 822 to enable control element 822 to select the position of the relevant virtual object.

Additionally or alternatively, augmented reality logic 826 may provide information about which virtual object is the most important and/or most likely to draw the attention of the user (e.g., based on spatial or temporal proximity, movement, and/or a semantic importance metric attached to the virtual object). In some embodiments, the augmented reality logic 826 may identify multiple potentially important virtual objects and select an apparent accommodation distance that approximates the virtual distance of a group of the potentially important virtual objects.

Control system 820 may represent any suitable hardware, software, or combination thereof for managing adjustments to adjustable lenses 812. In some embodiments, control system 820 may represent a system on a chip (SOC). As such, one or more portions of control system 820 may include one or more hardware modules. Additionally or alternatively, one or more portions of control system 820 may include one or more software modules that perform one or more of the tasks described herein when stored in the memory of a computing device and executed by a hardware processor of the computing device.

Control system 820 may generally represent any suitable system for providing display data, augmented reality data, and/or augmented reality logic for a head-mounted display. In some embodiments, control system 820 may include a graphics processing unit (GPU) and/or any other type of hardware accelerator designed to optimize graphics processing.

Control system 820 may be implemented in various types of systems, such as the augmented reality glasses 200 illustrated in FIG. 8. As shown, glasses 200 may include adjustable focus lenses 210 coupled to a frame 230 (e.g., at an eyewire, not shown). In some embodiments, control system 820 of FIG. 14 may be integrated into frame 230. Alternatively, all or a portion of control system 820 may be in a system remote from glasses 200 and configured to control electroactive devices (e.g., actuators) in glasses 200 via wired or wireless communication.

In some embodiments, a control system may be used to provide local and/or global dimming using a light shutter, such as a pixelated light shutter. An appropriate light shutter may be used. Example light shutters include twisted nematic shutters (including active matrix twisted nematic shutters), guest-host liquid crystal shutters, and scattering liquid crystal shutters. In some examples, scattering may be based on, for example, particles (such as microparticles and/or nanoparticles), polymer interfaces, or electrohydrodynamic instabilities. Scattering may be electrically controlled, for example, using electrical field induced reorientation of nematic liquid crystals, suspended particles, or other approach. Examples may also include one or more of polymer-stabilized displays (with any liquid crystal phase), cholesteric liquid crystal shutters (of any desired configuration), ferroelectric liquid crystal shutter, shutters based on liquid crystals filed with nanoparticles, or other liquid crystal cells. Example light shutters may also include one or more of photochromic materials, electrochromic materials, electronic ink materials, and the like. In some embodiments, a liquid crystal (LC) shutter may include one or more of: a cell with an aligned and electrically controllable layer of liquid crystal confined between two polarizers; a guest-host liquid crystal cell; or an electrically controlled light scattering cell including a liquid crystal composite. In some embodiments, a dimmer element may include one or more liquid crystal (LC) shutters, such as one or more of an electrically controlled phase retardation layer (such as an LC layer with polarizers), a guest-host effect shutter, an electrically controlled light scattering shutter (such as a polymer dispersed liquid crystal, PDLC), a polymer network LC (PNLC), a filled LC (e.g., a LC including a dispersion of nanoparticles), optical reflection based liquid crystal shutters, optical deflection based liquid crystal shutters, one or more other liquid crystal shutter configurations, or some combination of light shutters, which may include non-LC based light shutters. For example, a liquid crystal shutter may include a combination such as a guest-host PDLC (e.g., a PDLC with a dichroic dye), and/or stacking of several dimmer films based on different configurations (e.g., a PDLC film combined with a guest-host film, or some other combination). Local dimming and/or global dimming may be achieved using one or more light shutters, for example, of those described here, or of similar or different technologies. Liquid crystal shutters may also be used to reflect or deflect light to provide local dimming. A dimmer element may attenuate transmitted light by one or more different ways, such as absorption, scattering, reflection, deflection, destructive interference, etc.

An example device may include a dimmer element configured to reduce the intensity of at least part of the ambient image, for example, to improve visibility of one or more augmented reality image elements. In some embodiments, a dimmer element may use any one or more of: optical absorption; optical scattering; optical reflection; optical deflection; polarization modification (e.g., using linear or circular polarizers); diffraction, or glare reduction, for example, to reduce the transmission of a portion of the background image to one or both eyes of a user. Local dimming of a background image (such as a real-world image formed from ambient light entering the device from outside) may be achieved using one or more approaches such as electrical (or other) control of at least a portion of a dimmer element to modify light transmission, for example, providing local dimming by reducing transmission of ambient light through the dimmer element to the eye of a user. In some embodiments, ambient light may be reflected (e.g., partially reflected) by the dimmer element to provide local dimming, for example, by increasing the reflectivity within a portion of an optical shutter. Example optical shutters may include liquid crystals, electronic ink, electrochromic materials (such as electrochromic reflective elements), photochromic elements, electro-mechanical shutters, or some combination thereof. In some embodiments, optical deflection may be used to deflect divert ambient light in order to prevent the ambient light from within a portion of the ambient image from reaching the eye of a user. Electrical control of optical deflection may use electrooptic materials (such as liquid crystals and/or electrooptic crystals), and may include one or more of: microlenses, microstructure arrays of any type (e.g., including wedge elements and the like), MEMS elements (such as MEMS reflectors and/or MEMS deflectors), electrically controllable elements of any kind, or other approach. Example dimmer elements may use any modification of incident ambient light to reduce the transmission of the background image to the eye of a user, for example, to increase the visibility of augmented reality image elements. Example approaches may improve (e.g., increase) one or more parameters related to the augmented reality image elements, for example, in relation to the background, such as parameters including: intensity contrast, color contrast, polarization, or by providing visibility enhancing aspects such as framing or the like. The augmented reality image and ambient image may then be provided together into the field of view of a user. In some embodiments, global modification of the ambient image may also (or alternatively) be provided, for example, by reducing blue shades or other color components, providing polarization filtering, or other modification.

In some embodiments, the spatial extent of local dimming may be controlled based on the spatial extent of augmented reality image elements. In some embodiments, the degree of local dimming may depend on one or more of: augmented reality message importance, ambient light intensity, user preference, or other parameter(s). In some embodiments, a control circuit used to provide augmented reality image elements, for example, through an augmented reality system, may also control local dimming. In some embodiments, the control circuit used to provide augmented reality image elements may provide data to a separate control system used to control the local dimming, for example, providing data such as the number, location, importance, color components, or other aspects of the augmented reality image based on which aspects of the local dimming may be provided and/or adjusted.

In some embodiments, a device further includes an input aperture through which ambient light passes into the device. The input aperture may enclose or be covered by a window, screen, lens, filter, or other optical element. The dimmer element may be located between the input aperture and the optical combiner. In some embodiments, the dimmer element may be in the optical path of ambient light entering the device from outside the device, but not in the optical path of an augmented reality image element.

In some embodiments, a device further includes an output aperture, and the device is configured so that ambient light enters the device, passes through the dimmer element, passes through the combiner, and then leaves the device through the output aperture. In some embodiments, the device is a binocular device, for example, having a dimmer element within the optical assembly for each eye, where the optical assembly may include an optical combiner, an electronic display for generating an augmented reality augmented reality image element, and optionally one or more additional optical components such as a lens, window, mirror, prism, and the like. In some embodiments, the device is an augmented reality headset, and may for example, include goggles, a helmet, or one or more other headset components. The electronic display may be a projection display, and the augmented reality image element may be projected towards the optical combiner, for example, through a waveguide. In some examples, a dimmer element may be located between the optical combiner and the output aperture. The dimmer element may be configured to enhance the viewability of one or more augmented reality image elements. In some examples, a dimmer element located between the optical combiner and the output aperture may be configured to selectively dim light at one or more colors that are not present in the augmented reality image element. An example dimmer element may include a dye-doped electrooptical material (such as a liquid crystal) having an appropriate degree of optical absorption. In some examples, UV light (e.g., as present in daylight) may modify the dimmer element to enhance blue light absorption. In some examples, providing a yellow, orange, or red tint to a dimmer element may enhance the viewability of augmented reality image elements.

In some embodiments, a dimmer element may include a liquid crystal shutter. The device may further include a control unit configured to activate the electronic display to provide the augmented reality image element, and control the dimmer element to dim a selected portion of the ambient image. For example, the control element may control switching of portions of a pixelated liquid crystal shutter. The control unit may have other functions, for example, related to the provision of augmented reality and/or virtual reality. The optical combiner may include a holographic element, a semi-silvered mirror, or other optical component.

In some embodiments, a device includes an electronic display configured to generate an augmented reality image element and an optical combiner configured to receive ambient light (from outside the device) and the augmented reality image element and to provide an augmented reality image having the augmented reality image element located within an ambient image based on the ambient light. The device may also include a dimmer element configured to selectively dim a selected portion of the ambient image, where the augmented reality image element is located within the selected portion of the ambient image. In some embodiments, the dimmer element includes a liquid crystal shutter. The device may also include a control unit configured to activate the electronic display to provide the augmented reality image element and control the dimmer element to dim a selected portion of the ambient image. For example, the control unit may control the state of pixels of a pixelated liquid crystal shutter by, for example, selecting a dark, light, or gray state. The device may further include an input aperture through which ambient light passes into the device. The dimmer element may be located between the input aperture and the optical combiner. The device may also have an output aperture, for example, through which light leaves the device to form an augmented reality image within the visual field of a user. The device may be configured so that the ambient light enters the device, for example, through an input aperture, then passes through the dimmer element, then passes through the optical combiner, and then leaves the device through the output aperture. The control unit may be configured to generate augmented reality information for display as the augmented reality image element (e.g., text and/or graphics), and dim a selected portion of the ambient image to enhance visibility of the augmented reality image element. The control unit may determine the location of the selected portion to dim based on the location of the augmented reality image element within an ambient image. A device may further include an optical system configured to direct the augmented reality image through the output aperture and into the field of view of a user, such as a person wearing the device as a headset. In some embodiments, the liquid crystal shutter has irregularly-shaped pixels, for example, having non-linear edge profiles. The liquid crystal shutter may include a guest-host liquid crystal shutter having a dye-doped liquid crystal, a twisted nematic structure with associated polarizers, or other liquid crystal shutter configuration.

In some embodiments, the dimmer element may be located between the optical combiner and an input aperture through which ambient light enters the device. The input aperture may be defined by an opening in a housing, a frame (e.g., an eye frame in a pair of glasses or goggles, a light-transmissive window, or otherwise defined). The dimmer element may include a liquid crystal shutter and a photochromic layer. In some embodiments, ambient light passes through the photochromic layer before passing through the liquid crystal shutter. The photochromic layer may be configured to partially absorb the ambient light when the ambient light includes UV light. The photochromic layer may have a degree of optical absorption based on an intensity of the ambient light, for example, an intensity within a spectral band, such as the intensity of blue, violet, and/or UV light. The liquid crystal shutter may be configured to selectively dim the portion of the ambient image in which the augmented reality image element is located. The portion may include the augmented reality image element and a portion peripheral to the augmented reality image element. In some embodiments, a device may further include a UV shutter located between the input aperture and the photochromic layer, and the photochromic layer may be darkened by UV light passing through the UV shutter. For example, the UV shutter may include UV shutter pixels, and the photochromic layer may be selectively darkened by UV light passing through UV shutter pixels that are in a UV transmissive state. For example, a UV shutter pixel may be switched between a light (UV-transmissive) and dark (UV-absorbing) state. In some embodiments, a liquid crystal layer may be UV-absorbing or include a UV-absorbing dye, and used in a UV shutter. A UV liquid crystal shutter may include UV/visible transmissive substrates, such as fused silica substrates. In some embodiments, a UV shutter includes a switchable liquid crystal layer. In some embodiments, a device includes a photochromic liquid crystal layer. For example, the liquid crystal shutter may provide the photochromic layer. A liquid crystal shutter may include a liquid crystal layer, and the liquid crystal layer may include a photochromic material. The photochromic material may be a photochromic dye dissolved in the liquid crystal layer. The photochromic material may include liquid crystal molecules that have a photochromic chemical moiety.

In some embodiments, a device includes an electronic display configured to generate an augmented reality image element and an optical combiner configured to receive ambient light from outside the device, to receive the augmented reality image element, and to provide an augmented reality image having the augmented reality image element located within an ambient image. The ambient image may be based on the ambient light, and formation of the ambient image may also be facilitated by one or more lenses within the device. A dimmer element may be configured to selectively dim a selected portion of the ambient image, where the augmented reality image element is located within the selected portion of the ambient image. The dimmer element may include a liquid crystal shutter and optionally a photochromic material. The device may also include a control unit configured to activate the electronic display to provide the augmented reality image element and control the dimmer element to dim the selected portion of the ambient image. Controlling the dimmer element may include switching one or more pixels from a light (transmissive) state to a gray or dark (absorbing) state. The control unit may be configured to activate the liquid crystal shutter to selectively dim the portion of the ambient image in which the augmented reality image element is located. The photochromic layer may be configured to globally dim the ambient image based on the intensity and spectral content of the ambient light.

In some embodiments, a computer-implemented method for improving the appearance of an augmented reality image element may include combining an ambient image and an augmented reality image element to form an augmented reality image, and selectively dimming a portion of the ambient image to visually enhance the augmented reality image element. Generating the augmented reality image element may include projecting the augmented reality image element towards an optical combiner, for example, through a waveguide. For example, an electronic display under computer control may be used to project an augmented reality image element towards an optical combiner, while a dimmer element also under computer control may be used to selectively reduce the intensity of portions of an ambient image to improve readability of augmented reality image elements. In some embodiments, a controller may be used to determine a degree of dimming based on one or more parameters, such as an intensity of ambient light (e.g., outside brightness), importance of the augmented reality image element (e.g., a safety-related augmented reality image element may have a large importance parameter with greater associated local dimming), user preference (which may be entered into a controller by any appropriate method), uniformity of the portion of the ambient image against which the augmented reality image element is displayed (e.g., greater dimming may be selected for less uniformity, which may be termed greater background business), or degree of color contrast (e.g., greater dimming may be used where the augmented reality image element has the same color or colors as present in the portion of the ambient image in which the augmented reality image element is displayed).

In some embodiments, a corresponding system for modifying the appearance of an augmented reality image may include several modules stored in memory, including a module configured to generate an augmented reality image element, and a module configured to control a dimmer element to selectively dim a portion of an ambient image in which the augmented reality image element is displayed, to improve the visibility of the augmented reality image element.

In some embodiments, herein described methods may be encoded as computer-readable instructions on a computer-readable medium. For example, a computer-readable medium may include one or more computer-executable instructions that, when executed by at least one processor of a computing device, may cause the computing device to generate an augmented reality image element, and to control a dimmer element to selectively dim a portion of an ambient image in which the augmented reality image element is displayed, to improve the visibility of the augmented reality image element.

In some embodiments, a method includes combining an ambient image and an augmented reality (AR) image element to form an augmented reality image and selectively dimming a portion of the ambient image to visually enhance the augmented reality image element. Dimming the portion of the ambient image may include the using dimmer element to dim the portion of the ambient image in which the augmented reality image element is located. The dimmer element may include a liquid crystal shutter and a photochromic layer. The method may include dimming the selected portion of the ambient image by switching a portion, such as one or more pixels, of the liquid crystal shutter into a dark state to selectively dim the portion of the ambient image. In some embodiments, the method may include dimming the photochromic layer using ambient light, for example, using UV or blue/violet light in the ambient light. In some embodiments, the photochromic layer may be dimmed by exposure to UV light from one or more UV light-emitting diodes (LEDs) located proximate the photochromic layer. In some embodiments, blue and/or violet LEDs may be used, which may be part of the dimmer element or located elsewhere within the device. In some embodiments, dimming a selected portion of the ambient image includes switching a portion of a UV shutter into a light state to allow UV light to reach the photochromic layer, with the photochromic layer being darkened by the UV light. The darkening of the photochromic layer may be localized by spatially-selective switching (e.g., of one or more pixels) to enhance visibility of an augmented reality image element. In some embodiments, the liquid crystal shutter may include a photochromic liquid crystal layer, which provides a photochromic layer. A photochromic liquid crystal layer may be switchable, for example, having electrically controllable photochromic properties. In some embodiments, a photochromic dye may not be reoriented by the liquid crystal, or may be disposed in a separate layer within the liquid crystal shutter and may not be switchable by the electrical field used to switch a liquid crystal pixel.

In some embodiments, a device includes an electronic display configured to generate an augmented reality image element, an optical combiner configured to receive the augmented reality image element and to receive ambient light from outside the device, and to provide an augmented reality image having the augmented reality image element located within a portion of an ambient image, the ambient image formed from the ambient light, and a dimmer element configured to reduce the intensity at least the portion of the ambient image to improve a visibility of the augmented reality image element, wherein the dimmer element includes a photochromic layer. The device may be an augmented reality headset configured to be worn by a user. The device may be configured so that the augmented reality image element is projected towards an eye of the user after passing through the optical combiner. In some embodiments, the ambient light passes through the photochromic layer before passing through the dimmer element, and the ambient light may pass through the dimmer element before passing through the optical combiner.

In some embodiments, a dimmer element may include a photochromic layer and may further include a liquid crystal shutter. The liquid crystal shutter may be configured to selectively dim the portion of the ambient image in which the augmented reality image element is located. In some embodiments, the liquid crystal shutter includes the photochromic layer. The photochromic layer may be configured to partially absorb the ambient light when the ambient light includes UV light, the photochromic layer having a degree of optical absorption based on an intensity of the ambient light. In some embodiments, the device may include a UV shutter. The photochromic layer may be darkened by UV light passing through the UV shutter to selectively dim the portion of the ambient image in which the augmented reality image element is located. The UV shutter may include UV shutter pixels, and the photochromic layer may be selectively darkened by UV light passing through UV shutter pixels that are in a UV transmissive state. In some embodiments, the UV shutter may include the liquid crystal shutter, or an additional liquid crystal shutter may be configured as a UV shutter. A device may include a control unit configured to generate or receive augmented reality information for display as the augmented reality image element, activate the electronic display to provide the augmented reality image element; and control the dimmer element to dim a selected portion of the ambient image, to enhance the visibility of the augmented reality image element.

In some embodiments, a device may further include an image sensor configured to determine an intensity of the ambient light as a function of direction, wherein the dimmer element is selectively controlled based on one or more directions from which the intensity of the ambient light exceeds a threshold intensity. An image sensor may be supported on a frame or other housing element of a device. In some embodiments, a device may further include an eye tracking camera configured to determine a user gaze. An eye tracking camera may be supported, for example, by an interior surface of a frame element or other housing element. A control circuit may be configured so that the dimmer element is selectively controlled based on the determined user gaze. In some embodiments, a control circuit may be configured such that the dimmer element is selectively controlled based on one or more directions from which the intensity of the ambient light exceeds a threshold intensity, and not on the determined user gaze, even if the user gaze is determined.

Embodiments of the instant disclosure may include or be implemented in conjunction with various types of artificial reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial reality content may include completely generated content or generated content combined with captured (e.g., real-world) content. In some embodiments, a dimmer element is used to reduce the intensity (dim) one or more selected portions of an ambient image (e.g., real-world content). The one or more selected portions may form at least a portion of the background for generated visual content, such as an augmented reality image element. The selected portion may also include an area surrounding a periphery of an augmented reality image element. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs). A dimmer element may be integrated into an augmented reality system, for example, to selectively dim a portion of an image displayed to a user.

Artificial-reality systems may be implemented in a variety of different form factors and configurations. Some artificial reality systems may be designed to work without near-eye displays (NEDs), an example of which is augmented-reality system 1500 in FIG. 15. Other artificial reality systems may include a NED that also provides visibility into the real world (e.g., augmented-reality system 1600 in FIG. 16) or that visually immerses a user in an artificial reality (e.g., virtual-reality system 1700 in FIG. 17). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 15:
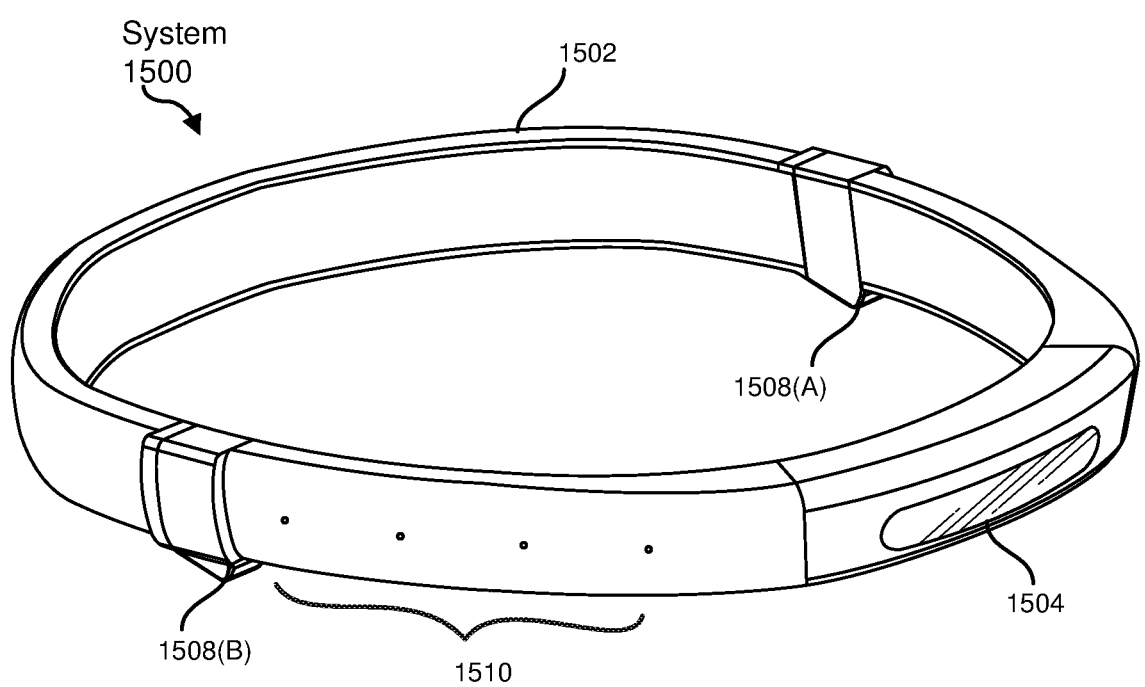
FIG. 15 is an illustration of an exemplary artificial-reality headband that may be used in connection with embodiments of this disclosure.

Turning to FIG. 15, augmented-reality system 1500 generally represents a wearable device dimensioned to fit about a body part (e.g., a head) of a user. As shown in FIG. 15, system 1500 may include a frame 1502 and a camera assembly 1504 that is coupled to frame 1502 and configured to gather information about a local environment by observing the local environment. Augmented-reality system 1500 may also include one or more audio devices, such as output audio transducers 1508(A) and 1508(B) and input audio transducers 1510. Output audio transducers 1508(A) and 1508(B) may provide audio feedback and/or content to a user, and input audio transducers 1510 may capture audio in a user's environment.

As shown, augmented-reality system 1500 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 1500 may not include a NED, augmented-reality system 1500 may include other types of screens or visual feedback devices (e.g., a display screen integrated into a side of frame 1502).

Figure 16:
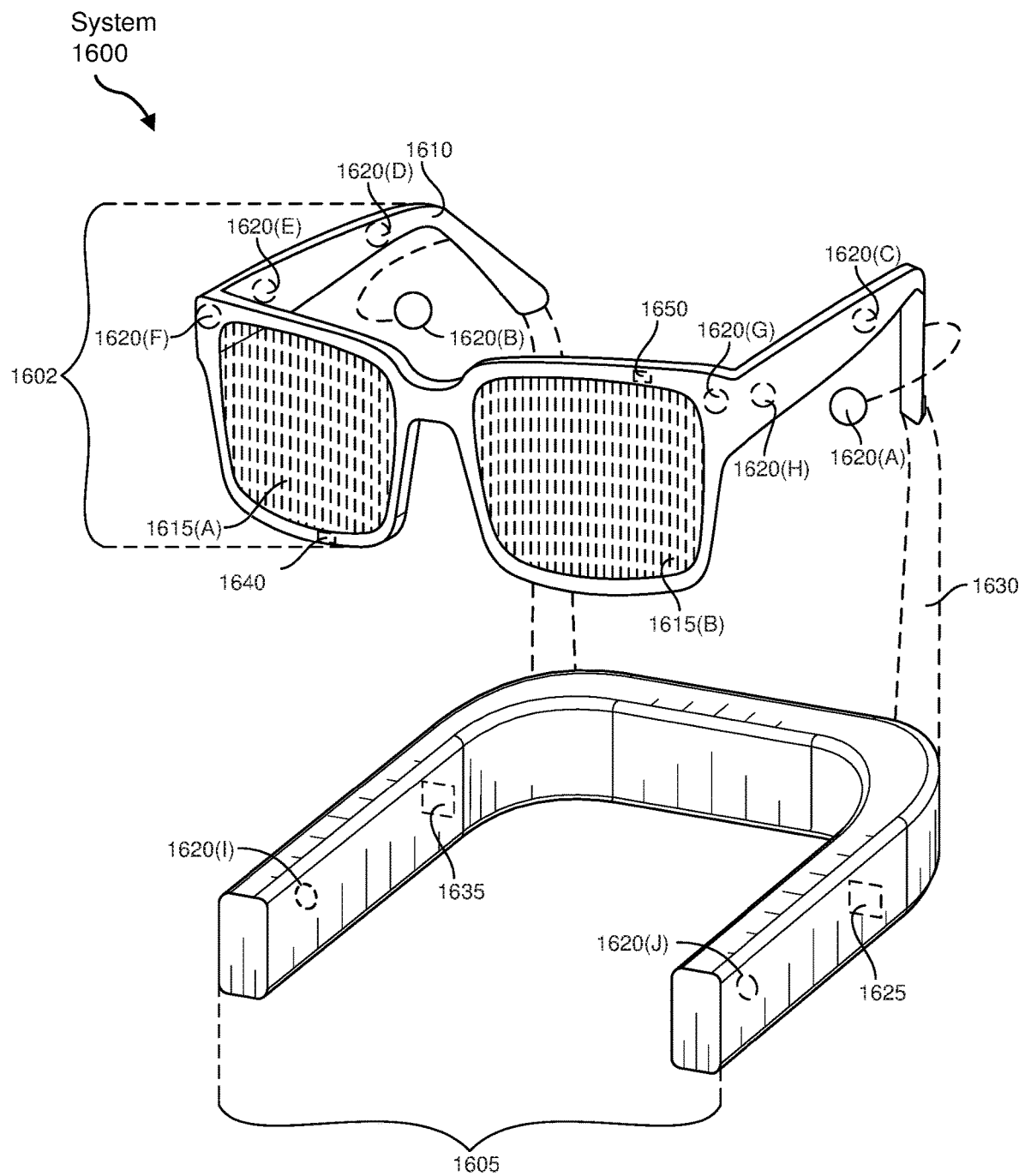
FIG. 16 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 16, augmented-reality system 1600 may include an eyewear device 1602 with a frame 1610 configured to hold a left display device 1615(A) and a right display device 1615(B) in front of a user's eyes. Display devices 1615(A) and 1615(B) may act together or independently to present an image or series of images to a user. While augmented-reality system 1600 includes two displays, embodiments of this disclosure may be implemented in augmented-reality systems with a single NED or more than two NEDs.

In some embodiments, augmented-reality system 1600 may include one or more sensors, such as sensor 1640. Sensor 1640 may generate measurement signals in response to motion of augmented-reality system 1600 and may be located on substantially any portion of frame 1610. Sensor 1640 may represent a position sensor, an inertial measurement unit (IMU), a depth camera assembly, or any combination thereof. In some embodiments, augmented-reality system 1600 may or may not include sensor 1640 or may include more than one sensor. In embodiments in which sensor 1640 includes an IMU, the IMU may generate calibration data based on measurement signals from sensor 1640. Examples of sensor 1640 may include, without limitation, accelerometers, gyroscopes, magnetometers, other suitable types of sensors that detect motion, sensors used for error correction of the IMU, or some combination thereof.

Augmented-reality system 1600 may also include a microphone array with a plurality of acoustic transducers 1620(A)-1620(J), referred to collectively as acoustic transducers 1620. Acoustic transducers 1620 may be transducers that detect air pressure variations induced by sound waves. Each acoustic transducer 1620 may be configured to detect sound and convert the detected sound into an electronic format (e.g., an analog or digital format). The microphone array in FIG. 2 may include, for example, ten acoustic transducers: 1620(A) and 1620(B), which may be designed to be placed inside a corresponding ear of the user, acoustic transducers 1620(C), 1620(D), 1620(E), 1620(F), 1620(G), and 1620(H), which may be positioned at various locations on frame 1610, and/or acoustic transducers 1620(1) and 1620(J), which may be positioned on a corresponding neckband 1605.

In some embodiments, one or more of acoustic transducers 1620(A)-(F) may be used as output transducers (e.g., speakers). For example, acoustic transducers 1620(A) and/or 1620(B) may be earbuds or any other suitable type of headphone or speaker.

The configuration of acoustic transducers 1620 of the microphone array may vary. While augmented-reality system 1600 is shown in FIG. 16 as having ten acoustic transducers 1620, the number of acoustic transducers 1620 may be greater or less than ten. In some embodiments, using higher numbers of acoustic transducers 1620 may increase the amount of audio information collected and/or the sensitivity and accuracy of the audio information. In contrast, using a lower number of acoustic transducers 1620 may decrease the computing power required by the controller 1650 to process the collected audio information. In addition, the position of each acoustic transducer 1620 of the microphone array may vary. For example, the position of an acoustic transducer 1620 may include a defined position on the user, a defined coordinate on frame 1610, an orientation associated with each acoustic transducer, or some combination thereof.

Acoustic transducers 1620(A) and 1620(B) may be positioned on different parts of the user's ear, such as behind the pinna or within the auricle or fossa. Or, there may be additional acoustic transducers on or surrounding the ear in addition to acoustic transducers 1620 inside the ear canal. Having an acoustic transducer positioned next to an ear canal of a user may enable the microphone array to collect information on how sounds arrive at the ear canal. By positioning at least two of acoustic transducers 1620 on either side of a user's head (e.g., as binaural microphones), augmented-reality device 1600 may simulate binaural hearing and capture a 3D stereo sound field around about a user's head. In some embodiments, acoustic transducers 1620(A) and 1620(B) may be connected to augmented-reality system 1600 via a wired connection 1630, and in other embodiments, acoustic transducers 1620(A) and 1620(B) may be connected to augmented-reality system 1600 via a wireless connection (e.g., a Bluetooth connection). In still other embodiments, acoustic transducers 1620(A) and 1620(B) may not be used at all in conjunction with augmented-reality system 1600.

Acoustic transducers 1620 on frame 1610 may be positioned along the length of the temples, across the bridge, above or below display devices 1615(A) and 1615(B), or some combination thereof. Acoustic transducers 1620 may be oriented such that the microphone array is able to detect sounds in a wide range of directions surrounding the user wearing the augmented-reality system 1600. In some embodiments, an optimization process may be performed during manufacturing of augmented-reality system 1600 to determine relative positioning of each acoustic transducer 1620 in the microphone array.

In some embodiments, augmented-reality system 1600 may include or be connected to an external device (e.g., a paired device), such as neckband 1605. Neckband 1605 generally represents any type or form of paired device. Thus, the following discussion of neckband 1605 may also apply to various other paired devices, such as charging cases, smart watches, smart phones, wrist bands, other wearable devices, hand-held controllers, tablet computers, laptop computers and other external compute devices, etc.

As shown, neckband 1605 may be coupled to eyewear device 1602 via one or more connectors. The connectors may be wired or wireless and may include electrical and/or non-electrical (e.g., structural) components. In some cases, eyewear device 1602 and neckband 1605 may operate independently without any wired or wireless connection between them. While FIG. 16 illustrates the components of eyewear device 1602 and neckband 1605 in example locations on eyewear device 1602 and neckband 1605, the components may be located elsewhere and/or distributed differently on eyewear device 1602 and/or neckband 1605. In some embodiments, the components of eyewear device 1602 and neckband 1605 may be located on one or more additional peripheral devices paired with eyewear device 1602, neckband 1605, or some combination thereof. Furthermore, Pairing external devices, such as neckband 1605, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1600 may be provided by a paired device or shared between a paired device and an eyewear device, thus reducing the weight, heat profile, and form factor of the eyewear device overall while still retaining desired functionality. For example, neckband 1605 may allow components that would otherwise be included on an eyewear device to be included in neckband 1605 since users may tolerate a heavier weight load on their shoulders than they would tolerate on their heads. Neckband 1605 may also have a larger surface area over which to diffuse and disperse heat to the ambient environment. Thus, neckband 1605 may allow for greater battery and computation capacity than might otherwise have been possible on a stand-alone eyewear device. Since weight carried in neckband 1605 may be less invasive to a user than weight carried in eyewear device 1602, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 1605 may be communicatively coupled with eyewear device 1602 and/or to other devices. These other devices may provide certain functions (e.g., tracking, localizing, depth mapping, processing, storage, etc.) to augmented-reality system 1600. In the embodiment of FIG. 16, neckband 1605 may include two acoustic transducers (e.g., 1620(1) and 1620(J)) that are part of the microphone array (or potentially form their own microphone subarray). Neckband 1605 may also include a controller 1625 and a power source 1635.

Acoustic transducers 1620(1) and 1620(J) of neckband 1605 may be configured to detect sound and convert the detected sound into an electronic format (analog or digital). In the embodiment of FIG. 16, acoustic transducers 1620(1) and 1620(J) may be positioned on neckband 1605, thereby increasing the distance between the neckband acoustic transducers 1620(1) and 1620(J) and other acoustic transducers 1620 positioned on eyewear device 1602. In some cases, increasing the distance between acoustic transducers 1620 of the microphone array may improve the accuracy of beam-forming performed via the microphone array. For example, if a sound is detected by acoustic transducers 1620(C) and 1620(D) and the distance between acoustic transducers 1620(C) and 1620(D) is greater than, for example, the distance between acoustic transducers 1620(D) and 1620(E), the determined source location of the detected sound may be more accurate than if the sound had been detected by acoustic transducers 1620(D) and 1620(E).

Controller 1625 of neckband 1605 may process information generated by the sensors on 1605 and/or augmented-reality system 1600. For example, controller 1625 may process information from the microphone array that describes sounds detected by the microphone array. For each detected sound, controller 1625 may perform a direction-of-arrival (DOA) estimation to estimate a direction from which the detected sound arrived at the microphone array. As the microphone array detects sounds, controller 1625 may populate an audio data set with the information. In embodiments in which augmented-reality system 1600 includes an inertial measurement unit, controller 1625 may compute all inertial and spatial calculations from the IMU located on eyewear device 1602. A connector may convey information between augmented-reality system 1600 and neckband 1605 and between augmented-reality system 1600 and controller 1625. The information may be in the form of optical data, electrical data, wireless data, or any other transmittable data form. Moving the processing of information generated by augmented-reality system 1600 to neckband 1605 may reduce weight and heat in eyewear device 1602, making it more comfortable to the user.

Power source 1635 in neckband 1605 may provide power to eyewear device 1602 and/or to neckband 1605. Power source 1635 may include, without limitation, lithium ion batteries, lithium-polymer batteries, primary lithium batteries, alkaline batteries, or any other form of power storage. In some cases, power source 1635 may be a wired power source. Including power source 1635 on neckband 1605 instead of on eyewear device 1602 may help better distribute the weight and heat generated by power source 1635.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 1700 in FIG. 17, that mostly or completely covers a user's field of view. Virtual-reality system 1700 may include a front rigid body 1702 and a band 1704 shaped to fit around a user's head. Virtual-reality system 1700 may also include output audio transducers 1706(A) and 1706(B). Furthermore, while not shown in FIG. 17, front rigid body 1702 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 1700 and/or virtual-reality system 1700 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 1600 and/or virtual-reality system 1700 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 1500, augmented-reality system 1600, and/or virtual-reality system 1700 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 15 and 17, output audio transducers 1508(A), 1508(B), 1706(A), and 1706(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1510 may include condenser microphones, dynamic microphones, ribbon microphones, and/or any other type or form of input transducer. In some embodiments, a single transducer may be used for both audio input and audio output.

Figure 17:
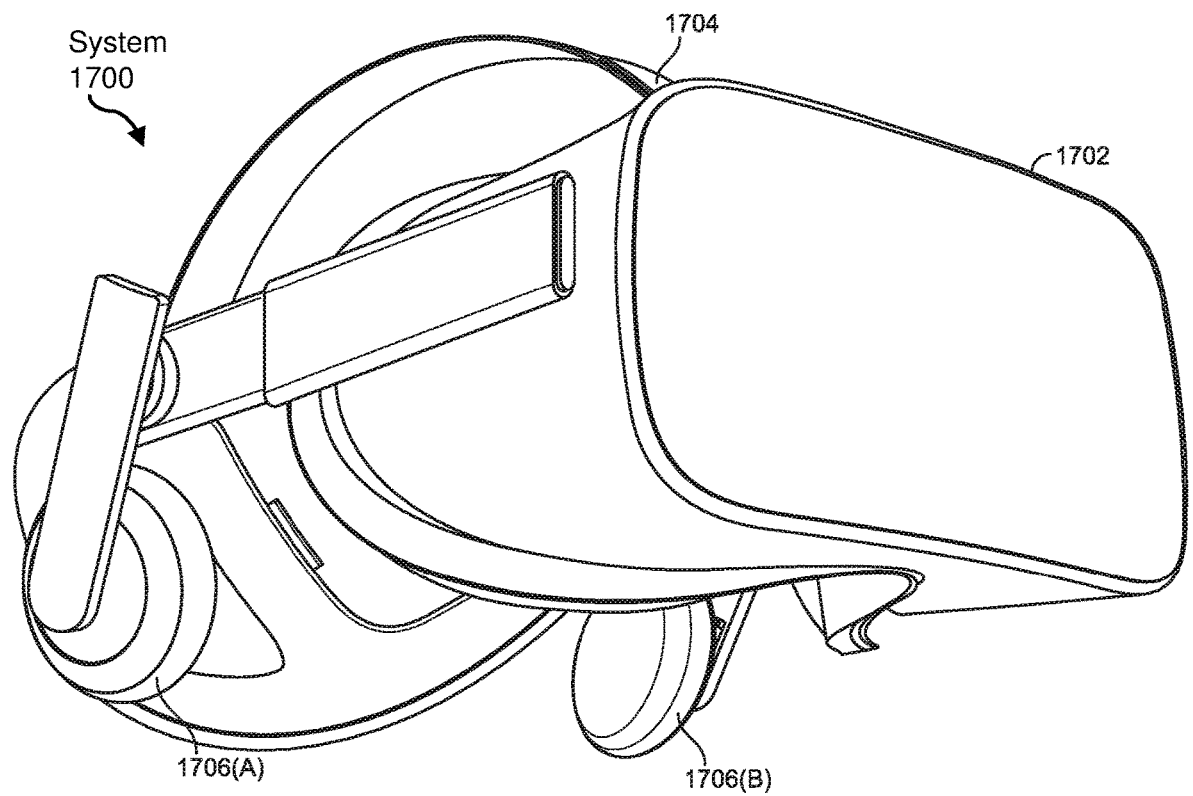
FIG. 17 is an illustration of an exemplary virtual-reality headset that may be used in connection with embodiments of this disclosure.

While not shown in FIGS. 15-17, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As noted, artificial reality systems 1500, 1600, and 1700 may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 18:
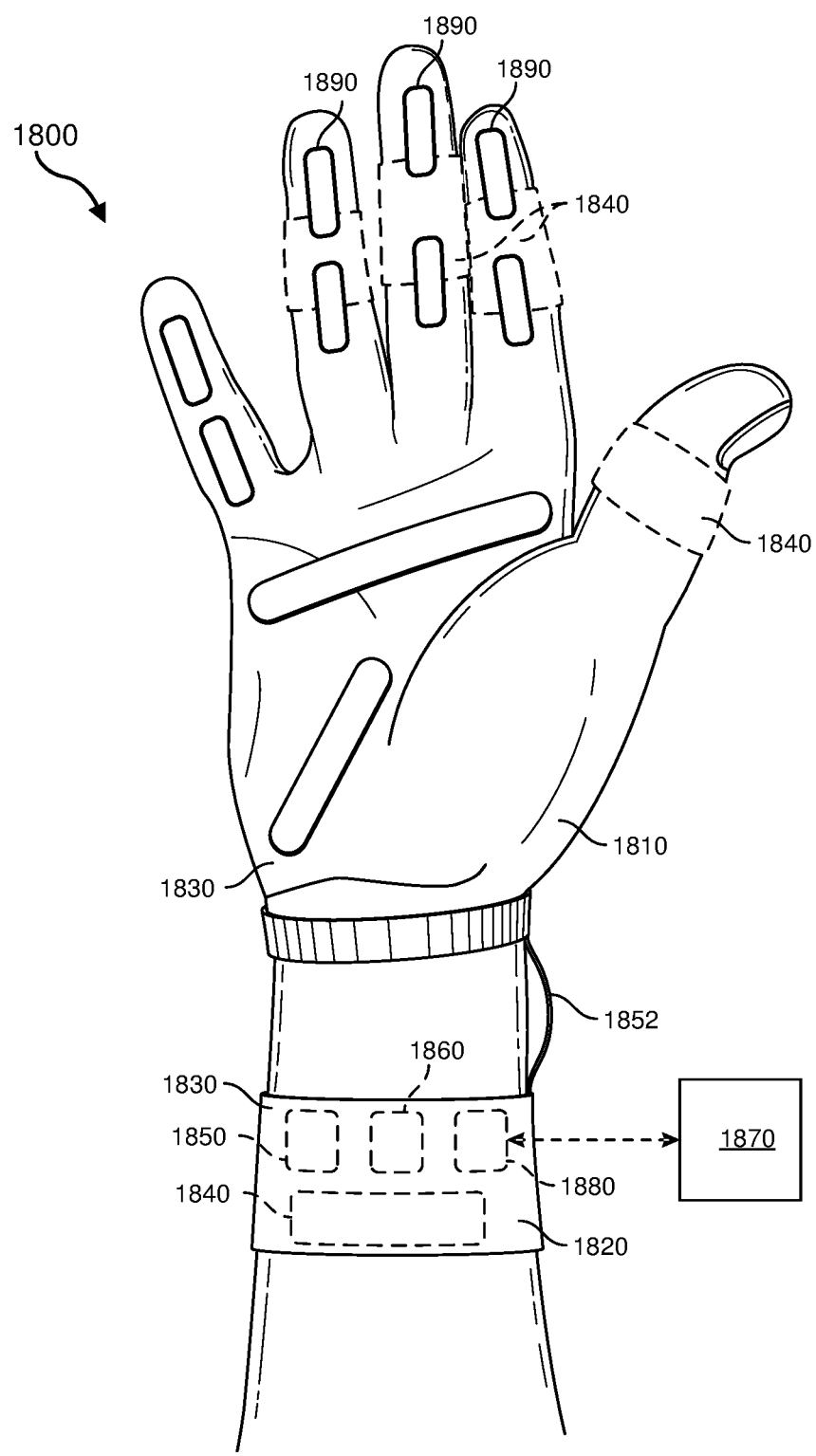
FIG. 18 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 18 illustrates a vibrotactile system 1800 in the form of a wearable glove (haptic device 1810) and wristband (haptic device 1820). Haptic device 1810 and haptic device 1820 are shown as examples of wearable devices that include a flexible, wearable textile material 1830 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some embodiments, the term "textile" may include any flexible, wearable material, including woven fabric, non-woven fabric, leather, cloth, a flexible polymer material, composite materials, etc.

One or more vibrotactile devices 1840 may be positioned at least partially within one or more corresponding pockets formed in textile material 1830 of vibrotactile system 1800. Vibrotactile devices 1840 may be positioned in locations to provide a vibrating sensation (e.g., haptic feedback) to a user of vibrotactile system 1800. For example, vibrotactile devices 1840 may be positioned to be against the user's finger(s), thumb, or wrist, as shown in FIG. 18. Vibrotactile devices 1840 may, in some embodiments, be sufficiently flexible to conform to or bend with the user's corresponding body part(s).

A power source 1850 (e.g., a battery) for applying a voltage to the vibrotactile devices 1840 for activation thereof may be electrically coupled to vibrotactile devices 1840, such as via conductive wiring 1852. In some embodiments, each of vibrotactile devices 1840 may be independently electrically coupled to power source 1850 for individual activation. In some embodiments, a processor 1860 may be operatively coupled to power source 1850 and configured (e.g., programmed) to control activation of vibrotactile devices 1840.

Vibrotactile system 1800 may be implemented in a variety of ways. In some embodiments, vibrotactile system 1800 may be a standalone system with integral subsystems and components for operation independent of other devices and systems. As another example, vibrotactile system 1800 may be configured for interaction with another device or system 1870. For example, vibrotactile system 1800 may, in some embodiments, include a communications interface 1880 for receiving and/or sending signals to the other device or system 1870. The other device or system 1870 may be a mobile device, a gaming console, an artificial reality (e.g., virtual reality, augmented reality, mixed reality) device, a personal computer, a tablet computer, a network device (e.g., a modem, a router, etc.), a handheld controller, etc. Communications interface 1880 may enable communications between vibrotactile system 1800 and the other device or system 1870 via a wireless (e.g., Wi-Fi, Bluetooth, cellular, radio, etc.) link or a wired link. If present, communications interface 1880 may be in communication with processor 1860, such as to provide a signal to processor 1860 to activate or deactivate one or more of the vibrotactile devices 1840.

Vibrotactile system 1800 may optionally include other subsystems and components, such as touch-sensitive pads 1890, pressure sensors, motion sensors, position sensors, lighting elements, and/or user interface elements (e.g., an on/off button, a vibration control element, etc.). During use, vibrotactile devices 1840 may be configured to be activated for a variety of different reasons, such as in response to the user's interaction with user interface elements, a signal from the motion or position sensors, a signal from the touch-sensitive pads 1890, a signal from the pressure sensors, a signal from the other device or system 1870, etc.

Although power source 1850, processor 1860, and communications interface 1880 are illustrated in FIG. 18 as being positioned in haptic device 1820, the present disclosure is not so limited. For example, one or more of power source 1850, processor 1860, or communications interface 1880 may be positioned within haptic device 1810 or within another wearable textile.

Figure 19:
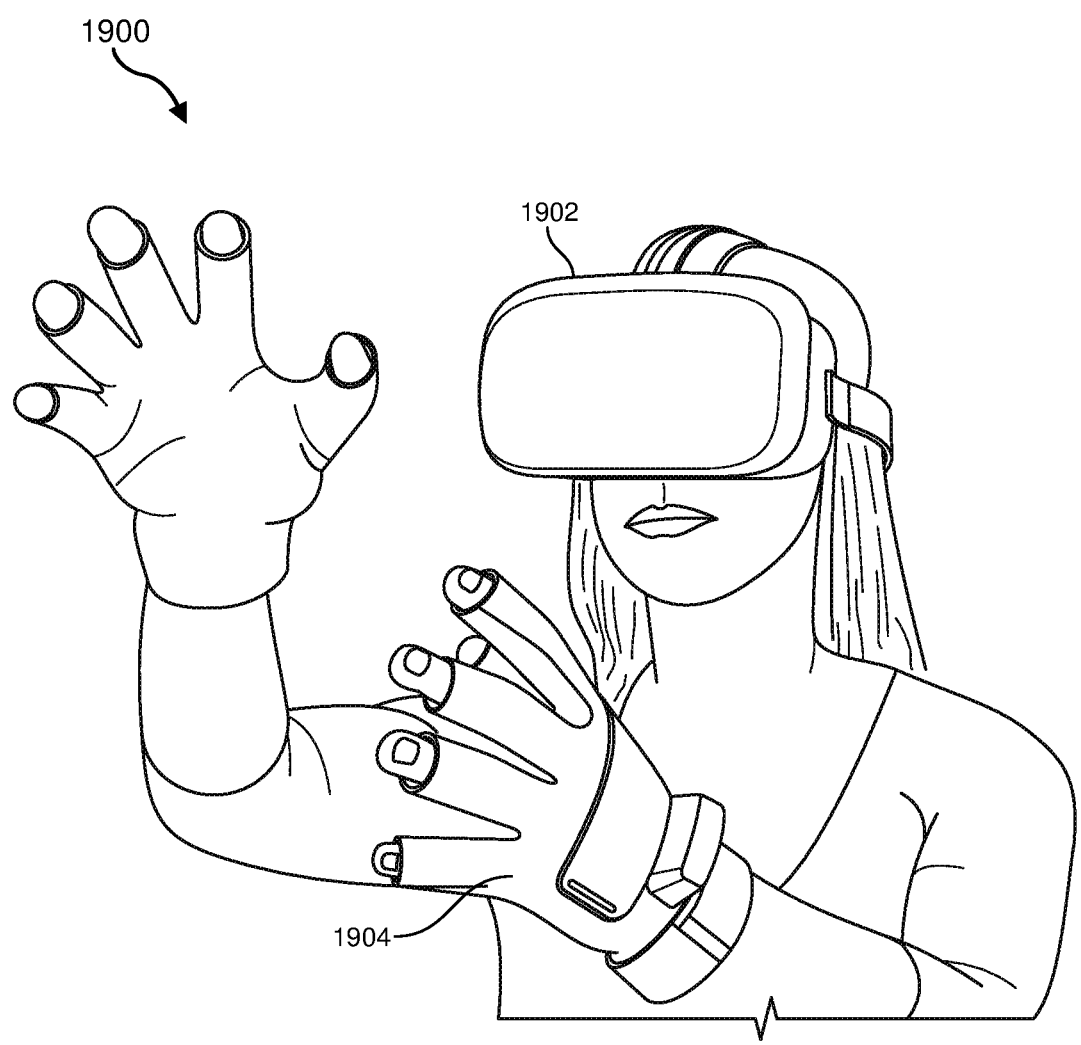
FIG. 19 is an illustration of an exemplary virtual-reality environment according to embodiments of this disclosure.

Haptic wearables, such as those shown in and described in connection with FIG. 18, may be implemented in a variety of types of artificial-reality systems and environments. FIG. 19 shows an example artificial reality environment 1900 including one head-mounted virtual-reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system.

Head-mounted display 1902 generally represents any type or form of virtual-reality system, such as virtual-reality system 1700 in FIG. 17. Haptic device 1904 generally represents any type or form of wearable device, worn by a use of an artificial reality system, that provides haptic feedback to the user to give the user the perception that he or she is physically engaging with a virtual object. In some embodiments, haptic device 1904 may provide haptic feedback by applying vibration, motion, and/or force to the user. For example, haptic device 1904 may limit or augment a user's movement. To give a specific example, haptic device 1904 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some embodiments, a user may also use haptic device 1904 to send action requests to a console. Examples of action requests include, without limitation, requests to start an application and/or end the application and/or requests to perform a particular action within the application.

Figure 20:
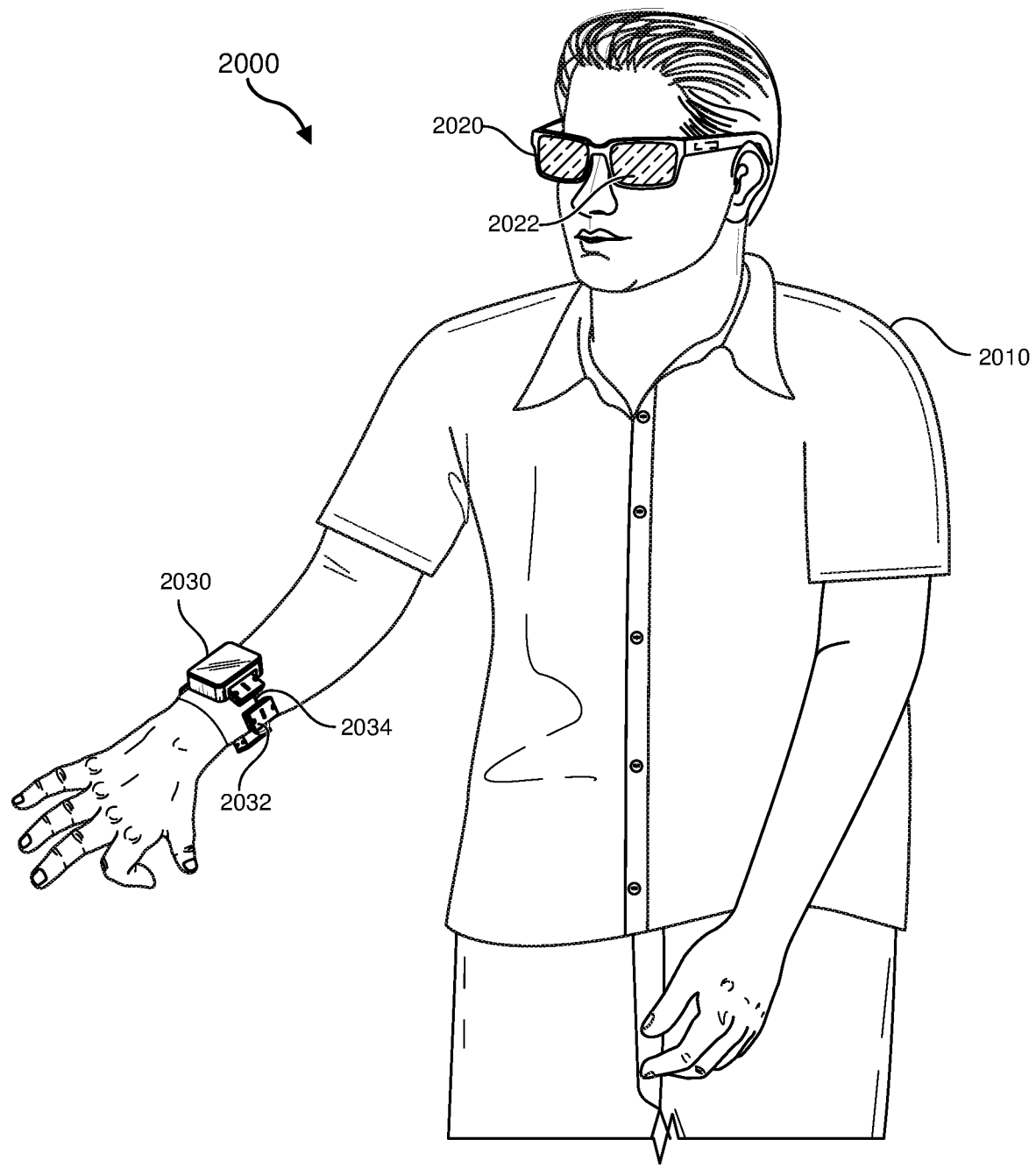
FIG. 20 is an illustration of an exemplary augmented-reality environment according to embodiments of this disclosure.

While haptic interfaces may be used with virtual-reality systems, as shown in FIG. 19, haptic interfaces may also be used with augmented-reality systems, as shown in FIG. 20. FIG. 20 is a perspective view a user 2010 interacting with an augmented-reality system 2000. In this example, user 2010 may wear a pair of augmented-reality glasses 2020 that have one or more displays 2022 and that are paired with a haptic device 2030. Haptic device 2030 may be a wristband that includes a plurality of band elements 2032 and a tensioning mechanism 2034 that connects band elements 2032 to one another.

One or more of band elements 2032 may include any type or form of actuator suitable for providing haptic feedback. For example, one or more of band elements 2032 may be configured to provide one or more of various types of cutaneous feedback, including vibration, force, traction, texture, and/or temperature. To provide such feedback, band elements 2032 may include one or more of various types of actuators. In one example, each of band elements 2032 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1810, 1820, 1904, and 2030 may include any suitable number and/or type of haptic transducer, sensor, and/or feedback mechanism. For example, haptic devices 1810, 1820, 1904, and 2030 may include one or more mechanical transducers, piezoelectric transducers, and/or fluidic transducers. Haptic devices 1810, 1820, 1904, and 2030 may also include various combinations of different types and forms of transducers that work together or independently to enhance a user's artificial-reality experience. In one example, each of band elements 2032 of haptic device 2030 may include a vibrotactor (e.g., a vibrotactile actuator) configured to vibrate in unison or independently to provide one or more of various types of haptic sensations to a user.

Figure 21:
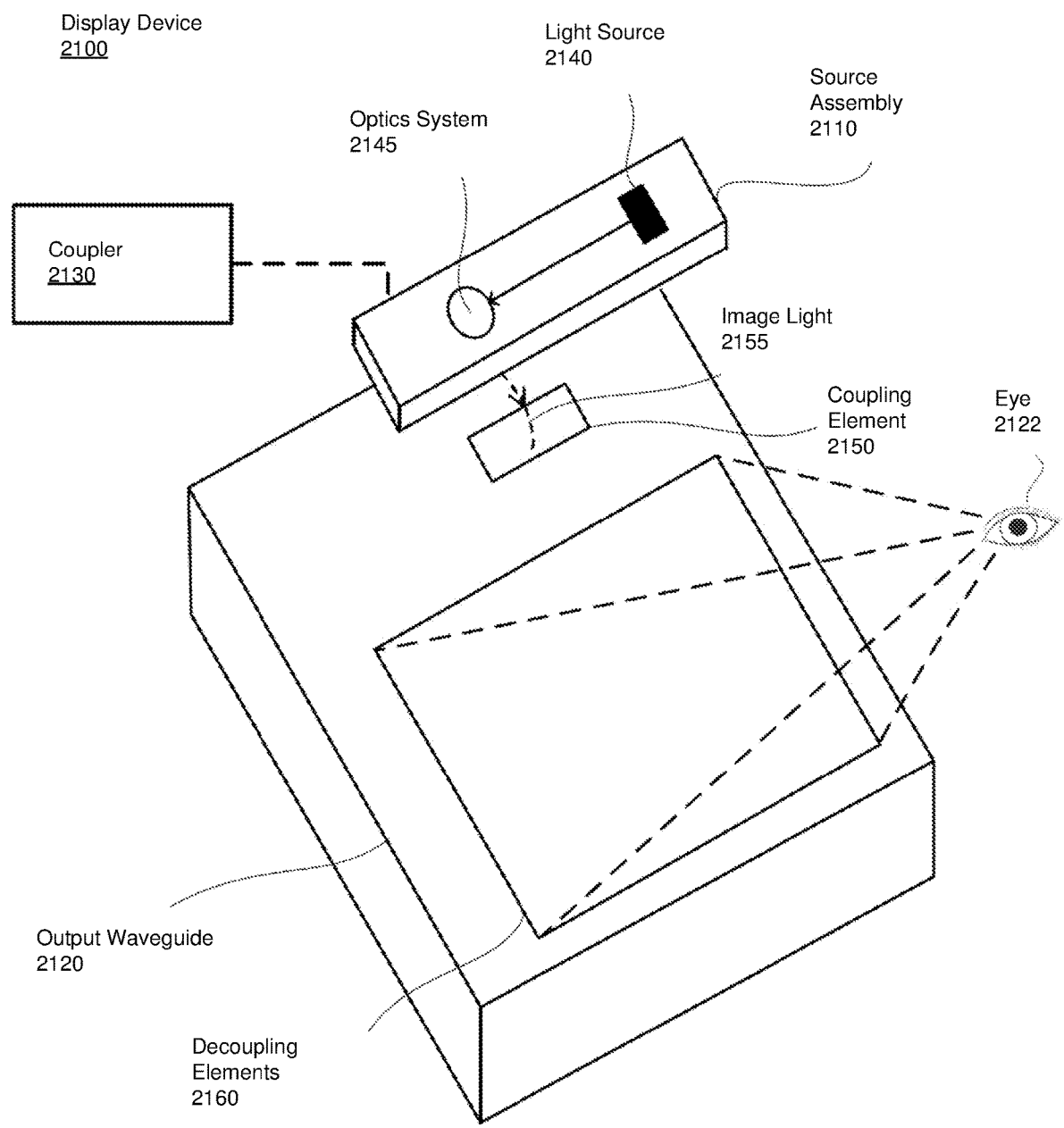
FIG. 21 is a perspective view of a display device, in accordance with some embodiments.

FIG. 21 illustrates a perspective view of a display device 2100, in accordance with an embodiment. In some embodiments, the display device 2100 may be a component (e.g., the waveguide assembly or part of the waveguide assembly) of a NED. In some embodiments, the display device 2100 may part of some other NEDs, or another system that directs display image light to a particular location. Depending on embodiments and implementations, the display device 2100 may also be referred to as a waveguide display and/or a scanning display. However, in some embodiments, the display device 2100 may not include a scanning mirror. For example, the display device 2100 may include matrices of light emitters that project light on an image field through a waveguide but without a scanning mirror. In some embodiments, the image emitted by the two-dimensional matrix of light emitters may be magnified by an optical assembly (e.g., lens) before the light arrives a waveguide or a screen.

For a particular embodiment that uses a waveguide and an optical system, the display device 2100 may include a source assembly 2110, an output waveguide 2120, and a controller 2130. The display device 2100 may provide images for both eyes or for a single eye. For purposes of illustration, FIG. 21 shows the display device 2100 associated with a single eye 220. Another display device (not shown), separated (or partially separated) from the display device 2100, provides image light to another eye of the user. In a partially separated system, one or more components may be shared between display devices for each eye.

In this example, the source assembly 2110 generates image light 2155. The source assembly 2110 includes a light source 2140 and an optics system 2145. The light source 2140 may include an optical component that generates image light using a plurality of light emitters arranged in a matrix. Each light emitter may emit monochromatic light. The light source 2140 generates image light including, but not restricted to, red image light, blue image light, green image light, infra-red image light, etc. While RGB is often discussed in this disclosure, embodiments described herein are not limited to using red, blue, and green as primary colors. Other colors are also possible to be used as the primary colors of the display device. Also, a display device in accordance with an embodiment may use more than three primary colors.

The optics system 2145 may perform a set of optical processes, including, but not restricted to, focusing, combining, conditioning, and scanning processes on the image light generated by the light source 2140.

In some embodiments, the optics system 2145 may include a combining assembly, a light conditioning assembly, and a scanning mirror assembly. The source assembly 2110 may generate and output image light 2155 to a coupling element 2150 of the output waveguide 2120.

In this example, the output waveguide 2120 is an optical waveguide that outputs image light to an eye 220 of a user. The output waveguide 2120 may receive the image light 2155 at one or more coupling elements 2150 and guide the received input image light to one or more decoupling elements 2160. The coupling element 2150 may be, for example, a diffraction grating, a holographic grating, some other element that couples the image light 2155 into the output waveguide 2120, or some combination thereof. For example, in embodiments where the coupling element 2150 is diffraction grating, the pitch of the diffraction grating is chosen such that total internal reflection occurs, and the image light 2155 propagates internally toward the decoupling element 2160. The pitch of the diffraction grating may be in the range of 300 nm to 600 nm.

The decoupling element 2160 may decouple the total internally reflected image light from the output waveguide 2120. The decoupling element 2160 may be, for example, a diffraction grating, a holographic grating, some other element that decouples image light out of the output waveguide 2120, or some combination thereof. For example, in embodiments where the decoupling element 2160 is a diffraction grating, the pitch of the diffraction grating is chosen to cause incident image light to exit the output waveguide 2120. An orientation and position of the image light exiting from the output waveguide 2120 are controlled by changing an orientation and position of the image light 2155 entering the coupling element 2150. The pitch of the diffraction grating may be in the range of 300 nm to 600 nm.

The output waveguide 2120 may include one or more materials that facilitate total internal reflection of the image light 2155. The output waveguide 2120 may include, for example, silicon, plastic, glass, or polymers, or some combination thereof. The output waveguide 2120 may have a relatively small form factor. For example, the output waveguide 2120 may be approximately 50 mm wide along the X-dimension, 30 mm long along the Y-dimension, and 0.5-1 mm thick along the Z-dimension.

The controller 2130 may control the image rendering operations of the source assembly 2110. The controller 2130 may determine instructions for the source assembly 2110 based at least on the one or more display instructions. Display instructions may include instructions to render one or more images. In some embodiments, display instructions may include an image file (e.g., bitmap data). The display instructions may be received from, for example, a console of a VR system (not shown here). Scanning instructions may represent instructions used by the source assembly 2110 to generate image light 2155. The scanning instructions may include, for example, a type of a source of image light (e.g., monochromatic, polychromatic), a scanning rate, an orientation of a scanning apparatus, one or more illumination parameters, or some combination thereof. The controller 2130 may include a combination of hardware, software, and/or firmware not shown here so as not to obscure other aspects of the disclosure.

In some embodiments, an electronic display may include a light emitter, which may include one or more microLEDs. In some embodiments, a microLED may have a size (e.g., a diameter of the emission surface of the microLED) of between approximately 10 nm and approximately 20 microns. In some embodiments, an arrangement of microLEDs may have a pitch (e.g., a spacing between two microLEDs) of between approximately 10 nm and approximately 20 microns. The pitch may be a spacing between adjacent microLEDs. In some examples, the pitch may be a center to center spacing of microLEDs, and may be within a range having a lower bound based on the diameter of the emission surface. In some embodiments, other types of light emitters may be used. In some embodiments, an optical combiner may include the waveguide and one or more additional optical components as described herein.

In some embodiments, an optical combiner may include a waveguide assembly configured to direct the image light (e.g., augmented reality image light projected from an electronic display) to the eye of a user through what may be termed the exit pupil. The waveguide assembly may include one or more materials (e.g., plastic, glass, and the like), and various optical components may have one or more refractive indices, or, in some embodiments, a gradient refractive index. The waveguide assembly may be configured to effectively minimize the weight and widen a field of view (FOV) of a NED. In some embodiments, a NED may include one or more optical elements between the waveguide assembly and the eye. For example, the optical elements may be configured to magnify image light emitted from the waveguide assembly, and/or to provide other optical adjustment(s) of image light emitted from the waveguide assembly. For example, the optical element configuration may include one or more of an aperture, a Fresnel lens, a convex lens, a concave lens, a filter, or any other suitable optical element, for example, configured to correct aberrations in image light emitted from the waveguide assembly. In some embodiments, a waveguide assembly may produce and direct pupil replications to the eyebox region. An exit pupil may include a location where the eye is positioned in an eyebox region when the user wears the device, such as a device including a NED. In some embodiments, the device may include a frame configured to support the device on the body, such as the head, or a user, a frame of eye-wear glasses (also referred to herein as simply glasses). In some embodiments, a second optical combiner including, for example, a waveguide assembly, may be used to provide image light to another eye of the user.

In some embodiments, an electronic display (which may also be termed a display device) may include one or more, such as a plurality, of monochromatic light emitter arrays, such as projector arrays. One or more of the arrays may include a reduced number of light emitters compared to other arrays so that a color channel associated with an array with the reduced number has a reduced resolution compared to other color channels. The light emitted by light emitters of different arrays may be converged by an optical component such as a waveguide so that the light of different colors spatially overlap at each image pixel location. The display device may include an image processing unit that applies an anti-aliasing filter that may include a plurality of convolution kernels to reduce any visual effects perceived by users with respect to one or more color channels having a reduced resolution. In some embodiments, the device may be configured to be worn by a user, and the device may be configured so that the augmented reality image element is projected towards an eye of the user after passing through the optical combiner. In some embodiments, the augmented reality image element includes a plurality of color channels, the electronic display includes a separate projector array for each color channel, and each projector array may be coupled into the optical combiner, which may include one or more waveguides. In some examples, the electronic display includes a plurality of projector arrays, with each projector array of the plurality of projector arrays providing a color channel, and each color channel may be coupled into the optical combiner. Each projector array may include a microLED array, for example, a microLED array having microLEDs spaced apart by less than approximately 5 microns, for example, less than approximately 2 microns. MicroLEDs in an arrangement (such as an array) may have a size (e.g., a diameter of the emission surface of the LED device) and/or a pitch (e.g., a spacing between the edges or centers of two proximate microLEDs) of between approximately 10 nm and approximately 20 microns. The lower bound of a center-to-center pitch range may be determined, at least in part, by the diameter of the emission surface. In some examples, microLED arrangements, such as arrays, may have a spacing between microLEDs (e.g., edge-to-edge distance) of between approximately 10 nm and approximately 20 microns.

In some embodiments, a source assembly may include a light source configured to emit light that may be processed optically by an optics system to generate image light that may be projected onto an image field. The light source may be driven by a driver circuit, based on the data sent from a controller or an image processing unit. In some embodiments, the driver circuit may include a circuit panel that may connect to and may mechanically hold one or more light emitters of the light source. The combination of a driver circuit and the light source may sometimes be referred to as a display panel or an LED panel (e.g., the latter if the light emitters include some form of LED).

The light source may generate a spatially coherent or a partially spatially coherent image light. The light source may include multiple light emitters. The light emitters can be vertical cavity surface emitting laser (VCSEL) devices, light emitting diodes (LEDs), microLEDs, tunable lasers, and/or some other light emitting devices. In one embodiment, the light source includes a matrix of light emitters. In some embodiments, the light source includes multiple sets of light emitters with each set grouped by color and arranged in a matrix form. The light source emits light in a visible band (e.g., from about 390 nm to 700 nm). The light source emits light in accordance with one or more illumination parameters that are set by the controller and potentially adjusted by image processing unit and driver circuit. An illumination parameter may be an instruction used by the light source to generate light. An illumination parameter may include, for example, source wavelength, pulse rate, pulse amplitude, beam type (continuous or pulsed), other parameter(s) that affect the emitted light, or some combination thereof. The light source may emit source light. In some embodiments, the source light 385 includes multiple beams of red light, green light, and blue light, or some combination thereof.

The optics system may include one or more optical components that optically adjust and potentially re-direct the light from the light source. One form of example adjustment of light may include conditioning the light. Conditioning the light from the light source may include, e.g., expanding, collimating, correcting for one or more optical errors (e.g., field curvature, chromatic aberration, etc.), some other adjustment of the light, or some combination thereof. The optical components of the optics system may include, for example, lenses, mirrors, apertures, gratings, or some combination thereof. Light emitted from the optics system may be referred to as an image light.

The optics system may redirect image light via its one or more reflective and/or refractive portions so that the image light is projected at a particular orientation toward the output waveguide. Where the image light is redirected toward may be based on specific orientations of the one or more reflective and/or refractive portions. In some embodiments, the optics system includes a single scanning mirror that scans in at least two dimensions. In some embodiments, the optics system may include a plurality of scanning mirrors that each scan in orthogonal directions to each other. The optics system may perform a raster scan (horizontally, or vertically), a biresonant scan, or some combination thereof. In some embodiments, the optics system may perform a controlled vibration along the horizontal and/or vertical directions with a specific frequency of oscillation to scan along two dimensions and generate a two-dimensional projected line image of the media presented to user's eyes. In some embodiments, the optics system may also include a lens that serves similar or same function as one or more scanning mirror.

In some embodiments, the optics system includes a galvanometer mirror. For example, the galvanometer mirror may represent any electromechanical instrument that indicates that it has sensed an electric current by deflecting a beam of image light with one or more mirrors. The galvanometer mirror may scan in at least one orthogonal dimension to generate the image light 355. The image light 355 from the galvanometer mirror may represent a two-dimensional line image of the media presented to the user's eyes.

In some embodiments, the source assembly may not include an optics system. In these embodiments, light emitted by the light source may be projected directly into the waveguide.

The controller may control the operations of the light source and, in some cases, the optics system. In some embodiments, the controller may be the graphics processing unit (GPU) of a display device. In some embodiments, the controller may include one or more different or additional processors. The operations performed by the controller may include taking content for display and dividing the content into discrete sections. The controller may instruct the light source to sequentially present the discrete sections using light emitters corresponding to a respective row in an image ultimately displayed to the user. The controller may instruct the optics system to adjust the light. For example, the controller may control the optics system to scan the presented discrete sections to different areas of a coupling element of the output waveguide. Accordingly, at the exit pupil of the output waveguide, each discrete portion may be presented in a different location. While each discrete section is presented at different times, the presentation and scanning of the discrete sections may occur fast enough such that a user's eye integrates the different sections into a single image or series of images. The controller may also provide scanning instructions to the light source that include an address corresponding to an individual source element of the light source and/or an electrical bias applied to the individual source element.

The image processing unit may be a general-purpose processor and/or one or more application-specific circuits that are dedicated to performing the features described herein. In one embodiment, a general-purpose processor may be coupled to a memory device to execute software instructions that cause the processor to perform certain processes described herein. In some embodiments, the image processing unit may include one or more circuits that are dedicated to performing certain features. The image processing unit may be a stand-alone unit that is separate from the controller and the driver circuit, but in some embodiments the image processing unit may be a sub-unit of the controller or the driver circuit. In other words, in those embodiments, the controller or the driver circuit performs various image processing procedures of the image processing unit. The image processing unit may also be referred to as an image processing circuit.

Figure 22:
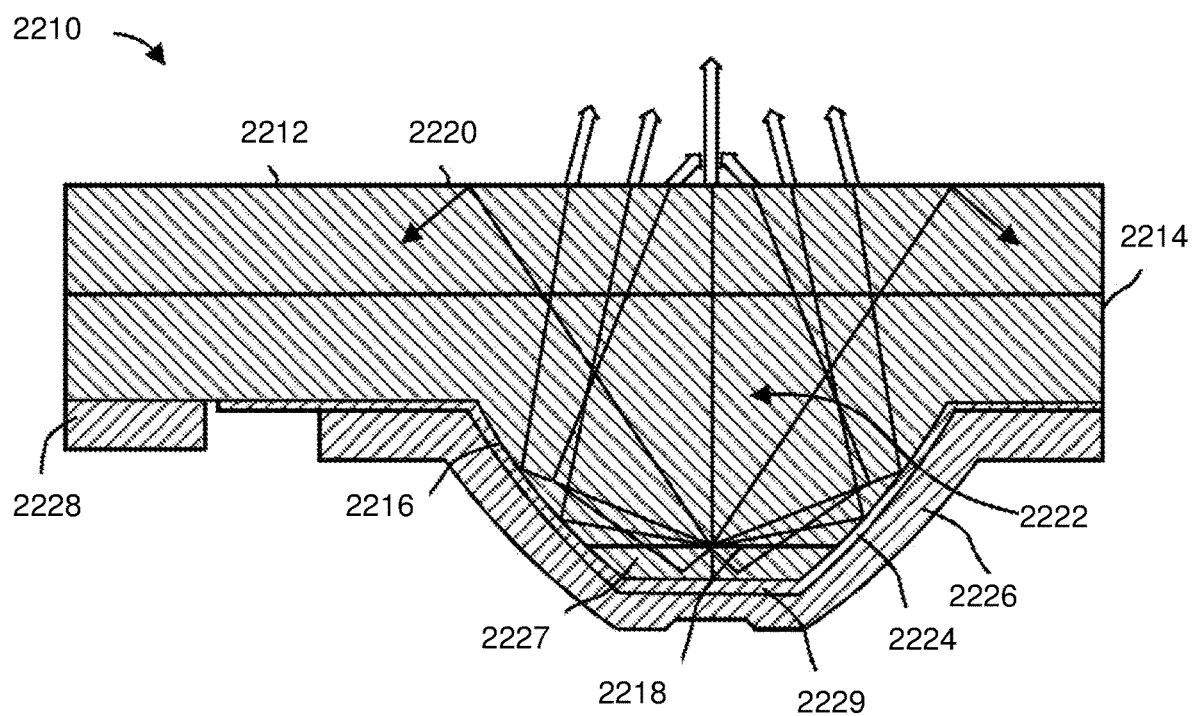
FIG. 22 is a schematic cross-sectional diagram of an example of light emitter, in accordance with some embodiments.

FIG. 22 is a schematic cross-sectional diagram of an example micro-LED light emitter 2210 that may be used as an individual light emitter in a light emitter array. A microLED may have a relatively small active light emitting area, in some embodiments less than 2,000 µm$^2$, and in some embodiments less than 20 µm², or less than 10 µm². In some embodiments, the emissive surface of the microLED 2210 may have a diameter of less than approximately 5 µm, although smaller (e.g., 2 µm) or larger diameters for the emissive surface may be used in some embodiments. The microLED 2210 may also have collimated or non-Lambertian light output, in some embodiments, which may increase the brightness level of light emitted from a small active light-emitting area.

The microLED 2210 may include, among other components, an LED substrate 2212 with a semiconductor epitaxial layer 2214 disposed on the substrate 2212, a dielectric layer 2224 and a p-contact 2229 disposed on the epitaxial layer 2214, a metal reflector layer 2226 disposed on the dielectric layer 2224 and p-contact 2229, and an n-contact 2228 disposed on the epitaxial layer 2214. The epitaxial layer 2214 may be shaped into a mesa 2216. An active light-emitting area 2218 may be formed in the structure of the mesa 2216 by way of a p-doped region 2227 of the epitaxial layer 2214.

The substrate 2212 may include transparent materials such as sapphire or glass. In one embodiment, the substrate 2212 may include silicon, silicon oxide, silicon dioxide, aluminum oxide, sapphire, an alloy of silicon and germanium, indium phosphide (InP), and the like. In some embodiments, the substrate 2212 may include a semiconductor material (e.g., monocrystalline silicon, germanium, silicon germanium (SiGe), and/or a III-V based material (e.g., gallium arsenide), or any combination thereof. In various embodiments, the substrate 2212 can include a polymer-based substrate, glass, or any other bendable substrate including two-dimensional materials (e.g., graphene and molybdenum disulfide), organic materials (e.g., pentacene), transparent oxides (e.g., indium gallium zinc oxide (IGZO)), polycrystalline III-V materials, polycrystalline germanium, polycrystalline silicon, amorphous III-V materials, amorphous germanium, amorphous silicon, or any combination thereof. In some embodiments, the substrate 2212 may include a III-V compound semiconductor of the same type as the active LED (e.g., gallium nitride). In other examples, the substrate 2212 may include a material having a lattice constant close to that of the epitaxial layer 2214.

The epitaxial layer 2214 may include gallium nitride (GaN) or gallium arsenide (GaAs). The active layer 2218 may include indium gallium nitride (InGaN). The type and structure of semiconductor material used may vary to produce microLEDs that emit specific colors. In one embodiment, the semiconductor materials used can include a III-V semiconductor material. III-V semiconductor material layers can include those materials that are formed by combining group III elements (Al, Ga, In, etc.) with group V elements (N, P, As, Sb, etc.). The p-contact 2229 and n-contact 2228 may be contact layers formed from indium tin oxide (ITO) or another conductive material that can be transparent at the desired thickness or arrayed in a grid-like pattern to provide for both good optical transmission/transparency and electrical contact, which may result in the microLED 2210 also being transparent or substantially transparent. In such examples, the metal reflector layer 2226 may be omitted. In some embodiments, the p-contact 2229 and the n-contact 2228 may include contact layers formed from conductive material (e.g., metals) that may not be optically transmissive or transparent, depending on pixel design.

In some implementations, alternatives to ITO can be used, including wider-spectrum transparent conductive oxides (TCOs), conductive polymers, metal grids, carbon nanotubes (CNT), graphene, nanowire meshes, and thin-metal films. Additional TCOs can include doped binary compounds, such as aluminum-doped zinc-oxide (AZO) and indium-doped cadmium-oxide. Additional TCOs may include barium stannate and metal oxides, such as strontium vanadate and calcium vanadate. In some implementations, conductive polymers can be used. For example, a poly(3,4-ethylenedioxythiophene) PEDOT: poly(styrene sulfonate) PSS layer can be used. In another example, a poly(4,4-dioctyl cyclopentadithiophene) material doped with iodine or 2,3-dichloro-5,6-dicyano-1,4-benzoquinone (DDQ) can be used. The example polymers and similar materials can be spin-coated in some example embodiments.

In some embodiments, the p-contact 2229 may be of a material that forms an ohmic contact with the p-doped region 2227 of the mesa 2216. Examiner of such materials may include, but are not limited to, palladium, nickel oxide deposited as a NiAu multilayer coating with subsequent oxidation and annealing, silver, nickel oxide/silver, gold/zinc, platinum gold, or other combinations that form ohmic contacts with p-doped III-V semiconductor material.

The mesa 2216 of the epitaxial layer 2214 may have a truncated top on a side opposed to a substrate light emissive surface 2220 of the substrate 2212. The mesa 2216 may also have a parabolic or near-parabolic shape to form a reflective enclosure or parabolic reflector for light generated within the microLED 2210. However, while FIG. 22 depicts a parabolic or near-parabolic shape for the mesa 2216, other shapes for the mesa 2216 are possible in some embodiments. The arrows indicate how light 2222 emitted from the active layer 2218 may be reflected off the internal walls of the mesa 2216 toward the light emissive surface 2220 at an angle sufficient for the light to escape the microLED 2210 (i.e., outside an angle of total internal reflection). The p-contact 2229 and the n-contact 2228 may electrically connect the microLED 2210 to a substrate.

The parabolic-shaped structure of the microLED 2210 may result in an increase in the extraction efficiency of the microLED 2210 into low illumination angles when compared to unshaped or standard LEDs. Standard LED dies may generally provide an emission full width at half maximum (FWHM) angle of 120°. In comparison, the microLED 2210 can be designed to provide controlled emission angle FWHM of less than standard LED dies, such as around 41°. This increased efficiency and collimated output of the microLED 2210 can enable improvement in overall power efficiency of the NED, which can be important for thermal management and/or battery life.

The microLED 2210 may include a circular cross-section when cut along a horizontal plane, as shown in FIG. 22. However, the microLED 2210 cross-section may be non-circular in other examples. The microLED 2210 may have a parabolic structure etched directly onto the LED die during the wafer processing steps. The parabolic structure may include the active light-emitting area 2218 of the microLED 2210 to generate light, and the parabolic structure may reflect a portion of the generated light to form the quasi-collimated light 2222 emitted from the substrate light emissive surface 2220. In some embodiments, the optical size of the microLED 2210 may be smaller than or equal to the active light-emitting area 2218. In some embodiments, the optical size of the microLED 2210 may be larger than the active light-emitting area 2218, such as through a refractive or reflective approach, to improve usable brightness of the microLED 2210, including any chief ray angle (CRA) offsets to be produced by the light emitter array 2202.

In some embodiments, a light source may further include a microLED based light emitter that may further include a microlens, which may be, for example, be formed over a parabolic reflector structure. A microlens may be formed, for example, by applying a polymer coating over the microLED, patterning the coating, and reflowing the coating to achieve the desired lens curvature. The microlens may be disposed over an emissive surface to alter a chief ray angle of the microLED. In some embodiments, a microlens may be formed by depositing a microlens material above the microLED (e.g., by a spin-on method or a deposition process). For example, a microlens template having a curved upper surface can be patterned above the microlens material. In some embodiments, the microlens template may include a photoresist material exposed using a distributing exposing light dose (e.g., for a negative photoresist, more light is exposed at a bottom of the curvature and less light is exposed at a top of the curvature), developed, and baked to form a rounding shape. The microlens can then be formed by selectively etching the microlens material according to the microlens template. In some embodiments, the shape of the microlens may be formed by etching into the substrate, for example, the substrate 2212 of the light source. In some embodiments, other types of light-shaping or light-distributing elements, such as an annular lens, Fresnel lens, or photonic crystal structures, may be used along with or instead of microlenses.

In some embodiments, microLED arrangements other than those specifically discussed above may be employed as a microLED in a light emitter array. For example, a microLED may include isolated pillars of epitaxially grown light-emitting material surrounded by a metal reflector. The pixels of an example light emitter array may include clusters of small pillars (e.g., nanowires) of epitaxially grown material that may or may not be surrounded by reflecting material or absorbing material to prevent optical crosstalk. In some embodiments, microLED pixels may be individual metal p-contacts on a planar, epitaxially grown LED device, in which the individual pixels may be electrically isolated using passivation means, such as plasma treatment, ion-implantation, or the like. Such devices may be fabricated with light extraction enhancement methods, such as microlenses, diffractive structures, or photonic crystals. Other processes for fabricating the microLEDs of the dimensions noted above other than those specifically disclosed herein may be employed in some embodiments.

Figure 23:
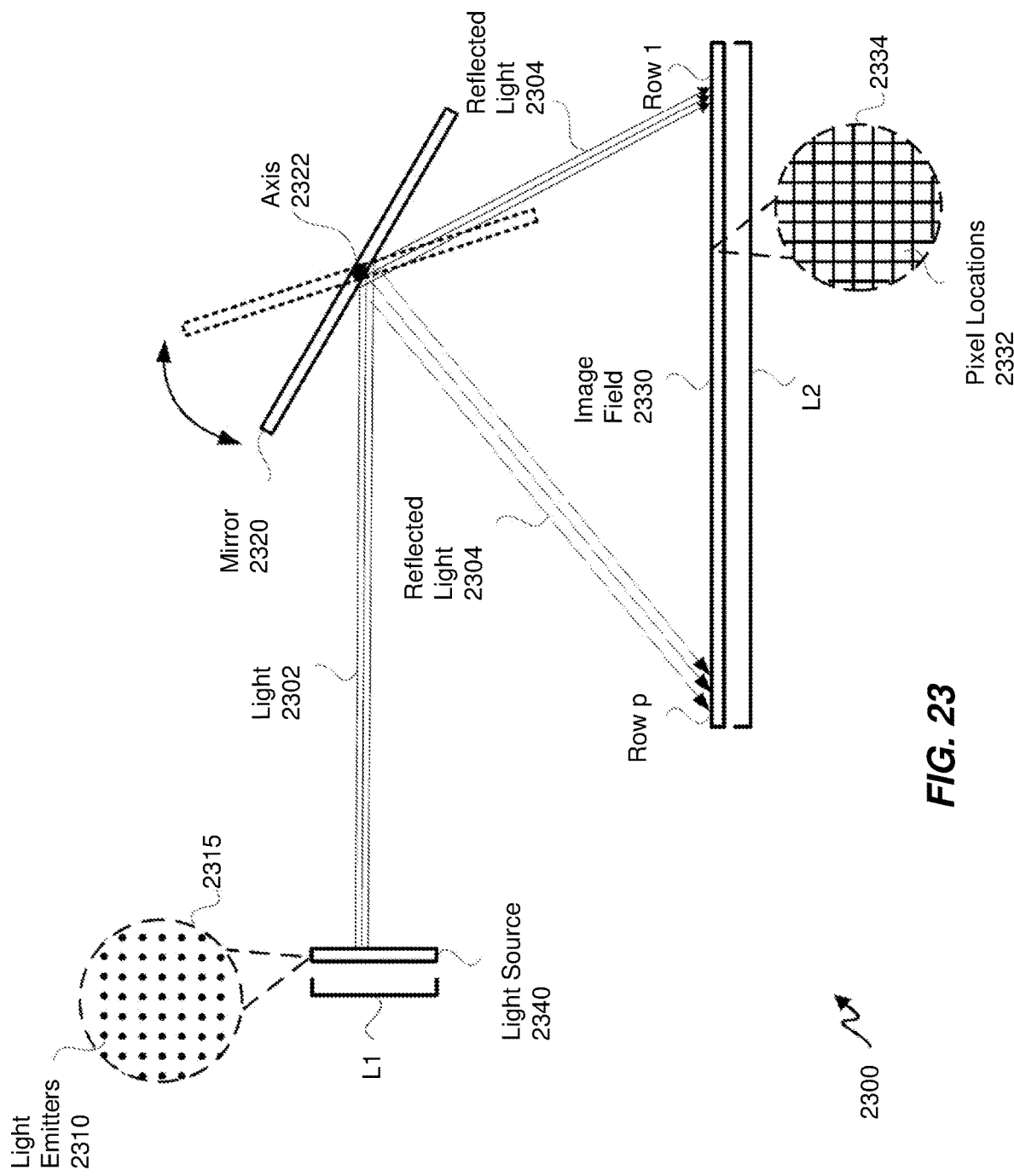
FIG. 23 is a diagram illustrating a scanning operation of a display device, in accordance with some embodiments.
Figure 24:
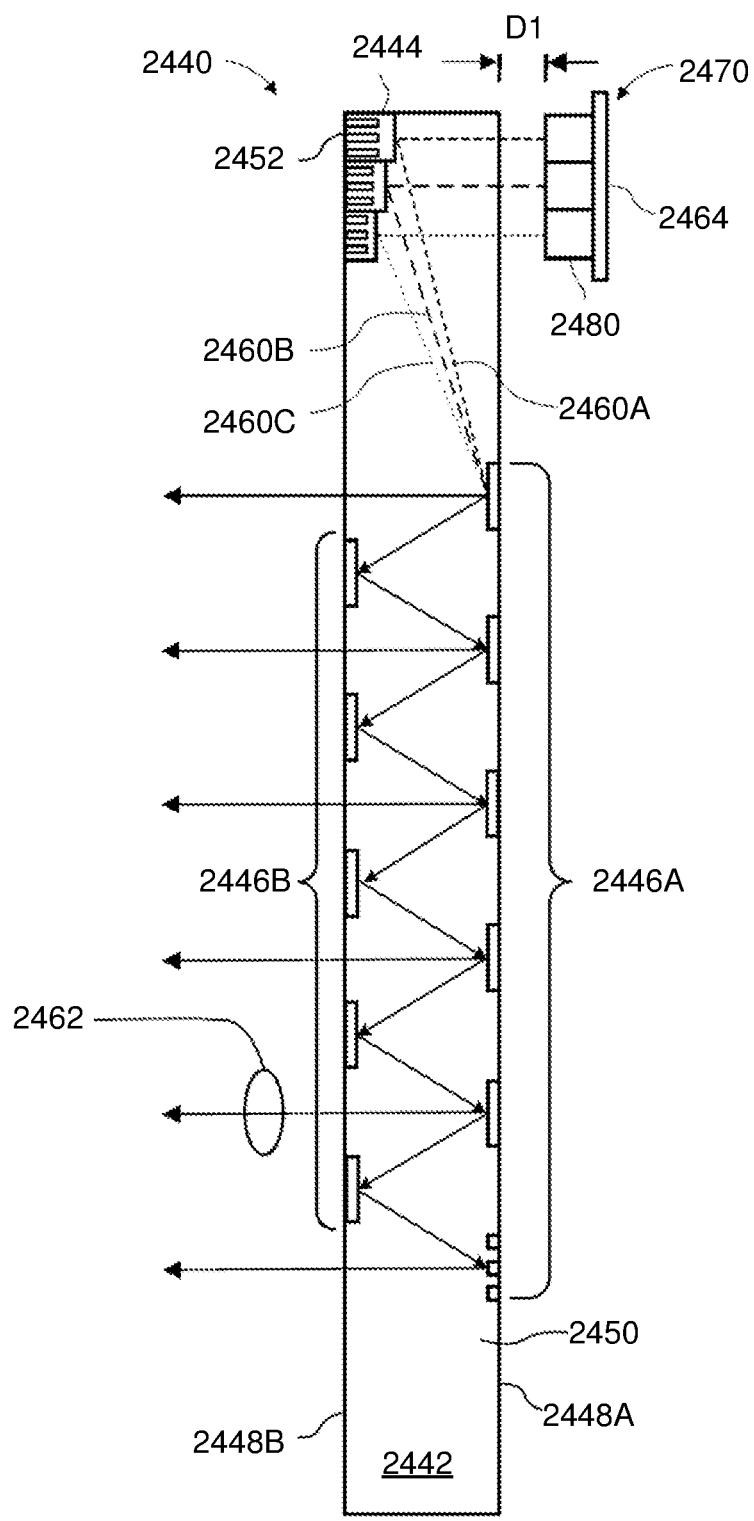
FIG. 24 illustrates a waveguide configured to form an image and image replications (pupil replications), in accordance with some embodiments.

FIGS. 23 and 24 illustrate how images and pupil replications may be formed in a display device based on different structural arrangement of light emitters, in accordance with various embodiments. An image field may include an area that receives the light emitted by the light source and forms an image. For example, an image field may correspond to a portion of the coupling element 2150 or a portion of the decoupling elements 2160 in FIG. 21. In some cases, an image field may not include an actual physical structure, but may be an area to which the image light is projected and in which the image is formed. In some embodiments, the image field may include a surface of the coupling element 2150 of FIG. 21, and the image formed on the image field may magnified as light travels through the output waveguide. In some embodiments, an image field may be formed after light passes through a waveguide, which combines light of different colors to form the image field. In some embodiments, the image field may be projected directly into the user's eyes.

FIG. 23 is a diagram illustrating a scanning operation of a display device 2300 using a scanning mirror 2320 to project light from a light source 2340 to an image field 2330, in accordance with an embodiment. The display device 2300 may correspond to the near-eye display 100 or another scan-type display device. The light source 2340 may be similar to the light sources shown elsewhere, or may be any suitable light source, such as any light source configured for use in a display device. The light source 2340 may include multiple rows and columns of light emitters, as represented by the dots in inset 2315. In one embodiment, the light source 2340 may include a single line of light emitters for each color. In some embodiments, the light source 2340 may include more than one line of light emitters for each color. The light 2302 emitted by the light source 2340 may include a set of collimated beams of light. For example, the light 2302 in FIG. 23 shows multiple beams that may be emitted by a column of light emitters. Before reaching the mirror 2320, the light 2302 may be conditioned by different optical devices such as a conditioning assembly (not shown in FIG. 23). In this example, the mirror 2320 reflects and projects the light 2302 from the light source 2340 to the image field 2330. The mirror 2320 rotates about an axis 2322. The mirror 2320 may be a microelectromechanical system (MEMS) mirror or any other suitable mirror. The mirror 2320 may be an embodiment of the optics system referenced herein. As the mirror 2320 rotates, the light 2302 may be directed to a different part of the image field 2330, as illustrated by the reflected part of the light 2304 in solid lines and the reflected part of the light 2304 in dash lines.

At a particular orientation of the mirror 2320 (i.e., a particular rotational angle), the light emitters may illuminate a portion of the image field 2330 (e.g., a particular subset of multiple pixel locations 2332 on the image field 2330). In some embodiments, the light emitters are arranged and spaced such that a light beam from each light emitter is projected on a corresponding pixel location, for example, 2332. In some embodiments, small light emitters such as microLEDs may be used, so that light beams from a subset of multiple light emitters are together projected at the same pixel location 2332. In other words, a subset of multiple light emitters may collectively illuminate a single pixel location 2332 at the same time.

The image field 2330 may also be referred to as a scan field because, when the light 2302 is projected to an area of the image field 2330, the area of the image field 2330 is illuminated by the light 2302. The image field 2330 may be spatially defined by a matrix of pixel locations 2332 (represented by the blocks in inset 2334) in rows and columns. In some examples, a pixel location may refer to a single pixel. The pixel locations 2332 (or simply the pixels) in the image field 2330 sometimes may not actually be additional physical structure. Instead, the pixel locations 2332 may be spatial regions that divide the image field 2330. Also, the sizes and locations of the pixel locations 2332 may depend on the projection of the light 2302 from the light source 2340. For example, at a given angle of rotation of the mirror 2320, light beams emitted from the light source 2340 may fall on an area of the image field 2330. As such, the sizes and locations of pixel locations 2332 of the image field 2330 may be defined based on the location of each light beam. In some cases, a pixel location 2332 may be subdivided spatially into subpixels (not shown). For example, a pixel location 2332 may include a red subpixel, a green subpixel, and a blue subpixel. The red subpixel may correspond to a location at which one or more red light beams are projected, etc. When subpixels are present, the color of a pixel 2332 is based on the temporal and/or spatial average of the subpixels.

The number of rows and columns of light emitters of the light source 2340 may or may not be the same as the number of rows and columns of the pixel locations 2332 in the image field 2330. In one embodiment, the number of light emitters 2310 in a row is equal to the number of pixel locations 2332 in a row of the image field 2330, while the number of light emitters in a column is two or more but fewer than the number of pixel locations 2332 in a column of the image field 2330. Put differently, in such an embodiment, the light source 2340 has the same number of columns of light emitters as the number of columns of pixel locations in the image field but has fewer rows than the image field. For example, in one specific embodiment, the light source 2340 has about 1280 columns of light emitters, which is the same as the number of columns of pixel locations 2332 of the image field 2330, but only a handful of light emitters. The light source 2340 may have a first length L1, which is measured from the first row to the last row of light emitters. The image field 2330 has a second length L2, which is measured from row 1 to row p of the scan field 2330. In one embodiment, L2 is greater than L1 (e.g., L2 is 50 to 10,000 times greater than L1).

Since the number of rows of pixel locations 2332 is larger than the number of rows of light emitters in some embodiments, the display device 2300 may use the mirror 2320 to project the light 2302 to different rows of pixels at different times. As the mirror 2320 rotates and the light 2302 scans through the image field 2330 quickly, an image is formed on the image field 2330. In some embodiments, the light source 2340 may have a smaller number of columns than the image field 2330. The mirror 2320 may rotate in two dimensions to fill the image field 2330 with light (e.g., a raster-type scanning down rows then moving to new columns in the image field 2330).

The display device may operate in predefined display periods. A display period may correspond to a duration of time in which an image is formed. For example, a display period may be associated with the frame rate (e.g., a reciprocal of the frame rate). In the particular embodiment of display device 2300 that includes a rotating mirror, the display period may also be referred to as a scanning period. A complete cycle of rotation of the mirror 2320 may be referred to as a scanning period. A scanning period may refer to a predetermined cycle time during which the entire image field 2330 is completely scanned. The scanning of the image field 2330 may be controlled by the mirror 2320. The light generation of the display device 2300 may be synchronized with the rotation of the mirror 2320. For example, in one embodiment, the movement of the mirror 2320 from an initial position that projects light to row 1 of the image field 2330, to the last position that projects light to row p of the image field 2330, and then back to the initial position is equal to a scanning period. The scanning period may also be related to the frame rate of the display device 2300. By completing a scanning period, an image (e.g., a frame) may be formed on the image field 2330 per scanning period. Hence, the frame rate may correspond to the number of scanning periods in a second.

As the mirror 2320 rotates, light may scan through the image field and images may be formed. The actual color value and light intensity (brightness) of a given pixel location 2332 may be an average of the color various light beams illuminating the pixel location during the scanning period. After completing a scanning period, the mirror 2320 may revert back to the initial position to project light onto the first few rows of the image field 2330 again, except that a new set of driver signals may be fed to the light emitters 2310. The same process may be repeated as the mirror 2320 rotates in cycles. As such, different images may be formed in the scanning field 2330 in different frames.

FIG. 24 is a diagram illustrating a waveguide configuration to form an image and replications of images that may be referred to as pupil replications, in accordance with some embodiments. The light source of the display device may be separated into three different light emitter arrays. The primary colors may be red, green, and blue, or another combination of other suitable primary colors such as red, yellow, and blue. In some embodiments, the number of light emitters in each light emitter array may be equal to the number of pixel locations an image field. Instead of using a scanning process, each light emitter may be dedicated to generating images at a respective pixel location in the image field. In some embodiments, configurations discussed herein may be combined. For example, the configuration shown in FIG. 24 may be located downstream of the configuration shown in FIG. 23, so that the image formed by the scanning operation in FIG. 23 may further be replicated to generate multiple replications.

The embodiments depicted in FIG. 24 may provide for the projection of many image replications (e.g., pupil replications) or decoupling a single image projection at a single point. Accordingly, additional embodiments of disclosed NEDs may provide for a single decoupling element. Outputting a single image toward the eyebox may preserve the intensity of the coupled image light. Some embodiments that provide for decoupling at a single point may further provide for steering of the output image light. Such pupil-steering NEDs may further include systems for eye tracking to monitor a user's gaze. Some embodiments of the waveguide configurations that provide for pupil replication, as described herein, may provide for one-dimensional replication, while some embodiments may provide for two-dimensional replication. For simplicity, one-dimensional pupil replication is shown in FIG. 24. Two-dimensional pupil replication may include directing light into and outside the plane of FIG. 24. FIG. 24 is presented in a simplified format. The detected gaze of the user may be used to adjust the position and/or orientation of the light emitter arrays individually or the light source 2470 as a whole and/or to adjust the position and/or orientation of the waveguide configuration.

In FIG. 24, a waveguide configuration 2440 may be disposed in cooperation with a light source 2470, which may include one or more monochromatic light emitter arrays 2480 secured to a support structure 2464 (e.g., a printed circuit board or another structure). The support structure 2464 may be coupled to a frame (such as, e.g., a frame of augmented reality glasses or goggles) or other structure. The waveguide configuration 2440 may be separated from the light source 2470 by an air gap having a distance D1. The distance D1 may be in a range from approximately 50 µm to approximately 500 µm in some embodiments. The monochromatic image or images projected from the light source 2470 may pass through the air gap toward the waveguide configuration 2440. Any of the light source embodiments described herein may be utilized as the light source 2470.

The waveguide configuration may include a waveguide 2442, which may be formed from a glass or plastic material. The waveguide 2442 may include a coupling area 2444 and a decoupling area formed by decoupling elements 2446A on a top surface 2448A and decoupling elements 2446B on a bottom surface 2448B in some embodiments. The area within the waveguide 2442 in between the decoupling elements 2446A and 2446B may be considered a propagation area 2450, in which light images received from the light source 2470 and coupled into the waveguide 2442 by coupling elements included in the coupling area 2444 may propagate laterally within the waveguide 2442.

The coupling area 2444 may include a coupling element 2452 configured and dimensioned to couple light of a predetermined wavelength, for example, red, green, or blue light. When a white light emitter array is included in the light source 2470, the portion of the white light that falls in the predetermined wavelength may be coupled by each of the coupling elements 2452. In some embodiments, the coupling elements 2452 may be gratings, such as Bragg gratings, dimensioned to couple a predetermined wavelength of light. In some embodiments, the gratings of each coupling element 2452 may exhibit a separation distance between gratings associated with the predetermined wavelength of light that the particular coupling element 2452 is to couple into the waveguide 2442, resulting in different grating separation distances for each coupling element 2452. Accordingly, each coupling element 2452 may couple a limited portion of the white light from the white light emitter array when included. In other examples, the grating separation distance may be the same for each coupling element 2452. In some embodiments, coupling element 2452 may be or include a multiplexed coupler.

As shown in FIG. 24, a red image 2460A, a blue image 2460B, and a green image 2460C may be coupled by the coupling elements of the coupling area 2444 into the propagation area 2450 and may begin traversing laterally within the waveguide 2442. In one embodiment, the red image 2460A, the blue image 2460B, and the green image 2460C, each represented by a different dash line in FIG. 24, may converge to form an overall image that is represented by a solid line. For simplicity, FIG. 24 may show an image by a single arrow, but each arrow may represent an image field where the image is formed. In some embodiments, red image 2460A, the blue image 2460B, and the green image 2460C, may correspond to different spatial locations.

A portion of the light may be projected out of the waveguide 2442 after the light contacts the decoupling element 2446A for one-dimensional pupil replication, and after the light contacts both the decoupling element 2446A and the decoupling element 2446B for two-dimensional pupil replication. In two-dimensional pupil replication embodiments, the light may be projected out of the waveguide 2442 at locations where the pattern of the decoupling element 2446A intersects the pattern of the decoupling element 2446B.

The portion of light that is not projected out of the waveguide 2442 by the decoupling element 2446A may be reflected off the decoupling element 2446B. The decoupling element 2446B may reflect all incident light back toward the decoupling element 2446A, as depicted. Accordingly, the waveguide 2442 may combine the red image 2460A, the blue image 24606, and the green image 2460C into a polychromatic image instance, which may be referred to as a pupil replication 2462. The polychromatic pupil replication 2462 may be projected toward an eyebox 230 of associated with a user's eye, which may interpret the pupil replication 2462 as a full-color image (e.g., an image including colors in addition to red, green, and blue). The waveguide 2442 may produce tens or hundreds of pupil replications 2462 or may produce a single replication 2462.

In some embodiments, the waveguide configuration may differ from the configuration shown in FIG. 24. For example, the coupling area may be different. Rather than including gratings as coupling element 2452, an alternate embodiment may include a prism that reflects and refracts received image light, directing it toward the decoupling element 2446A. Also, while FIG. 24 generally shows the light source 2470 having multiple light emitters arrays 2480 coupled to the same support structure 2464, some embodiments may employ a light source 2470 with separate monochromatic emitters arrays located at disparate locations about the waveguide configuration (e.g., one or more emitters arrays located near a top surface of the waveguide configuration and one or more emitters arrays located near a bottom surface of the waveguide configuration).

Also, although only three light emitter arrays are shown in FIG. 24, an embodiment may include more or fewer light emitter arrays. For example, in one embodiment, a display device may include two red arrays, two green arrays, and two blue arrays. In one case, the extra set of emitter panels provides redundant light emitters for the same pixel location. In another case, one set of red, green, and blue panels is responsible for generating light corresponding to the most significant bits of a color dataset for a pixel location while another set of panels is responsible for generating light corresponding the least significant bits of the color dataset.

While FIGS. 23 and 24 show different ways an image may be formed in a display device, the configurations shown in FIGS. 23 and 24 are not mutually exclusive. For example, in one embodiment, a display device may use both a rotating mirror and a waveguide to form an image and also to form multiple pupil replications.

In some embodiments, each source projector (R, G, B) may have an associated respective waveguide, for example, as part of a larger waveguide stack that combines a plurality of color channels, for example, red, green, blue, and/or other color channels. In some embodiments, a first waveguide might handle two color channels, while a second waveguide may handle a third color channel. Other permutations are possible, for example, in which one waveguide may handle two color channels, and a second waveguide may handle a third. In some embodiments, there may be two, three, four, or five color channels, or a combination of one or more color channels and a luminance channel, or other channel, and these channels may be divided amongst a plurality of waveguides in any desired permutation. In some examples, an optical combiner includes a separate waveguide for each of a plurality of color channels.

In some embodiments, an electronic display may include a plurality of first light emitters each configured to emit light of a first color, a plurality of second light emitters configured to emit light of a second color, and optionally a plurality of third light emitters each configured to emit light of a third color. In some embodiments, an optical combiner may include one or more waveguides configured to converge or otherwise direct the light emitted from the various light emitters to form an augmented reality image, for example, by overlapping the light from the various light emitters within a spatial location. In some embodiments, the light emitters may each emit an approximately monochromatic color light, which may correspond to a primary color such as red, green, or blue. In some embodiments, a light emitter may be configured to emit a band or combination of wavelength colors, as desirable in any specific application. In some embodiments, a light emitter may be configured to emit a UV (or blue or violet light) towards a photochromic layer, for example, to induce local or global dimming within the photochromic layer. The degree of local and/or global dimming may be controlled, for example, based on average and/or peak values of ambient light brightness.

In some embodiments, a display system (e.g., an NED) may include a pair of waveguide configurations. Each waveguide may be configured to project an image to an eye of a user. In some embodiments, a single waveguide configuration that is sufficiently wide to project images to both eyes may be used. The waveguide configurations may each include a decoupling area. In order to provide images to an eye of the user through the waveguide configuration, multiple coupling areas may be provided in a top surface of the waveguide of the waveguide configuration. The coupling areas may include multiple coupling elements to interface with light images provided by a first and second light emitter array sets, respectively. Each of the light emitter array sets may include a plurality of monochromatic light emitter arrays, for example, as described herein. In some embodiments, the light emitter array sets may each include a red light emitter array, a green light emitter array, and a blue light emitter array. Some light emitter array sets may further include a white light emitter array or a light emitter array emitting some other color or combination of colors.

In some embodiments, a right eye waveguide may include one or more coupling areas (all or a portion of which may be referred to collectively as coupling areas) and a corresponding number of light emitter array sets (all or a portion of which may be referred to collectively as the light emitter array sets). Accordingly, while the right eye waveguide may include two coupling areas and two light emitter array sets, some embodiments may include more or fewer (of each, or of both). In some embodiments, the individual light emitter arrays of a light emitter array set may be disposed at different locations around a decoupling area. For example, the light emitter array set may include a red light emitter array disposed along a left side of the decoupling area, a green light emitter array disposed along the top side of the decoupling area, and a blue light emitter array disposed along the right side of the decoupling area. Accordingly, light emitter arrays of a light emitter array set may be disposed all together, in pairs, or individually, relative to a decoupling area.

The left eye waveguide may include the same number and configuration of coupling areas and light emitter array sets as the right eye waveguide, in some embodiments. In some embodiments, the left eye waveguide and the right eye waveguide may include different numbers and configurations (e.g., positions and orientations) of coupling areas and light emitter array sets. In some embodiments, the pupil replication areas formed from different color light emitters may occupy different areas. For example, a red light emitter array of the light emitter array set 596 may produce pupil replications of a red image within a limited area, and correspondingly for green and blue light. The limited areas may be different from one monochromatic light emitter array to another, so that only the overlapping portions of the limited areas may be able to provide full-color pupil replication, projected toward the eyebox. In some embodiments, the pupil replication areas formed from different color light emitters may occupy the same area.

In some embodiments, different waveguide portions may be connected by a bridge waveguide. The bridge waveguide may permit light from a light emitter array set to propagate from one waveguide portion into another waveguide portion. In some embodiments, the bridge waveguide portion may not include any decoupling elements, such that all light totally internally reflects within the waveguide portion. In some embodiments, the bridge waveguide portion may include a decoupling area. In some embodiments, the bridge waveguide may be used to obtain light from a plurality of waveguide portions and couple the obtained light to a detector (e.g., a photodetector), for example, to detect image misalignment between the waveguide portions.

In some embodiments, a combiner waveguide may be a single layer that has input gratings for different image color components, such as red, green, and blue light. In some embodiments, a combiner waveguide may include a stack of layers, where each layer may include input gratings for one or multiple color channels (e.g., a first layer for green, and a second layer for blue and red, or other configuration). In some examples, a dimmer element and an optical combiner, which may include one or more waveguides, may be integrated into a single component. In some examples, the dimmer element may be a separate component. In some examples, the device may be configured so that the dimmer element is located between the optical combiner and the eye(s) of a user when the device is worn by a user.

The output grating(s) may be configured to out-couple light in any desired direction that's opposite to our plan-of-record. For example, referring to FIG. 24, the output gratings may be configured to output light in the opposite direction from that shown in the figure (e.g., towards the same side of the microLED projectors). In some embodiments, the dimmer element may include a layer on either or both sides of the waveguide.

Figure 25:
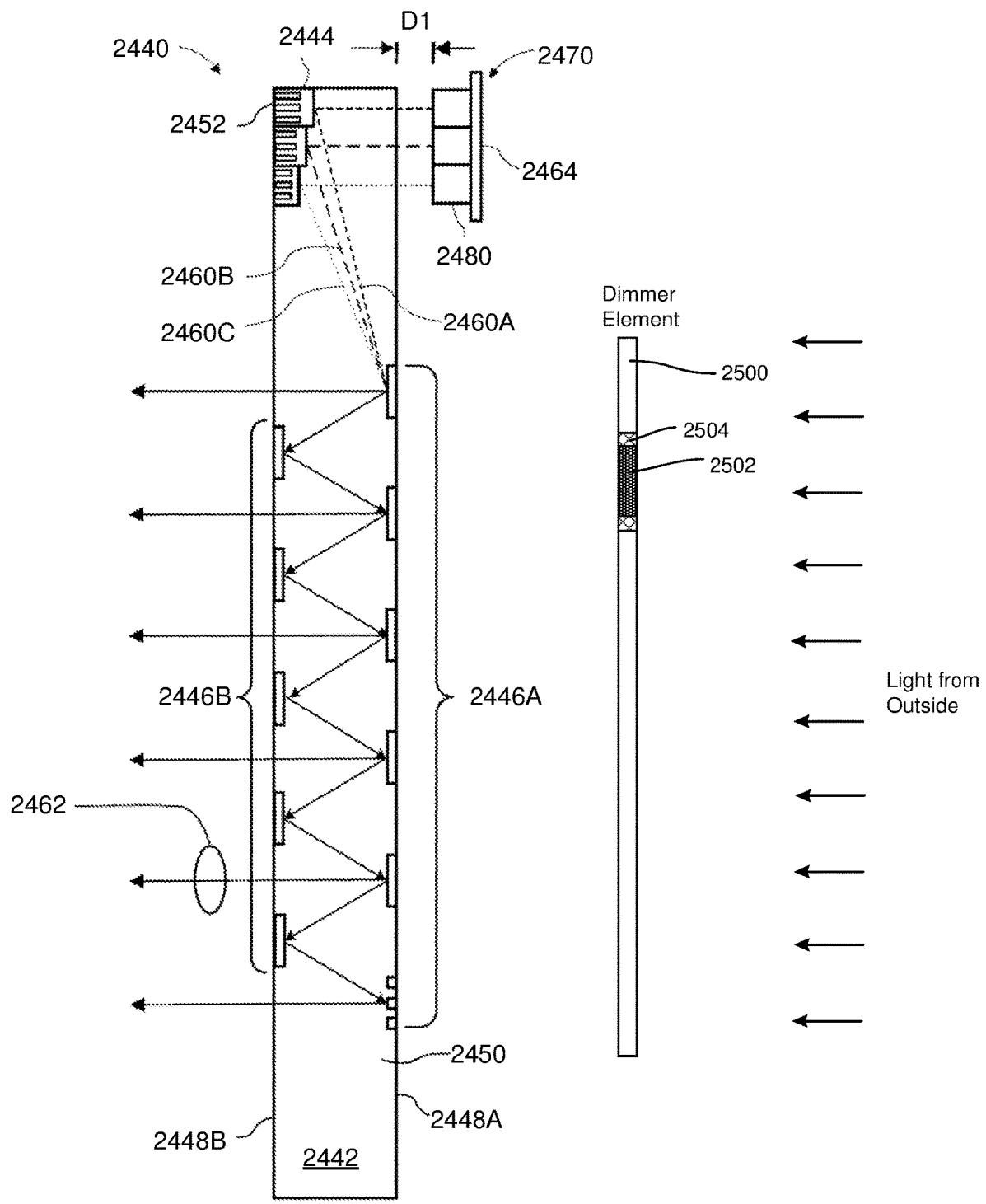
FIG. 25 illustrates a waveguide configured with a dimmer element, in accordance with some embodiments.

FIG. 25 shows a waveguide configuration 2440 disposed in cooperation with a light source 2470, as discussed above in relation to FIG. 24, and further in combination with a dimmer element 2500. In some embodiments, the dimmer element 2500 may be located between the waveguide configuration 2440 and a source of outside light, such as an input aperture defined by an eyeglass frame or similar. In the figure, the outside light is represented by the arrows on the right of the figure. The orientation shown is representative and not limiting. The dimmer element 2500 provides local dimming 2502, shown by the darker shaded region. The local dimming 2502 may be surrounded by a peripheral region of reduced dimming, shown by the lighter shaded region 2504, though this is optional. In this example, the dimmer element reduces the outside light intensity within a portion of, for example, an augmented reality image element provided by the waveguide.

In some embodiments, the outside light may pass through a lens, such as an ophthalmic lens, before passing through the dimmer element. For example, a device may include ophthalmic lenses (such as prescription lenses), and these may be located such that outside light passes through an ophthalmic lens before passing through the dimmer element. In some embodiments, a device may be configured to provide image correction for the augmented reality image element, for example, using one or more lenses, or one or more curved waveguide surfaces. In some embodiments, outside light may pass through the dimmer element and the waveguide, and then the outside light and projected augmented reality light may both pass through an ophthalmic lens. In some embodiments, a device may include an exterior optical element (e.g., a lens or window) through which outside light initially passes, which may include scratch-resistant glass or a scratch-resistant surface coating.

In some embodiments, the pupil replications may be outcoupled in the other direction (e.g., towards where the light emitters are located, e.g., as shown in FIG. 21). In some examples, a dimmer element (such as dimmer element 2500 of FIG. 25) may be located on either side of the optical combiner, for example, closer or farther away from the user's eye than the optical combiner.

In some examples, the dimmer element may be located on the far side of the optical combiner from the eye of the user, when the device is in use. The dimmer element may selectively dim outside light within one or more particular spatial regions of the ambient image, for example, to improve viewability of one or more respective augmented reality elements.

In some embodiments, the dimmer element may be located on the same side of the optical combiner as the eye of the user. The dimmer element may be configured to dim outside light that passes through the optical coupler, relative to an augmented reality image element, within a particular spatial region of the ambient image. In some examples, the optical profile the dimmer element, within the particular spatial region, may be configured to generally transmit the augmented reality image element, and absorb other spectral components of the outside light. The optical profile may include one or more of an optical absorption profile, an optical reflection profile, or a polarization absorption profile. For example, if an augmented reality image element includes light of a particular color, an example dimmer element may be configured to generally transmit the particular color and absorb other spectral components, which may arise from the outside light. For example, if the augmented reality image element includes red light, an example dimmer element, that may be located closer to the eye than the optical combiner, may selectively transmit red light and absorb other spectral components of the ambient light.

In some examples, the dimmer element may have polarization properties configured to enhance the viewability of the augmented reality image elements. In some examples, a polarizer may be used to impart a particular polarization on outside light, for example, to reduce glare. A dimmer element may then absorb light of that particular polarization within a portion of the ambient image. For example, outside light may pass through a vertical polarizer, through the optical combiner, and then be absorbed by a dimmer element within a spatial region. The dimmer element may allow transmission of an augmented reality image element (e.g., having a horizontal polarization) within the spatial region, to improve viewability of the augmented reality image element. In some examples, an augmented reality image element may be formed from light having a particular polarization (e.g., linear polarization of a particular orientation, or circular polarization of a particular handedness), and the dimmer element may preferentially transmit the particular polarization of the augmented reality image element.

In some examples, the dimmer element may have optical absorption properties configured to enhance the viewability of one or more augmented reality image elements. In some examples, a dimmer element may be used to absorb a wavelength range of the outside light, allowing enhanced viewability of the augmented reality image element. If the dimmer element is located on the opposite side of the optical combiner from the eye of the user, the dimmer element may absorb light over a broad spectrum of visible wavelengths. If the augmented reality image element uses a particular color, an example dimmer element on the opposite side of the optical combiner may selectively absorb light of that particular color. If the dimmer element is located on the same side of the optical combiner as the eye, the dimmer element may selectively transmit light of the one or more particular colors used in the augmented reality image element, and absorb other colors to enhance viewability of the augmented reality image element.

In some examples, augmented reality image elements may be formed using narrow-band spectral components, such as essentially monochromatic light from light emitting diodes, lasers, or other solid-state emitters. A dimmer element may be configured to have correspondingly narrow band transmission or absorption properties, for example, with reduced absorption at the wavelengths of the augmented reality image elements, for example, to enhance viewability of the augmented reality image elements. In some examples, a dimmer element may be located on the same side of the optical combiner as the eye, and may selectively transmit light within the one or more narrow band spectral regions used to form an augmented reality image element. In some examples, selective transmission may include a reduced optical absorption at the selectively transmitted wavelength.

A dimmer element, as described herein, may be used with any optical system used to provide an augmented reality image element.

In some examples, local dimming may include modifying the relative intensity of one or more color channels of an electronic display (such as a projection display) to provide an augmented reality image element that has improved color contrast with the portion of the ambient image in which it is located. In some examples, local dimming may add a color tint to the ambient image, for example, by reducing the intensity of one or more color components (such as primary color components) in the ambient image. The augmented reality image element may then be provided to include one or more color components corresponding to the locally dimmed components.

As detailed above, the computing devices and systems described and/or illustrated herein may represent any type or form of computing device or system capable of executing computer-readable instructions, such as those contained within the modules described herein. In their most basic configuration, these computing device(s) may each include at least one memory device and at least one physical processor.

In some embodiments, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some embodiments, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to perform a function, use the result of the transformation to perform a function, and store the result of the transformation to perform a function. Example functions may include one or more of the following; local dimming, eye tracking, image sensing, image processing, augmented reality image element generation or projection, and the like. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

What is claimed is:

1. A device, comprising:
    an electronic display configured to generate an augmented reality image element;
    an optical combiner configured to receive ambient light from outside the device and the augmented reality image element and to provide an augmented reality image having the augmented reality image element located within a portion of an ambient image, wherein the ambient image is formed from the ambient light; and
    a dimmer element configured to selectively dim the portion of the ambient image, wherein the dimmer element comprises:
    a liquid crystal shutter; and
    a pixelation visibility reduction layer comprising a pattern of light-absorbing elements at least partially in register with a pixel gap pattern of the liquid crystal shutter.

2. The device of claim 1, wherein the device is an augmented reality headset configured to be worn by a user and the device is configured so that the augmented reality image element is projected reality towards an eye of the user after passing through the optical combiner.

3. The device of claim 1, wherein the liquid crystal shutter comprises at least one of:
    a cell with an aligned and electrically controllable layer of liquid crystal confined between two polarizers;
    a guest-host liquid crystal cell; or
    an electrically controlled light scattering cell including a liquid crystal composite.

4. The device of claim 1, wherein the liquid crystal shutter comprises irregularly-shaped pixels.

5. The device of claim 1, wherein the liquid crystal shutter comprises a guest-host liquid crystal shutter comprising a dye-doped liquid crystal.

6. The device of claim 1, wherein the optical combiner comprises one or more waveguides.

7. The device of claim 1, wherein:
    the augmented reality image element comprises a plurality of color channels, and
    the electronic display comprises a separate projector array for each color channel, and each projector array is coupled into the optical combiner.

8. The device of claim 7, wherein each projector array comprises a microLED array.

9. The device of claim 7, wherein each projector array comprises a microLED array comprising microLEDs spaced apart by less than 5 microns.

10. The device of claim 1, further comprising an image sensor configured to determine an intensity of the ambient light as a function of direction,
    wherein the dimmer element is selectively controlled based on one or more directions from which the intensity of the ambient light exceeds a threshold intensity.

11. The device of claim 1, further comprising an eye tracking camera configured to determine a user gaze.

12. The device of claim 11, wherein the dimmer element is selectively controlled based on the user gaze.

13. The device of claim 11, wherein the dimmer element is selectively controlled based on one or more directions from which an intensity of the ambient light exceeds a threshold intensity, and not on the determined user gaze.

14. The device of claim 1, further comprising a control unit configured to: generate or receive augmented reality information for display as the augmented reality image element;
  activate the electronic display to provide the augmented reality image element; and control the dimmer element to dim a selected portion of the ambient image to enhance a visibility of the augmented reality image element.

15. The device of claim 14, wherein the device is an augmented reality headset.

16. A method, comprising
  combining an ambient image and an augmented reality image element to form an augmented reality image, wherein the augmented reality image includes the augmented reality image element located within a portion of the ambient image, and the ambient image is formed from ambient light; and
  dimming a selected portion of the ambient image to visually enhance the augmented reality image element, wherein dimming the selected portion of the ambient image is performed by a dimmer element comprising:
  a liquid crystal shutter; and
  a pixelation visibility reduction layer comprising a pattern of light-absorbing elements at least partially in register with a pixel pap pattern of the liquid crystal shutter.

17. The method of claim 16, further comprising generating the augmented reality image element by projecting the augmented reality image element from an electronic display towards an optical combiner,
  wherein the optical combiner forms the augmented reality image by combining the augmented reality image element and ambient light.

18. The method of claim 16, wherein dimming the portion of the ambient image to visually enhance the augmented reality image element comprises dimming the selected portion of the ambient image in which the augmented reality image element is located by reducing the optical transmission of a selected region of a liquid crystal shutter.

* * * * *